US012688270B2

(12) United States Patent
Liu et al.

(10) Patent No.: US 12,688,270 B2
(45) Date of Patent: Jul. 21, 2026

(54) SYSTEMS AND METHODS FOR HUMAN-MOUNTED BIOSENSORS AND PROCESSING BIOSENSOR INFORMATION

(71) Applicant: UNIVERSITY OF TENNESSEE RESEARCH FOUNDATION, Knoxville, TN (US)

(72) Inventors: Jian Liu, Knoxville, TN (US); Phuc VP Nguyen, Sunderland, MA (US); Yi Wu, Knoxville, TN (US)

(73) Assignee: University of Tennessee Research Foundation, Knoxville, TN (US)

( * ) Notice: Subject to any disclaimer, the term of this patent is extended or adjusted under 35 U.S.C. 154(b) by 60 days.

(21) Appl. No.: 18/474,137

(22) Filed: Sep. 25, 2023

(65) Prior Publication Data

US 2024/0104183 A1     Mar. 28, 2024

Related U.S. Application Data

(60) Provisional application No. 63/538,470, filed on Sep. 14, 2023, provisional application No. 63/376,854, filed on Sep. 23, 2022.

(51) Int. Cl.
    *G06F 21/32*          (2013.01)
(52) U.S. Cl.
    CPC ................................... *G06F 21/32* (2013.01)
(58) Field of Classification Search
    CPC ........................................................ G06F 21/32
    USPC .......................................................... 726/2
    See application file for complete search history.

(56) References Cited

U.S. PATENT DOCUMENTS

| | | | | |
|---|---|---|---|---|
| 2019/0369726 A1* | 12/2019 | Kang | ...................... | A61B 5/389 |
| 2020/0065569 A1* | 2/2020 | Nduka | .................... | G10L 13/02 |
| 2022/0197986 A1* | 6/2022 | Zizi | ..................... | H04L 63/0861 |
| 2024/0104180 A1* | 3/2024 | S | ........................... | G06V 10/82 |

FOREIGN PATENT DOCUMENTS

| | | | | | |
|---|---|---|---|---|---|
| CN | 113855019 A | * | 12/2021 | ............. | A61B 5/165 |
| KR | 20200000552 A | * | 1/2020 | | |

OTHER PUBLICATIONS

Liebers, Jonathan, and Stefan Schneegass. "Gaze-based authentication in virtual reality." ACM Symposium on Eye Tracking Research and Applications. 2020.

Manjula, W., M. Sukumar, S. Kishorekumar, K. Gnanashanmugam, and K. Mahalakshmi, "Smile: A review," Journal of pharmacy & bioallied sciences, vol. 7, No. Suppl 1, p. S271, 2015.

Masai, K., K. Kunze, D. Sakamoto, Y. Sugiura, and M. Sugimoto, "Face commands-user-defined facial gestures for smart glasses," in 2020 IEEE International Symposium on Mixed and Augmented Reality (ISMAR), pp. 374-386, IEEE, 2020.

(Continued)

*Primary Examiner* — Lawrence Truong

(74) *Attorney, Agent, or Firm* — FisherBroyles, LLP; Jason M. Pass; James Pohl

(57) ABSTRACT

Provided are methods, apparatus, systems, and computer-readable media for processing biosensor information to produce multi-dimensional images of facial movement, produce multi-dimensional images of expressions of a human user, perform biosensor-based user identification, perform biosensor-based user authentication, and combinations thereof. Other methods, apparatus, systems, and computer-readable media are also disclosed.

27 Claims, 32 Drawing Sheets

(56) References Cited

OTHER PUBLICATIONS

Matthies, D. J. , B. A. Strecker, and B. Urban, "Earfieldsensing: A novel in-ear electric field sensing to enrich wearable gesture input through facial expressions," in Proceedings of the 2017 CHI Conference on Human Factors in Computing Systems, pp. 1911-1922, 2017.

Meteriz-Yldran, U., Yldran, N. F., Awad, A., & Mohaisen, D. (2022, March). A keylogging inference attack on air-tapping keyboards in virtual environments. In 2022 IEEE Conference on Virtual Reality and 3D User Interfaces (VR) (pp. 765-774). IEEE.

Miller, R., Ajit, A., Banerjee, N. K., & Banerjee, S. (2019, December). Realtime behavior-based continual authentication of users in virtual reality environments. In 2019 IEEE International Conference on Artificial Intelligence and Virtual Reality (AIVR) (pp. 253-2531). IEEE.

Mustafa, T., R. Matovu, A. Serwadda, and N. Muirhead, "Unsure how to authenticate on your vr headset? come on, use your head!," in Proceedings of the Fourth ACM International Workshop on Security and Privacy Analytics, pp. 23-30, 2018.

Nam, Y., B. Koo, A. Cichocki, and S. Choi, "Gom-face: Gkp, eog, and emg-based multimodal interface with application to humanoid robot control," IEEE Transactions on Biomedical Engineering, vol. 61, No. 2, pp. 453-462, 2013.

Nguyen, P., N. Bui, A. Nguyen, H. Truong, A. Suresh, M. Whitlock, D. Pham, T. Dinh, and T. Vu, "Tyth-typing on your teeth: Tongue-teeth localization for human-computer interface," in Proceedings of the 16th Annual International Conference on Mobile Systems, Applications, and Services, pp. 269-282, 2018.

Park, S., S. D. Mello, P. Molchanov, U. Iqbal, O. Hilliges, and J. Kautz, "Few-shot adaptive gaze estimation," in Proceedings of the IEEE/CVF International Conference on Computer Vision, pp. 9368-9377, 2019.

Peng, X., R. S. Feris, X. Wang, and D. N. Metaxas, "A recurrent encoder-decoder network for sequential face alignment," in European conference on computer vision, pp. 38-56, Springer, 2016.

Perkins, P. and S. Heber, "Identification of ribosome pause sites using a z-score based peak detection algorithm," in 2018 IEEE 8th International Conference on Computational Advances in Bio and Medical Sciences (ICCABS), pp. 1-6, IEEE, 2018.

Pfeuffer, K., M. J. Geiger, S. Prange, L. Mecke, D. Buschek, and F. Alt, "Behavioural biometrics in vr: Identifying people from body motion and relations in virtual reality," in Proceedings of the 2019 CHI Conference on Human Factors in Computing Systems, pp. 1-12, 2019.

Pham, H. X. , Y. Wang, and V. Pavlovic, "End-to-end learning for 3d facial animation from raw waveforms of speech," arXiv preprint arXiv:1710.00920, 2017.

Prabhu, U., K. Seshadri, and M. Savvides, "Automatic facial landmark tracking in video sequences using kalman filter assisted active shape models," in European Conference on Computer Vision, pp. 86-99, Springer, 2010.

Quintana, M., S. Karaoglu, F. Alvarez, J. M. Menendez, and T. Gevers, "Three-d wide faces (3dwf): Facial landmark detection and 3d reconstruction over a new rgb-d multi-camera dataset," Sensors, vol. 19, No. 5, p. 1103, 2019.

Ren, Y., G. Li, Y. Chen, T. H. Li, and S. Liu, "Pirenderer: Controllable portrait image generation via semantic neural rendering," in Proceedings of the IEEE/CVF International Conference on Computer Vision, pp. 13759-13768, 2021.

Rezazadeh, I. M. , S. M. Firoozabadi, H. Hu, and S. M. R. H. Golpayegani, "A novel human-machine interface based on recognition of multi-channel facial bioelectric signals," Australasian physical & engineering sciences in medicine, vol. 34, No. 4, pp. 497-513, 2011.

Sagonas, C., G. Tzimiropoulos, S. Zafeiriou, and M. Pantic, "300 faces in-the-wild challenge: The first facial landmark localization challenge," in Proceedings of the IEEE International Conference on Computer Vision Workshops, pp. 397-403, 2013.

Sahni, H. , A. Bedri, G. Reyes, P. Thukral, Z. Guo, T. Starner, and M. Ghovanloo, "The tongue and ear interface: a wearable system for silent speech recognition," in Proceedings of the 2014 ACM International Symposium on Wearable Computers, pp. 47-54, 2014.

Saragih, J. M., S. Lucey, and J. F. Cohn, "Deformable model fitting by regularized landmark mean-shift," International journal of computer vision, vol. 91, No. 2, pp. 200-215, 2011.

Scheirer, J., R. Fernandez, and R. W. Picard, "Expression glasses: a wearable device for facial expression recognition," in CHI'99 Extended Abstracts on Human Factors in Computing Systems, pp. 262-263, 1999.

Simon, T., H. Joo, I. Matthews, and Y. Sheikh, "Hand keypoint detection in single images using multiview bootstrapping," in Proceedings of the IEEE conference on Computer Vision and Pattern Recognition, pp. 1145-1153, 2017.

Sivasamy, M., V. Sastry, and N. Gopalan, "Vrcauth: continuous authentication of users in virtual reality environment using head-movement," in 2020 5th International Conference on Communication and Electronics Systems (ICCES), pp. 518-523, IEEE, 2020.

Suwajanakorn, S., S. M. Seitz, and I. Kemelmacher-Shlizerman, "Synthesizing obama: learning lip sync from audio," ACM Transactions on Graphics (ToG), vol. 36, No. 4, pp. 1-13, 2017.

Tagluk, M. E. , N. Sezgin, and M. Akin, "Estimation of sleep stages by an artificial neural network employing eeg, emg and eog," Journal of medical systems, vol. 34, No. 4, pp. 717-725, 2010.

Terissi, L.D. and J. C. Gomez, "Audio-to-visual conversion via hmm inversion for speech-driven facial animation," in Brazilian Symposium on Artificial Intelligence, pp. 33-42, Springer, 2008.

Tsui, C. S. L. P. Jia, J. Q. Gan, H. Hu, and K. Yuan, "Emg-based hands-free wheelchair control with eog attention shift detection," in 2007 IEEE International Conference on Robotics and Biomimetics (ROBIO), pp. 1266-1271, IEEE, 2007.

Viola, P. and M. Jones, "Rapid object detection using a boosted cascade of simple features," in Proceedings of the 2001 IEEE computer society conference on computer vision and pattern recognition. CVPR 2001, vol. 1, pp. I-I, IEEE, 2001.

Wang, J., et al., (2020). Deep high-resolution representation learning for visual recognition. IEEE transactions on pattern analysis and machine intelligence, 43(10), 3349-3364.

Wang, R., L. Huang, and C. Wang, "Low-effort VR headset user authentication using head-reverberated sounds with replay resistance," in 2023 IEEE Symposium on Security and Privacy (SP), pp. 3450-3465, IEEE Computer Society, 2023.

Webster, J. G. , "Reducing motion artifacts and interference in biopotential recording," IEEE Transactions on Biomedical Engineering, No. 12, pp. 823-826, 1984.

Weise, T., S. Bouaziz, H. Li, and M. Pauly, "Realtime performance-based facial animation," ACM transactions on graphics (TOG), vol. 30, No. 4, pp. 1-10, 2011.

Woo, S., J. Park, J.-Y. Lee, and I. S. Kweon, "Cbam: Convolutional block attention module," in Proceedings of the European conference on computer vision (ECCV), pp. 3-19, 2018.

Wu, T. Hassner, K. Kim, G. Medioni, and P. Natarajan, "Facial landmark detection with tweaked convolutional neural networks," IEEE Transactions on Pattern Analysis and Machine Intelligence, vol. 40, No. 12, pp. 3067-3074, 2017.

Wu, Q., Y. Zeng, C. Zhang, L. Tong, and B. Yan, "An eeg-based person authentication system with open-set capability combining eye blinking signals," Sensors, vol. 18, No. 2, p. 335, 2018.

Wu, W., C. Qian, S. Yang, Q. Wang, Y. Cai, and Q. Zhou, "Look at boundary: A boundary-aware face alignment algorithm," in Proceedings of the IEEE conference on computer vision and pattern recognition, pp. 2129-2138, 2018.

Wu, Y., et al., "Privacy leakage via unrestricted motion-position sensors in the age of virtual reality: A study of snooping typed input on virtual keyboards," in 2023 IEEE Symposium on Security and Privacy (SP), pp. 3382-3398, IEEE Computer Society, 2023.

Wu, Yi, et al. "BioFace-3D: Continuous 3D facial reconstruction through lightweight single-ear biosensors." Proceedings of the 27th Annual International Conference on Mobile Computing and Networking. 2021.

(56) References Cited

OTHER PUBLICATIONS

Xiao, S., J. Feng, J. Xing, H. Lai, S. Yan, and A. Kassim, "Robust facial landmark detection via recurrent attentive- refinement networks," in European Conference on Computer Vision, pp. 57-72, Springer, 2016.

Xiong, X. and F. De la Torre, "Supervised descent method and its applications to face alignment," in Proceedings of the IEEE conference on computer vision and pattern recognition, pp. 532-539, 2013.

Yang, Junshuang, Yanyan Li, and Mengjun Xie. "Motionauth: Motion-based authentication for wrist worn smart devices." 2015 IEEE International conference on pervasive computing and communication workshops (PerCom Workshops). IEEE, 2015.

Zarins, U., Anatomy of Facial Expressions. Exonicus, Incorporated, 2018.

Zhang, Z., P. Luo, C. C. Loy, and X. Tang, "Facial landmark detection by deep multi-task learning," in European Conference on Computer Vision, pp. 94-108, Springer, 2014.

Zhu, S., C. Li, C. Change Loy, and X. Tang, "Face alignment by coarse-to-fine shape searching," in Proceedings of the IEEE conference on computer vision and pattern recognition, pp. 4998-5006, 2015.

"Covidien kendall disposable surface emg/ecg/ekg electrodes 1 (24mm)." https://bio-medical.com/covidien-kendall-disposable-surface-emg-ecg-ekg-electrodes-1-24mm-50pkg.html, 2021.

"Demo video for BioFace-3D." https://mosis.eecs.utk.edu/bioface-3d.html, 2023.

"Monsoon high voltage power monitor." https://www.msoon.com/high-voltage-power-monitor, 2021.

Amesaka, T., H. Watanabe, and M. Sugimoto, "Facial expression recognition using ear canal transfer function," in Proceedings of the 23rd International Symposium on Wearable Computers, pp. 1-9, 2019.

Banerjee, A., S. Datta, M. Pal, A. Konar, D. Tibarewala, and R. Ja-narthanan, "Classifying electrooculogram to detect directional eye movements," Procedia Technology, vol. 10, pp. 67-75, 2013.

Bci, O., "Cyton biosensing board (8-channels)." https://shop.openbci.com/products/cyton-biosensing-board-8-channel?variant=38958638542, 2021.

Blanz, V. and T. Vetter, "A morphable model for the synthesis of 3d faces," in Seminal Graphics Papers: Pushing the Boundaries, vol. 2, pp. 157-164, 2023.

Brand, M., "Voice puppetry," in Proceedings of the 26th annual conference on Computer graphics and interactive techniques, pp. 21-28, 1999.

Carrasco, Sandra. "D3. 3 Driver Monitoring Concept Report." (2020).

Chauhan, J., H. J. Asghar, M. A. Kaafar, and A. Mahanti, "Gesture-based continuous authentication for wearable devices: the google glass case," arXiv preprint arXiv:1412.2855, 2014.

Chawla, N.V., K. W. Bowyer, L. O. Hall, and W. P. Kegelmeyer, "Smote: Synthetic minority over-sampling technique," J. Artif. Int. Res., vol. 16, p. 321-357, Jun. 2002.

Cheah, L.A., J. M. Gilbert, J. A. Gonzalez, p. D. Green, S. R. Ell, R. K. Moore, and E. Holdsworth, "A wearable silent speech interface based on magnetic sensors with motion-artefact removal.," in BIODEVICES, pp. 56-62, 2018.

Chen, T., Steeper, B., Alsheikh, K., Tao, S., Guimbretière, F., & Zhang, C. (Oct. 2020). C-face: Continuously reconstructing facial expressions by deep learning contours of the face with ear-mounted miniature cameras. In Proceedings of the 33rd annual ACM symposium on user interface software and technology (pp. 112-125).

Choi, K., Y. Luo, and J.-N. Hwang, "Hidden Markov model inversion for audio-to-visual conversion in an mpeg-4 facial animation system," Journal of VLSI signal processing systems for signal, image and video technology, vol. 29, No. 1, pp. 51-61, 2001.

Cootes, T. F., Edwards, G. J., & Taylor, C. J. (2002). Active appearance models. IEEE Transactions on pattern analysis and machine intelligence, 23(6), 681-685.

Cootes, T. F., Taylor, C. J., Cooper, D. H., & Graham, J. (1995). Active shape models-their training and application. Computer vision and image understanding, 61(1), 38-59.

Cosker, D., D. Marshall, P. L. Rosin, and Y. Hicks, "Speech driven facial animation using a hidden markov coarticulation model," in Proceedings of the 17th International Conference on Pattern Recognition, 2004. ICPR 2004., vol. 1, pp. 128-131, IEEE, 2004.

Cristinacce, D. and T. F. Cootes, "Feature detection and tracking with constrained local models.," in Bmvc, vol. 1, p. 3, Citeseer, 2006.

Delsys, Inc. (2025, May 14). Signal Quality Monitor Support— Delsys. Delsys. https://delsys.com/SUPPORT/EMGWORKS/SIGNAL-QUALITY-MONITOR/#IMPROVE.

Denby, B., T. Schultz, K. Honda, T. Hueber, J. M. Gilbert, and J. S. Brumberg, "Silent speech interfaces," Speech Communication, vol. 52, No. 4, pp. 270-287, 2010.

Deng, Y., J. Yang, S. Xu, D. Chen, Y. Jia, and X. Tong, "Accurate 3d face reconstruction with weakly-supervised learning: From single image to image set," in Proceedings of the IEEE/CVF conference on computer vision and pattern recognition workshops, pp. 0-0, 2019.

Dong, X., Y. Yan, W. Ouyang, and Y. Yang, "Style aggregated network for facial landmark detection," in Proceedings of the IEEE Conference on Computer Vision and Pattern Recognition, pp. 379-388, 2018.

Ekman, P. and D. Keltner, "Universal facial expressions of emotion," Segerstrale U, P. Molnar P. eds. Nonverbal communication: Where nature meets culture, pp. 27-46, 1997.

Ekman, R., What the face reveals: Basic and applied studies of spontaneous expression using the Facial Action Coding System (FACS). Oxford University Press, USA, 1997.

Emotiv, "Emotiv epoch+." https://www.emotiv.com/epoc/, 2023.

Eskimez, S. E. , R. K. Maddox, C. Xu, and Z. Duan, "Noise-resilient training method for face landmark generation from speech," IEEE/ACM Transactions on Audio, Speech, and Language Processing, vol. 28, pp. 27-38, 2019.

Eskimez, S.E., R. K. Maddox, C. Xu, and Z. Duan, "Generating talking face landmarks from speech," in International Conference on Latent Variable Analysis and Signal Separation, pp. 372-381, Springer, 2018.

Fairbanks, A.T. and E. F. Fairbanks, Human proportions for artists. Fairbanks Art and Books, 2005.

Feng, Z.-H., J. Kittler, M. Awais, P. Huber, and X.-J. Wu, "Wing loss for robust facial landmark localisation with convolutional neural networks," in Proceedings of the IEEE Conference on Computer Vision and Pattern Recognition, pp. 2235-2245, 2018.

Gafurov, D., P. Bours, and E. Snekkenes, "User authentication based on foot motion," Signal, Image and Video Processing, vol. 5, pp. 457-467, 2011.

Gong, T., Y. Kim, J. Shin, and S.-J. Lee, "Metasense: few-shot adaptation to untrained conditions in deep mobile sensing," in Proceedings of the 17th Conference on Embedded Networked Sensor Systems, pp. 110-123, 2019.

Graves A. and A. Graves, "Long short-term memory," Supervised sequence labelling with recurrent neural networks, pp. 37-45, 2012.

Hamedi, M., et al., "Human facial neural activities and gesture recognition for machine-interfacing applications," International Journal of Nanomedicine, vol. 6, p. 3461, 2011.

Hamedi, M., I. M. Rezazadeh, and M. Firoozabadi, "Facial gesture recognition using two-channel bio-sensors configuration and fuzzy classifier: A pilot study," in International Conference on Electrical, Control and Computer Engineering 2011 (InECCE), pp. 338-343, IEEE, 2011.

Hamedi, M., S.-H. Salleh, M. Astaraki, and A. M. Noor, "Emg-based facial gesture recognition through versatile elliptic basis function neural network," Biomedical engineering online, vol. 12, No. 1, p. 73, 2013.

He, K., X. Zhang, S. Ren, and J. Sun, "Deep residual learning for image recognition," in Proceedings of the IEEE conference on computer vision and pattern recognition, pp. 770-778, 2016.

Ichim, A.E., S. Bouaziz, and M. Pauly, "Dynamic 3d avatar creation from hand-held video input," ACM Transactions on Graphics (ToG), vol. 34, No. 4, pp. 1-14, 2015.

(56) References Cited

OTHER PUBLICATIONS

Instruments, T., "Ads1299-x low-noise, 4-, 6-, 8-channel, 24-bit, analog-to-digital converter for eeg and biopotential measurements." https://www.ti.com/lit/ds/symlink/ads1299.pdf?ts= 1615154540121, 2020.

Iravantchi, Y., Y. Zhang, E. Bernitsas, M. Goel, and C. Harrison, "Interferi: Gesture sensing using on-body acoustic interferometry," in Proceedings of the 2019 CHI Conference on Human Factors in Computing Systems, pp. 1-13, 2019.

Jayarathne, I. , M. Cohen, and S. Amarakeerthi, "Brainid: Development of an eeg-based biometric authentication system," in 2016 IEEE 7th Annual Information Technology, Electronics and Mobile Communication Conference (IEMCON), pp. 1-6, IEEE, 2016.

Karamizadeh, S., S. M. Abdullah, A. A. Manaf, M. Zamani, and A. Hooman, "An overview of principal component analysis," Journal of Signal and Information Processing, vol. 4, No. 3B, p. 173, 2013.

Khan, R., Ragib H., and Jinfang X .. "SEPIA: Secure-PIN-authentication-as-a-service for ATM using mobile and wearable devices." 2015 3rd IEEE International Conference on Mobile Cloud Computing, Services, and Engineering. IEEE, 2015.

Kingma, D. P. and J. Ba, "Adam: A method for stochastic optimization," arXiv preprint arXiv: 1412.6980, 2014.

Kiranyaz, S., O. Avci, O. Abdeljaber, T. Ince, M. Gabbouj, and D. J. Inman, "1d convolutional neural networks and applications: A survey," Mechanical Systems and Signal Processing, vol. 151, p. 107398, 2021.

Koike-Akino, T., R. Mahajan, T. K. Marks, Y. Wang, S. Watanabe, O. Tuzel, and P. Orlik, "High-accuracy user identification using eeg biometrics," in 2016 38th annual international conference of the IEEE engineering in medicine and biology society (EMBC), pp. 854-858, IEEE, 2016.

Kumari, J., Rajesh, R., & Pooja, K. M. (2015). Facial expression recognition: A survey. Procedia computer science, 58, 486-491.

Learning, L., "Muscle contraction and locomotion." https://courses. lumenlearning.com/ivytech-bio1-1/chapter/muscle-contraction-and-locomotion/, 2021.

Li, H., L. Trutoiu, K. Olszewski, L. Wei, T. Trutna, P.-L. Hsieh, A. Nicholls, and C. Ma, "Facial performance sensing head-mounted display," ACM Transactions on Graphics (ToG), vol. 34, No. 4, pp. 1-9, 2015.

Li, R., Wu, J., and Starner, T., "Tongueboard: An oral interface for subtle input," in Proceedings of the 10th Augmented Human International Conference 2019, pp. 1-9, 2019.

Li, T., T. Bolkart, M. J. Black, H. Li, and J. Romero, "Learning a model of facial shape and expression from 4d scans.," ACM Trans. Graph., vol. 36, No. 6, pp. 194-1, 2017.

* cited by examiner

100

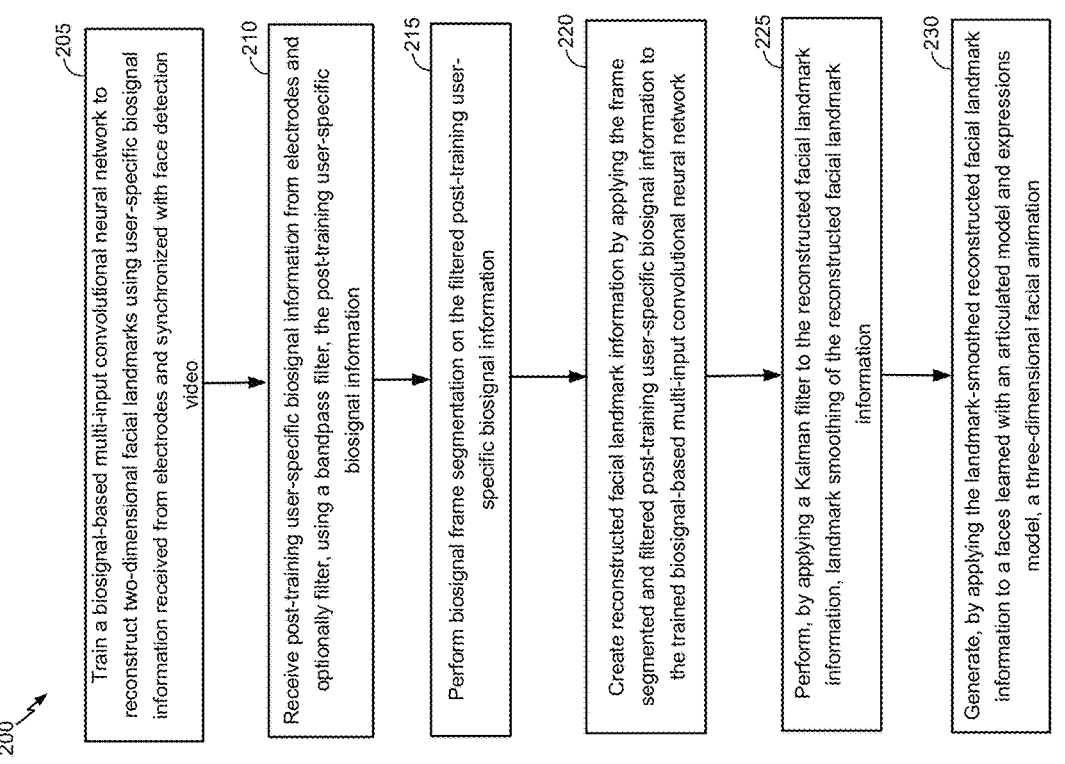

200

205

Train a biosignal-based multi-input convolutional neural network to reconstruct two-dimensional facial landmarks using user-specific biosignal information received from electrodes and synchronized with face detection video

210

Receive post-training user-specific biosignal information from electrodes and optionally filter, using a bandpass filter, the post-training user-specific biosignal information

215

Perform biosignal frame segmentation on the filtered post-training user-specific biosignal information

220

Create reconstructed facial landmark information by applying the frame segmented and filtered post-training user-specific biosignal information to the trained biosignal-based multi-input convolutional neural network

225

Perform, by applying a Kalman filter to the reconstructed facial landmark information, landmark smoothing of the reconstructed facial landmark information

230

Generate, by applying the landmark-smoothed reconstructed facial landmark information to a faces learned with an articulated model and expressions model, a three-dimensional facial animation

FIG. 2

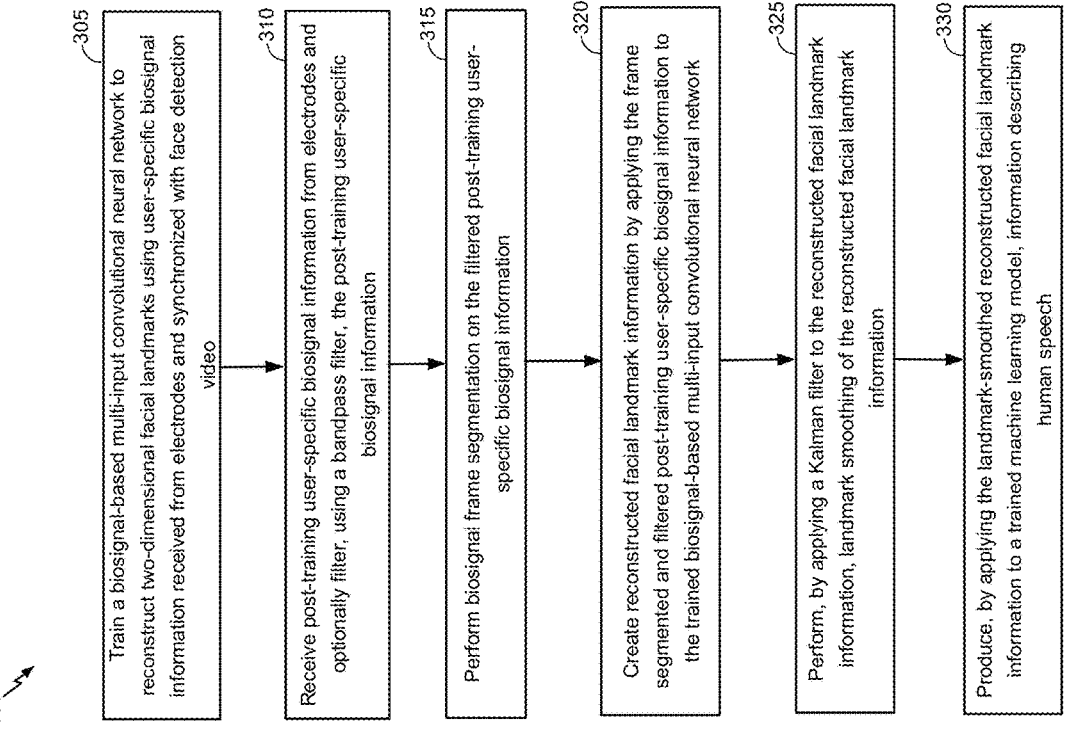

300

305
Train a biosignal-based multi-input convolutional neural network to reconstruct two-dimensional facial landmarks using user-specific biosignal information received from electrodes and synchronized with face detection video 310
Receive post-training user-specific biosignal information from electrodes and optionally filter, using a bandpass filter, the post-training user-specific biosignal information 315
Perform biosignal frame segmentation on the filtered post-training user-specific biosignal information 320
Create reconstructed facial landmark information by applying the frame segmented and filtered post-training user-specific biosignal information to the trained biosignal-based multi-input convolutional neural network 325
Perform, by applying a Kalman filter to the reconstructed facial landmark information, landmark smoothing of the reconstructed facial landmark information 330
Produce, by applying the landmark-smoothed reconstructed facial landmark information to a trained machine learning model, information describing human speech

*FIG. 3*

(a) Location of important facial muscles (b) Activated facial muscles during expressions (a) EMG signals of facial ac-(b) EOG signals of eye (c) EMG signals of a slow
tivities                          movements                  smiling

600

○ 53 MAJOR LANDMARKS USED BY BIOFACE-3D

● OTHER LANDMARKS IN THE WFLW DATASET, WHICH HAS 98 LANDMARKS IN TOTAL (a) Before landmark alignment (b) After landmark alignment

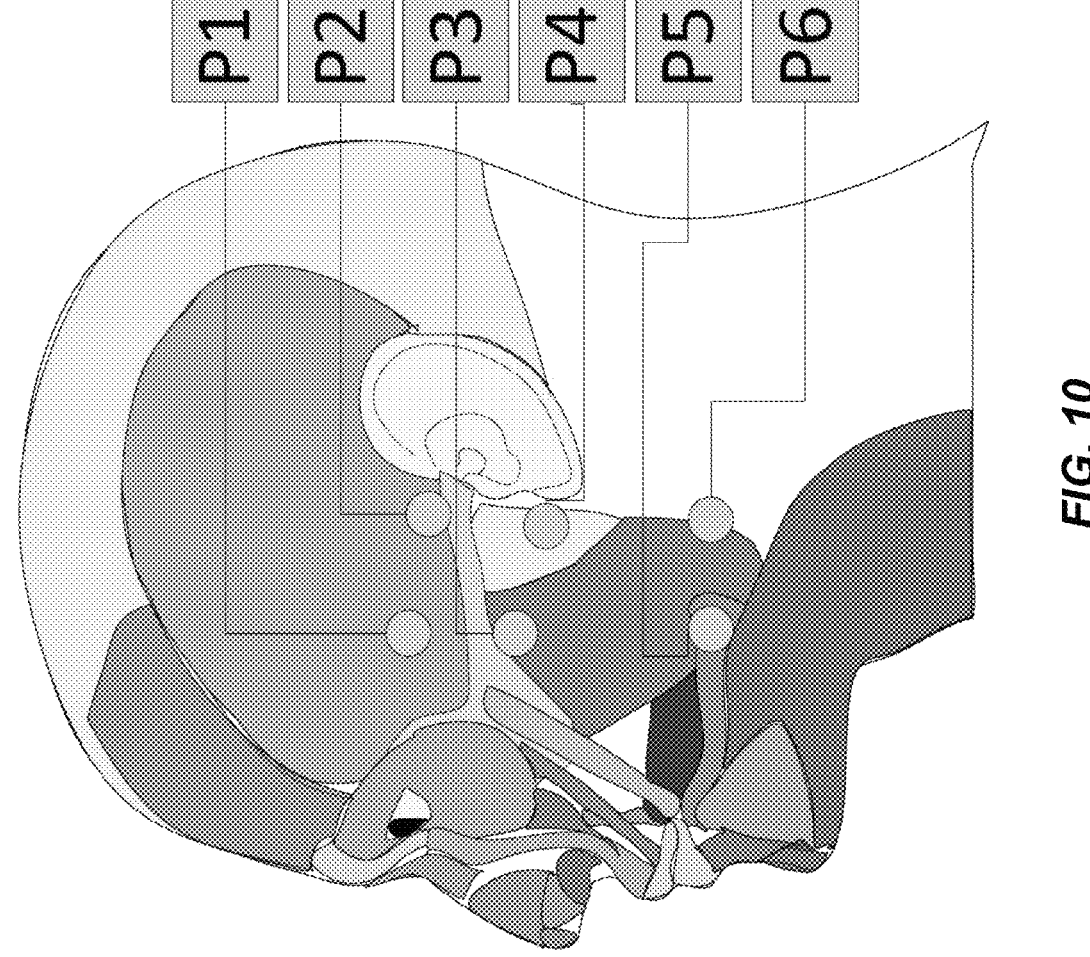
*FIG. 10*

(b) MAE CDF for each participant (a) Per-participant landmark tracking error

1100

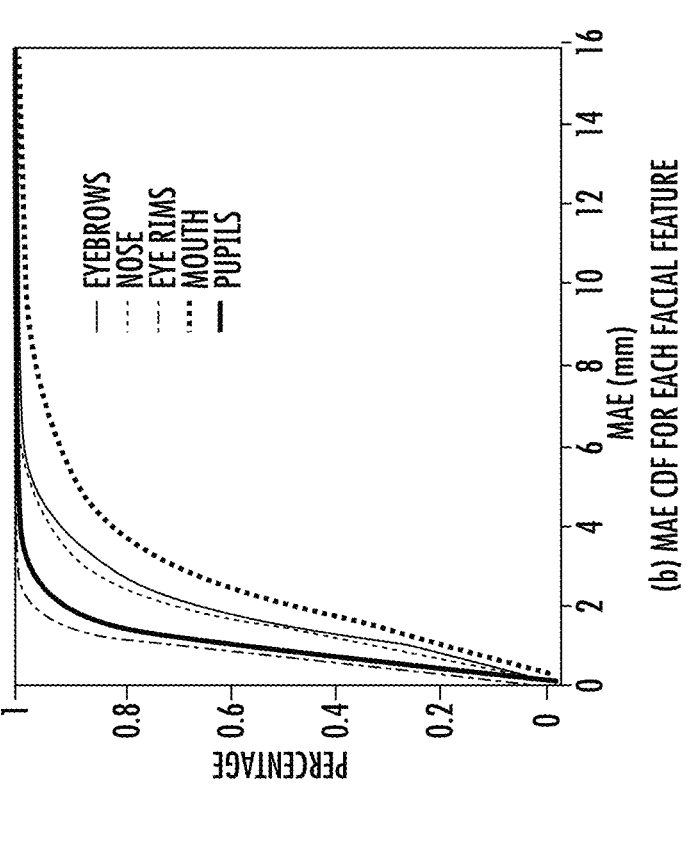
(b) MAE CDF FOR EACH FACIAL FEATURE
FIG. 12
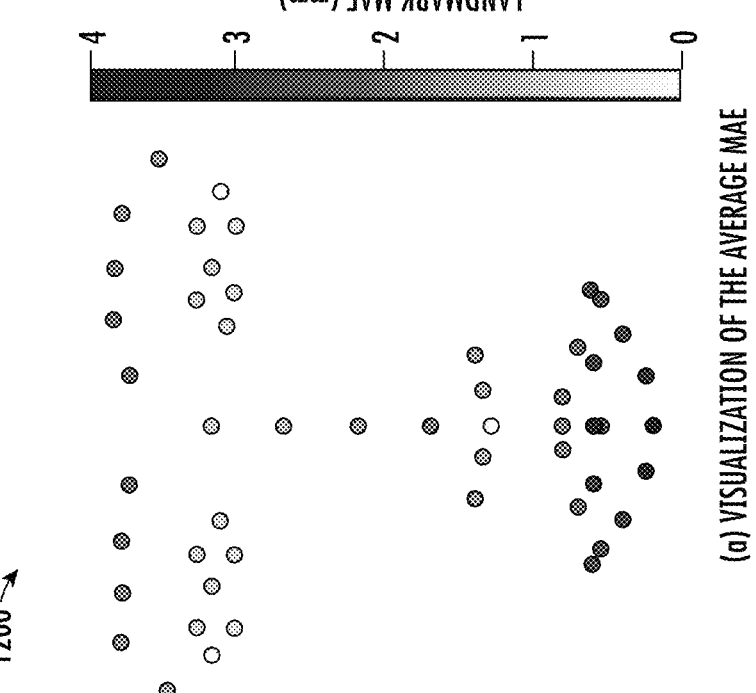
(a) VISUALIZATION OF THE AVERAGE MAE
1200

| Methods | Dataset | # of Landmarks | NME |
|---|---|---|---|
| SDM [70] | 300-W | 68 | 7.52 |
| | LFPW | 68 | 5.67 |
| CFSS [67] | 300-W | 68 | 5.76 |
| | LFPW | 68 | 4.87 |
| HRNet [60] | 300-W | 68 | 2.87 |
| | WFLW | 98 | 4.60 |
| BioFace-3D | Self-collected | 53 | 3.38 |

(a) MAE CDF for eye-related landmarks (b) Ground truth & reconstructed landmarks

1500

(a) MAE CDF for mouth-related (b) Ground truth & reconstructed land-
    landmarks                          marks (a) Impact of sampling rate (b) Impact of training data size (b) CDF for cross-day setting (a) MAE for cross-day setting

1900

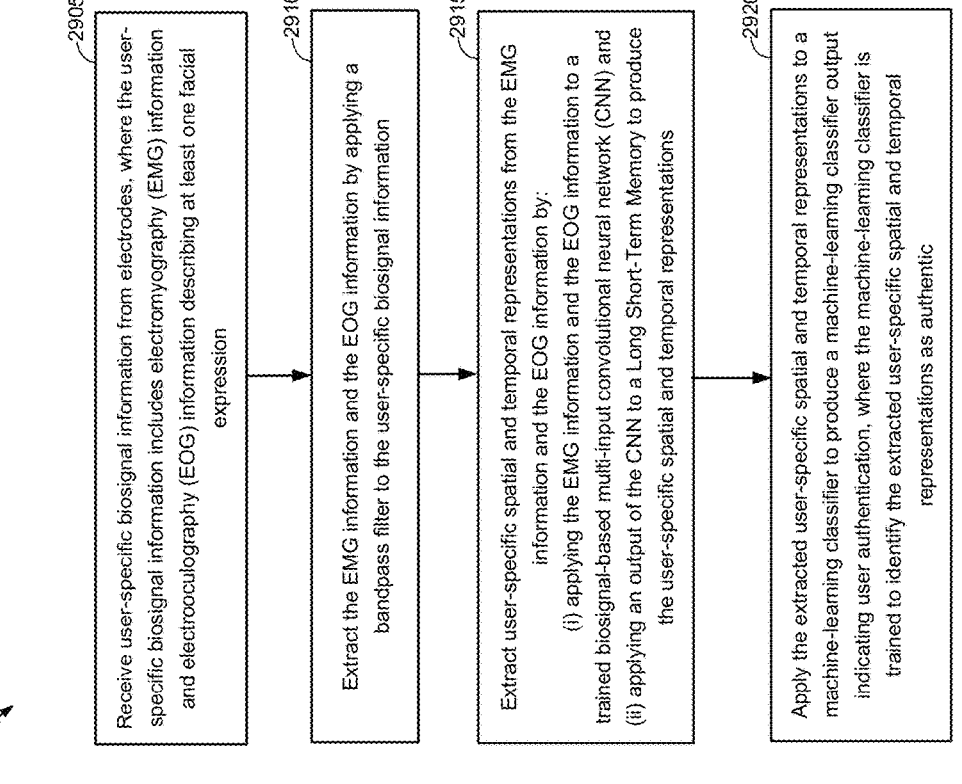

2900

2905

Receive user-specific biosignal information from electrodes, where the user-specific biosignal information includes electromyography (EMG) information and electrooculography (EOG) information describing at least one facial expression

2910

Extract the EMG information and the EOG information by applying a bandpass filter to the user-specific biosignal information

2915

Extract user-specific spatial and temporal representations from the EMG information and the EOG information by:
(i) applying the EMG information and the EOG information to a trained biosignal-based multi-input convolutional neural network (CNN) and
(ii) applying an output of the CNN to a Long Short-Term Memory to produce the user-specific spatial and temporal representations

2920

Apply the extracted user-specific spatial and temporal representations to a machine-learning classifier to produce a machine-learning classifier output indicating user authentication, where the machine-learning classifier is trained to identify the extracted user-specific spatial and temporal representations as authentic

FIG. 29

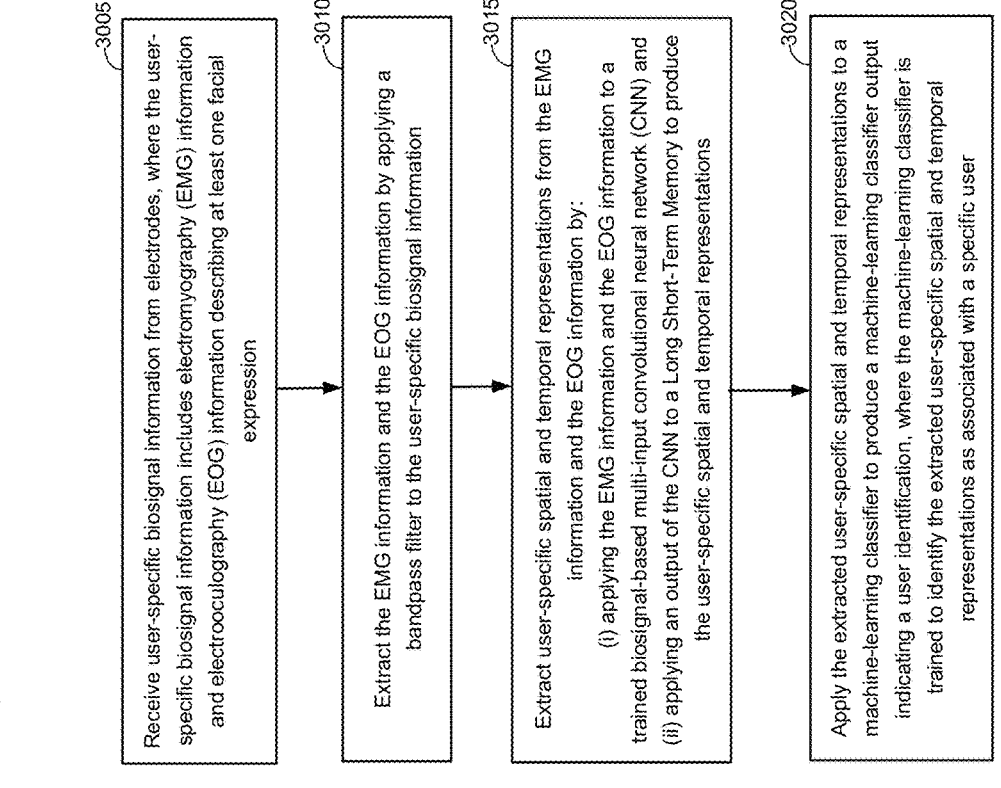

3000

3005

Receive user-specific biosignal information from electrodes, where the user-specific biosignal information includes electromyography (EMG) information and electrooculography (EOG) information describing at least one facial expression

3010

Extract the EMG information and the EOG information by applying a bandpass filter to the user-specific biosignal information

3015

Extract user-specific spatial and temporal representations from the EMG information and the EOG information by:
(i) applying the EMG information and the EOG information to a trained biosignal-based multi-input convolutional neural network (CNN) and
(ii) applying an output of the CNN to a Long Short-Term Memory to produce the user-specific spatial and temporal representations

3020

Apply the extracted user-specific spatial and temporal representations to a machine-learning classifier to produce a machine-learning classifier output indicating a user identification, where the machine-learning classifier is trained to identify the extracted user-specific spatial and temporal representations as associated with a specific user

*FIG. 30*

SYSTEMS AND METHODS FOR HUMAN-MOUNTED BIOSENSORS AND PROCESSING BIOSENSOR INFORMATION

CROSS-REFERENCE TO RELATED APPLICATIONS

This application claims the benefits of U.S. Provisional Patent Application No. 63/376,854, titled "SYSTEMS AND METHODS FOR HUMAN-MOUNTED BIOSENSORS AND PROCESSING BIOSENSOR INFORMATION", filed Sep. 23, 2022, and the benefits of U.S. Provisional Patent Application No. 63/538,470, titled "SYSTEMS AND METHODS FOR HUMAN-MOUNTED BIOSENSORS AND PROCESSING BIOSENSOR INFORMATION", filed Sep. 14, 2023, the disclosures of which are hereby incorporated herein by reference in their entireties.

STATEMENT REGARDING FEDERALLY SPONSORED RESEARCH

This invention was made with United States Government support under Grant Nos. ECCS-2132106 and ECCS-2132112 awarded by the National Science Foundation (NSF). The United States Government has certain rights in the invention.

FIELD OF DISCLOSURE

This disclosure relates generally to the technical fields of electronics, computer-readable media, biomedical engineering and more specifically, but not exclusively, to human-mounted biosensors, methods for performing multi-dimensional facial imaging by processing biosensor information, and methods for performing speech recognition by processing biosensor information received from head-mounted biosensors.

BACKGROUND

Over the last decade, facial landmark tracking and 3D reconstruction have gained considerable attention due to their numerous applications. Traditional approaches require users to be confined to a particular location and face a camera under constrained recording conditions (e.g., without occlusions and under good lighting conditions). This highly restricted setting prevents the traditional approaches from being deployed in many application scenarios involving human motions.

Accordingly, there are previously unaddressed and long-felt industry needs for methods and apparatus which improve upon conventional methods and apparatus.

SUMMARY

As will be described in greater detail below, the instant disclosure describes various systems and methods for performing biosensor-based user authentication.

In examples, provided is a computer-implemented method for performing biosensor-based user authentication. At least a portion of the method can be performed by a computing device comprising at least one processor. The method can include: (i) receiving user-specific biosignal information from electrodes, where the user-specific biosignal information includes electromyography (EMG) information and electrooculography (EOG) information describing at least one facial expression; (ii) extracting the EMG information and the EOG information by applying a band-pass filter to the user-specific biosignal information; (iii) extracting user-specific spatial and temporal representations from the EMG information and the EOG information by: (A) applying the EMG information and the EOG information to a trained biosignal-based multi-input convolutional neural network (CNN); and (B) applying an output of the CNN to a Long Short-Term Memory to produce the user-specific spatial and temporal representations; and (iv) applying the extracted user-specific spatial and temporal representations to a machine-learning classifier to produce a machine-learning classifier output indicating user authentication, where the machine-learning classifier is trained to identify the extracted user-specific spatial and temporal representations as authentic.

In examples, the computer-implemented method can include displaying at least one image of the at least one facial expression on a user display that is a constituent part of: a helmet, a hat, a headset, a virtual reality headset, an augmented reality headset, earbuds, smart glasses, a wireless device, a computer monitor, or a combination thereof.

In examples, the user-specific biosignal information can be received from: a helmet, a hat, a headset, a virtual reality headset, an augmented reality headset, earbuds, smart glasses, a wireless device, a computer monitor, or a combination thereof.

In examples, the at least one facial expression can be a constituent part of a prescribed sequence of pre-defined facial expressions.

In examples, the computer-implemented method can include: (i) providing, via a user-interface device, a user authentication request and (ii) restricting receipt of the user-specific biosignal information to a pre-determined time period following the providing the user authentication request.

In examples, the computer-implemented method can include performing a multi-factor authentication process, where the multi-factor authentication process uses the machine-learning classifier output to authenticate a user.

In examples, the output of the CNN can describe, using three-dimensional morphable model coefficients, a three-dimensional face mesh.

In examples, the computer-implemented method can include: (i) receiving, from a user interface device and in response to a user prompt to perform at least one facial expression, an input describing authentic user-specific biosignal information and (ii) preparing a machine-learning classifier training dataset from the authentic user-specific biosignal information.

In examples, the machine-learning classifier output can be in a plurality of machine-learning classifier outputs corresponding to respective EMG information and respective EOG information describing respective facial expressions, the method further comprising applying the plurality of machine-learning classifier outputs to a hard voting algorithm configured to produce a user authentication output based on a majority vote.

In examples, provided is a non-transitory computer-readable medium. The non-transitory computer-readable medium can include processor-executable instructions stored thereon configured to cause a processor to initiate, control, perform, or a combination thereof at least a portion of a method for performing biosensor-based user authentication. In examples, the method can include: (i) receiving user-specific biosignal information from electrodes, where the user-specific biosignal information includes electromyography (EMG) information and electrooculography (EOG)

information describing at least one facial expression; (ii) extracting the EMG information and the EOG information by applying a bandpass filter to the user-specific biosignal information; (iii) extracting user-specific spatial and temporal representations from the EMG information and the EOG information by: (A) applying the EMG information and the EOG information to a trained biosignal-based multi-input convolutional neural network (CNN) and (B) applying an output of the CNN to a Long Short-Term Memory to produce the user-specific spatial and temporal representations; and (iv) applying the extracted user-specific spatial and temporal representations to a machine-learning classifier to produce a machine-learning classifier output indicating user authentication, where the machine-learning classifier is trained to identify the extracted user-specific spatial and temporal representations as authentic.

In examples, the non-transitory computer-readable medium can further include processor-executable instructions stored thereon configured to cause the processor to initiate, control, perform, or a combination thereof displaying at least one image of the at least one facial expression on a user display that is a constituent part of a helmet, a hat, a headset, a virtual reality headset, an augmented reality headset, earbuds, smart glasses, a wireless device, a computer monitor, or a combination thereof.

In examples, the user-specific biosignal information can be received from a helmet, a hat, a headset, a virtual reality headset, an augmented reality headset, earbuds, smart glasses, a wireless device, a computer monitor, or a combination thereof.

In examples, the at least one facial expression can be a constituent part of a prescribed sequence of pre-defined facial expressions.

In examples, the non-transitory computer-readable medium can further include processor-executable instructions stored thereon configured to cause the processor to: (i) provide, via a user-interface device, a user authentication request; and (ii) restrict receipt of the user-specific biosignal information to a pre-determined time period following the providing the user authentication request.

In examples, the non-transitory computer-readable medium can further include processor-executable instructions stored thereon configured to cause the processor to perform a multi-factor authentication process, where the multi-factor authentication process uses the machine-learning classifier output to authenticate a user.

In examples, the output of the CNN can describe, using three-dimensional morphable model coefficients, a three-dimensional face mesh.

In examples, the non-transitory computer-readable medium can further include processor-executable instructions stored thereon configured to cause the processor to: (i) receive, from a user interface device and in response to a user prompt to perform at least one facial expression, an input describing authentic user-specific biosignal information and (ii) prepare a machine-learning classifier training dataset from the authentic user-specific biosignal information.

In examples, the non-transitory computer-readable medium can further include processor-executable instructions stored thereon configured to cause the processor to apply the plurality of machine-learning classifier outputs to a hard voting algorithm configured to produce a user authentication output based on a majority vote, where the machine-learning classifier output is in a plurality of machine-learning classifier outputs corresponding to respective EMG information and respective EOG information describing respective facial expressions.

In examples, provided is an apparatus configured to perform biosensor-based user authentication. The apparatus can include: (i) a processor and (ii) a memory communicatively coupled to the processor and storing instructions configured to cause the processor to perform a method. The method can include: (i) receiving user-specific biosignal information from electrodes, where the user-specific biosignal information includes electromyography (EMG) information and electrooculography (EOG) information describing at least one facial expression; (ii) extracting the EMG information and the EOG information by applying a bandpass filter to the user-specific biosignal information; (iii) extracting user-specific spatial and temporal representations from the EMG information and the EOG information by: (A) applying the EMG information and the EOG information to a trained biosignal-based multi-input convolutional neural network (CNN) and (B) applying an output of the CNN to a Long Short-Term Memory to produce the user-specific spatial and temporal representations; and (iv) applying the extracted user-specific spatial and temporal representations to a machine-learning classifier to produce a machine-learning classifier output indicating user authentication, where the machine-learning classifier is trained to identify the extracted user-specific spatial and temporal representations as authentic.

In examples, the memory can further store instructions configured to cause the processor to initiate, control, perform, or a combination thereof displaying at least one image of the at least one facial expression on a user display that is a constituent part of a helmet, a hat, a headset, a virtual reality headset, an augmented reality headset, earbuds, smart glasses, a wireless device, a computer monitor, or a combination thereof.

In examples, the user-specific biosignal information can be received from a helmet, a hat, a headset, a virtual reality headset, an augmented reality headset, earbuds, smart glasses, a wireless device, a computer monitor, or a combination thereof.

In examples, the at least one facial expression can be a constituent part of a prescribed sequence of pre-defined facial expressions.

In examples, the memory can further store instructions configured to cause the processor to: (i) provide, via a user-interface device, a user authentication request and (ii) restrict receipt of the user-specific biosignal information to a pre-determined time period following the providing the user authentication request.

In examples, the memory can further store instructions configured to cause the processor to perform a multi-factor authentication process, where the multi-factor authentication process uses the machine-learning classifier output to authenticate a user.

In examples, the output of the CNN can describe, using three-dimensional morphable model coefficients, a three-dimensional face mesh.

In examples, the memory can further store instructions configured to cause the processor to: (i) receive, from a user interface device and in response to a user prompt to perform at least one facial expression, an input describing authentic user-specific biosignal information and (ii) prepare a machine-learning classifier training dataset from the authentic user-specific biosignal information.

In examples, the memory can further store instructions configured to cause the processor to apply the plurality of machine-learning classifier outputs to a hard voting algorithm configured to produce a user authentication output based on a majority vote, where the machine-learning classifier output is in a plurality of machine-learning classifier outputs corresponding to respective EMG information and respective EOG information describing respective facial expressions.

In examples, provided is a computer-implemented method for performing biosensor-based user identification. At least a portion of the method can be performed by a computing device comprising at least one processor. In examples, the method can include: (i) receiving user-specific biosignal information from electrodes, wherein the user-specific biosignal information includes electromyography (EMG) information and electrooculography (EOG) information describing at least one facial expression; (ii) extracting the EMG information and the EOG information by applying a bandpass filter to the user-specific biosignal information; (iii) extracting user-specific spatial and temporal representations from the EMG information and the EOG information by: (A) applying the EMG information and the EOG information to a trained biosignal-based multi-input convolutional neural network (CNN) and (B) applying an output of the CNN to a Long Short-Term Memory to produce the user-specific spatial and temporal representations; and (iv) applying the extracted user-specific spatial and temporal representations to a machine-learning classifier to produce a machine-learning classifier output indicating a user identification, wherein the machine-learning classifier is trained to identify the extracted user-specific spatial and temporal representations as associated with a specific user.

In examples, the computer-implemented method can include displaying at least one image of the at least one facial expression on a user display that is a constituent part of: a helmet, a hat, a headset, a virtual reality headset, an augmented reality headset, earbuds, smart glasses, a wireless device, a computer monitor, or a combination thereof.

In examples, the user-specific biosignal information can be received from: a helmet, a hat, a headset, a virtual reality headset, an augmented reality headset, earbuds, smart glasses, a wireless device, a computer monitor, or a combination thereof.

In examples, at least one facial expression can be a constituent part of a prescribed sequence of pre-defined facial expressions.

In examples, the computer-implemented method can include: (i) providing, via a user-interface device, a user identification request and (ii) restricting receipt of the user-specific biosignal information to a pre-determined time period following the providing the user identification request.

In examples, the output of the CNN can describe, using three-dimensional morphable model coefficients, a three-dimensional face mesh.

In examples, the computer-implemented method can include: (i) receiving, from a user interface device and in response to a user prompt to perform at least one facial expression, an input describing user-specific biosignal information for a specific user and (ii) preparing a machine-learning classifier training dataset from the user-specific biosignal information for the specific user.

In examples, the machine-learning classifier output can be in a plurality of machine-learning classifier outputs corresponding to respective EMG information and respective EOG information describing respective facial expressions, the method further comprising applying the plurality of machine-learning classifier outputs to a soft voting algorithm configured to produce a user identification output based on an average of a probability distribution of possible outcomes.

In examples, the computer-implemented method can include enabling, in response to the machine-learning classifier output indicating a user identification, user access to otherwise restricted information.

In examples, provided is a non-transitory computer-readable medium, comprising processor-executable instructions stored thereon configured to cause a processor to perform: (i) receiving user-specific biosignal information from electrodes, wherein the user-specific biosignal information includes electromyography (EMG) information and electrooculography (EOG) information describing at least one facial expression; (ii) extracting the EMG information and the EOG information by applying a bandpass filter to the user-specific biosignal information; (iii) extracting user-specific spatial and temporal representations from the EMG information and the EOG information by: (A) applying the EMG information and the EOG information to a trained biosignal-based multi-input convolutional neural network (CNN) and (B) applying an output of the CNN to a Long Short-Term Memory to produce the user-specific spatial and temporal representations; and (iv) applying the extracted user-specific spatial and temporal representations to a machine-learning classifier to produce a machine-learning classifier output indicating a user identification, wherein the machine-learning classifier is trained to identify the extracted user-specific spatial and temporal representations as associated with a specific user.

In examples, the non-transitory computer-readable medium can include processor-executable instructions stored thereon configured to cause the processor to control displaying at least one image of the at least one facial expression on a user display that is a constituent part of a helmet, a hat, a headset, a virtual reality headset, an augmented reality headset, earbuds, smart glasses, a wireless device, a computer monitor, or a combination thereof.

In examples, the user-specific biosignal information is received from a helmet, a hat, a headset, a virtual reality headset, an augmented reality headset, earbuds, smart glasses, a wireless device, a computer monitor, or a combination thereof.

In examples, the at least one facial expression is a constituent part of a prescribed sequence of pre-defined facial expressions.

In examples, the non-transitory computer-readable medium can include processor-executable instructions stored thereon configured to cause the processor to: (i) provide, via a user-interface device, a user identification request and (ii) restrict receipt of the user-specific biosignal information to a pre-determined time period following the providing the user identification request.

In examples, the output of the CNN describes, using three-dimensional morphable model coefficients, a three-dimensional face mesh.

In examples, the non-transitory computer-readable medium can include processor-executable instructions stored thereon configured to cause the processor to: (i) receive, from a user interface device and in response to a user prompt to perform at least one facial expression, an input describing user-specific biosignal information for a specific user and (ii) prepare a machine-learning classifier training dataset from the user-specific biosignal information for the specific user.

In examples, the non-transitory computer-readable medium can include processor-executable instructions stored thereon configured to cause the processor to apply the plurality of machine-learning classifier outputs to a soft voting algorithm configured to produce a user identification output based on an average of a probability distribution of possible outcomes, where the machine-learning classifier output is in a plurality of machine-learning classifier outputs corresponding to respective EMG information and respective EOG information describing respective facial expressions.

In examples, the non-transitory computer-readable medium can include processor-executable instructions stored thereon configured to cause the processor to enable, in response to the machine-learning classifier output indicating a user identification, user access to otherwise restricted information.

In examples, provided is an apparatus configured to perform biosensor-based user identification. The apparatus can include: (i) a processor and (ii) a memory communicatively coupled to the processor. The memory can store instructions configured to cause the processor to perform a method including: (i) receiving user-specific biosignal information from electrodes, wherein the user-specific biosignal information includes electromyography (EMG) information and electrooculography (EOG) information describing at least one facial expression; (ii) extracting the EMG information and the EOG information by applying a bandpass filter to the user-specific biosignal information; (iii) extracting user-specific spatial and temporal representations from the EMG information and the EOG information by: (A) applying the EMG information and the EOG information to a trained biosignal-based multi-input convolutional neural network (CNN) and (B) applying an output of the CNN to a Long Short-Term Memory to produce the user-specific spatial and temporal representations; and (iv) applying the extracted user-specific spatial and temporal representations to a machine-learning classifier to produce a machine-learning classifier output indicating a user identification, wherein the machine-learning classifier is trained to identify the extracted user-specific spatial and temporal representations as associated with a specific user.

In some examples, the memory can further store instructions configured to cause the processor to control displaying at least one image of the at least one facial expression on a user display that is a constituent part of a helmet, a hat, a headset, a virtual reality headset, an augmented reality headset, earbuds, smart glasses, a wireless device, a computer monitor, or a combination thereof.

In some examples, the user-specific biosignal information can be received from a helmet, a hat, a headset, a virtual reality headset, an augmented reality headset, earbuds, smart glasses, a wireless device, a computer monitor, or a combination thereof.

In some examples, the at least one facial expression can be a constituent part of a prescribed sequence of pre-defined facial expressions.

In some examples, the memory can further store instructions configured to cause the processor to: (i) provide, via a user-interface device, a user identification request and (ii) restrict receipt of the user-specific biosignal information to a pre-determined time period following the providing the user identification request.

In some examples, the output of the CNN can describe, using three-dimensional morphable model coefficients, a three-dimensional face mesh.

In some examples, the memory can further store instructions configured to cause the processor to: (i) receive, from a user interface device and in response to a user prompt to perform at least one facial expression, an input describing user-specific biosignal information for a specific user and (ii) prepare a machine-learning classifier training dataset from the user-specific biosignal information for the specific user.

In some examples, the memory can further store instructions configured to cause the processor to apply the plurality of machine-learning classifier outputs to a soft voting algorithm configured to produce a user identification output based on an average of a probability distribution of possible outcomes, where the machine-learning classifier output is in a plurality of machine-learning classifier outputs corresponding to respective EMG information and respective EOG information describing respective facial expressions.

In some examples, the memory can further store instructions configured to cause the processor to enable, in response to the machine-learning classifier output indicating a user identification, user access to otherwise restricted information.

In some examples, provided is a computer-implemented method for processing biosensor information to produce multi-dimensional images of facial movement and expressions of a human user, comprising: (i) training a biosignal-based multi-input convolutional neural network to reconstruct two-dimensional facial landmarks using user-specific biosignal information received from electrodes and synchronized with face detection video; (ii) receiving post-training user-specific biosignal information from electrodes; (iii) filtering, using a bandpass filter, the post-training user-specific biosignal information; (iv) performing biosignal frame segmentation on the filtered post-training user-specific biosignal information; (v) creating reconstructed facial landmark information by applying the frame segmented and filtered post-training user-specific biosignal information to the trained biosignal-based multi-input convolutional neural network; (vi) performing, by applying a Kalman filter to the reconstructed facial landmark information, landmark smoothing of the reconstructed facial landmark information; and (vii) generating, by applying the landmark-smoothed reconstructed facial landmark information to a face learned with an articulated model and expressions model, a three-dimensional facial animation.

In some examples, provided is a non-transitory computer-readable medium, comprising processor-executable instructions stored thereon configured to cause a processor to perform at least a part of a method. In examples, the method can include: (i) training a biosignal-based multi-input convolutional neural network to reconstruct two-dimensional facial landmarks using user-specific biosignal information received from electrodes and synchronized with face detection video; (ii) receiving post-training user-specific biosignal information from electrodes; (iii) filtering, using a bandpass filter, the post-training user-specific biosignal information; (iv) performing biosignal frame segmentation on the filtered post-training user-specific biosignal information; (v) creating reconstructed facial landmark information by applying the frame segmented and filtered post-training user-specific biosignal information to the trained biosignal-based multi-input convolutional neural network; (vi) performing, by applying a Kalman filter to the reconstructed facial landmark information, landmark smoothing of the reconstructed facial landmark information; and (vii) generating, by applying the landmark-smoothed reconstructed facial landmark information to a face learned with an articulated model and expressions model, a three-dimensional facial animation.

In some examples, provided is a method for processing biosensor information to produce information describing human speech. In examples, the method can include: (i) training a biosignal-based multi-input convolutional neural network to reconstruct two-dimensional facial landmarks using user-specific biosignal information received from electrodes and synchronized with face detection video; (ii) receiving post-training user-specific biosignal information from electrodes; (iii) filtering, using a bandpass filter, the post-training user-specific biosignal information; (iv) performing biosignal frame segmentation on the filtered post-training user-specific biosignal information; (v) creating reconstructed facial landmark information by applying the frame segmented and filtered post-training user-specific biosignal information to the trained biosignal-based multi-input convolutional neural network; (vi) performing, by applying a Kalman filter to the reconstructed facial landmark information, landmark smoothing of the reconstructed facial landmark information; and (vii) producing, by applying the landmark-smoothed reconstructed facial landmark information to a trained machine learning model, information describing human speech.

In some examples, provided is a non-transitory computer-readable medium, comprising processor-executable instructions stored thereon configured to cause a processor to perform at least a part of a method. In examples, the method can include: (i) training a biosignal-based multi-input convolutional neural network to reconstruct two-dimensional facial landmarks using user-specific biosignal information received from electrodes and synchronized with face detection video; (ii) receiving post-training user-specific biosignal information from electrodes; (iii) filtering, using a bandpass filter, the post-training user-specific biosignal information; (iv) performing biosignal frame segmentation on the filtered post-training user-specific biosignal information; (v) creating reconstructed facial landmark information by applying the frame segmented and filtered post-training user-specific biosignal information to the trained biosignal-based multi-input convolutional neural network; (vii) performing, by applying a Kalman filter to the reconstructed facial landmark information, landmark smoothing of the reconstructed facial landmark information; and (viii) producing, by applying the landmark-smoothed reconstructed facial landmark information to a trained machine learning model, information describing human speech.

In some examples, provided is an apparatus configured to measure human facial movement and expressions of a human user to create biosensor information.

In some examples, at least the portion of the apparatus can be integrated with at least a part of a helmet, a hat, a headset, a virtual reality headset, an augmented reality headset, earbuds, smart glasses, a wireless device, a computer monitor, or a combination thereof.

BRIEF DESCRIPTION OF THE DRAWINGS

The accompanying drawings are presented to describe examples of the present teachings and are not limiting. Together with this following description, the drawings demonstrate and explain various principles of the present disclosure.

FIG. 2 depicts an example block diagram of an example method for processing biosensor information to produce multi-dimensional images of facial movement and expressions of a human user.

FIG. 3 depicts an example block diagram of an example method for processing biosensor information to produce information describing human speech.

FIG. 10 depicts example potential electrode placement locations.

FIG. 12 depicts example performance of example continuous facial landmark tracking for facial landmarks and facial features during testing of the provided systems, methods, and apparatuses.

FIG. 13 depicts an example table comparing results of example testing of the provided systems, methods, and apparatuses with other vision-based technologies.

FIG. 29 depicts an example block diagram of an example method for performing biosensor-based user authentication.

FIG. 30 depicts an example block diagram of an example method for performing biosensor-based user identification.

FIGS. 1-30, and text descriptions thereof, are nonlimiting. Each of the drawings is provided for illustration and description only and does not limit the present disclosure. In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

Figure 1A:
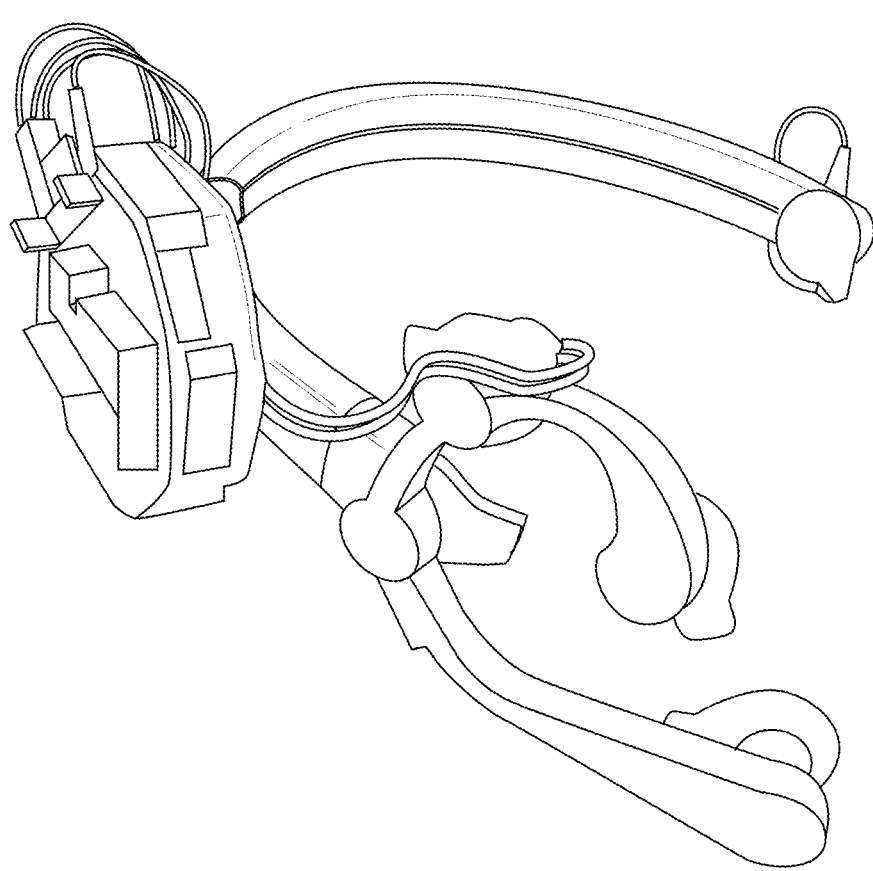
FIG. 1A depicts an example human-mounted biosensor headset suitable for implementing examples of the disclosed subject matter.

Provided are example methods and apparatuses that can measure human facial movement and expressions of a human user to create biosensor information. Also provided are example methods and apparatuses that can authenticate a user, identify a specific user, or combination thereof. Also provided are example methods and apparatuses that can process the biosensor information to produce multi-dimensional images of the facial movement and expressions of the human user. Also provided are example methods and apparatuses that can process the biosensor information to produce information describing human speech.

In examples, provided is a single-earpiece lightweight biosensing system that can unobtrusively, continuously, and reliably sense the entire facial movements, track 2D facial landmarks, and further render 3D facial animations. The single-earpiece biosensing system can take advantage of a cross-modal transfer learning model to transfer knowledge embodied in a high-grade visual facial landmark detection model to a low-grade biosignal domain. In some examples, after training, the provided systems and apparatus can directly perform continuous 3D facial reconstruction from the biosignals, without any visual input.

In examples, extensive experiments involving 16 participants under various settings demonstrate that examples of the provided apparatuses and methods can accurately track 53 major facial landmarks with only 1.85 mm average error and 3.38% normalized mean error, which is comparable with most state-of-the-art camera-based solutions. The rendered 3D facial animations, which are in consistency with the real human facial movements, also validate the system's capability in continuous 3D facial reconstruction.

Over the last decade, facial landmark tracking and 3D reconstruction have gained considerable attention due to their numerous applications such as human-computer interactions, facial expression analysis, and emotion recognition, etc. Traditional approaches require users to be confined to a particular location and face a camera under constrained recording conditions (e.g., without occlusions and under good lighting conditions). This highly restricted setting prevents them from being deployed in many application scenarios involving human motions. In this invention, the provided apparatus and methods propose the first single-earpiece lightweight biosensing system that can unobtrusively, continuously, and reliably sense the entire facial movements, track 2D facial landmarks, and further render 3D facial animations. Our single-earpiece biosensing system takes advantage of the cross-modal transfer learning model to transfer the knowledge embodied in a high-grade visual facial landmark detection model to the low-grade biosignal domain. After training, our system can directly perform continuous 3D facial reconstruction from the biosignals, without any visual input. Without requiring a camera positioned in front of the user, this paradigm shift from visual sensing to biosensing introduces new opportunities in many emerging mobile and IoT applications. Extensive experiments involving multiple participants under various settings demonstrate that our system can accurately track 53 major facial landmarks with only 1.85 mm average error and 3.38% normalized mean error, which is comparable with most state-of-the-art camera-based solutions. The rendered 3D facial animations, which are in consistency with the real human facial movements, also validate the provided apparatus and methods' capability to perform continuous 3D facial reconstruction. This paragraph describes non-limiting examples.

To address the previously unaddressed and long-felt industry needs for methods and apparatus that improve upon conventional methods and apparatus, provided are novel human-mounted biosensors apparatuses and new algorithms for processing biosensor information.

In some embodiments, systems and methods described herein can advantageously provide a paradigm shift from visual sensing to biosensing that advantageously introduces new opportunities in many emerging mobile device and IoT applications because the provided examples do not require a camera positioned in front of the user after the training process. In some embodiments, the systems and methods described herein are human-portable. In some examples, the systems and methods described herein are lightweight, human-portable, wearable by people during everyday human activities, and usable by people during everyday human activities. In some embodiments, systems and methods described herein can advantageously be used as a silent speech interface that can help people unable to create sound phonation needed for audible speech, such as after laryngectomies, to communicate, such as by using biosensor information to produce information describing human speech. In some embodiments, systems and methods described herein can advantageously place biosensors adjacent to a user's ear (e.g., a minimally-intrusive sensor placement, a minimum quantity of sensors, or both) to make the provided apparatus have a minimal impact on the user's mobility and comfort.

Numerous examples are disclosed in this application's text and drawings. Alternate examples can be devised without departing from the scope of this disclosure. Additionally, conventional elements of the current teachings may not be described in detail, or may be omitted, to avoid obscuring aspects of the current teachings.

The following list of abbreviations, acronyms, and terms in Table One is provided to assist in comprehending the current disclosure and are not provided as limitations.

TABLE ONE

List of Abbreviations

| Abbreviation | Definition |
| --- | --- |
| 1D | One-Dimensional |
| 2D | Two-Dimensional |
| 3D | Three-Dimensional |
| 3DMM | Three-Dimensional Morphable Model |
| 300-W | 300 Faces In-The-Wild Challenge |
| AR | Augmented Reality |
| AUC | Area Under Curve |
| CBAM | Convolutional Block Attention Module |
| CDF | Cumulative Density Function |
| CLM | Constrained Local Model |
| CNN | Convolutional Neural Network |
| DFT | Discrete Fourier Transform |
| EEG | Electroencephalogram |
| EMG | Electromyography |
| EOG | Electrooculogram |
| FLAME | Faces Learned with an Articulated Model and Expressions |
| FPR | False Positive Rate |
| HMM | Hidden Markov Model |
| HRNet | High-Resolution Network |
| Hz | Hertz |
| LSTM | Long Short-Term Memory |
| MAE | Mean Absolute Error |
| MCU | Main Control Unit |
| NME | Normalized Mean Error |
| PCA | Principal Component Analysis |
| ReLu | Rectified Linear Unit |
| RGB-D | Red Green Blue-Depth |
| ROC | Receiver Operating Curve |
| SMOTE | Synthetic Minority Over-sampling Technique |
| SNR | Signal-to-Noise Ratio |
| TDNN | Time-Delay Neural Network |
| TPR | True Positive Rate |
| VR | Virtual Reality |
| WFLW | Wider Facial Landmarks In-The-Wild |

Figure 1B:
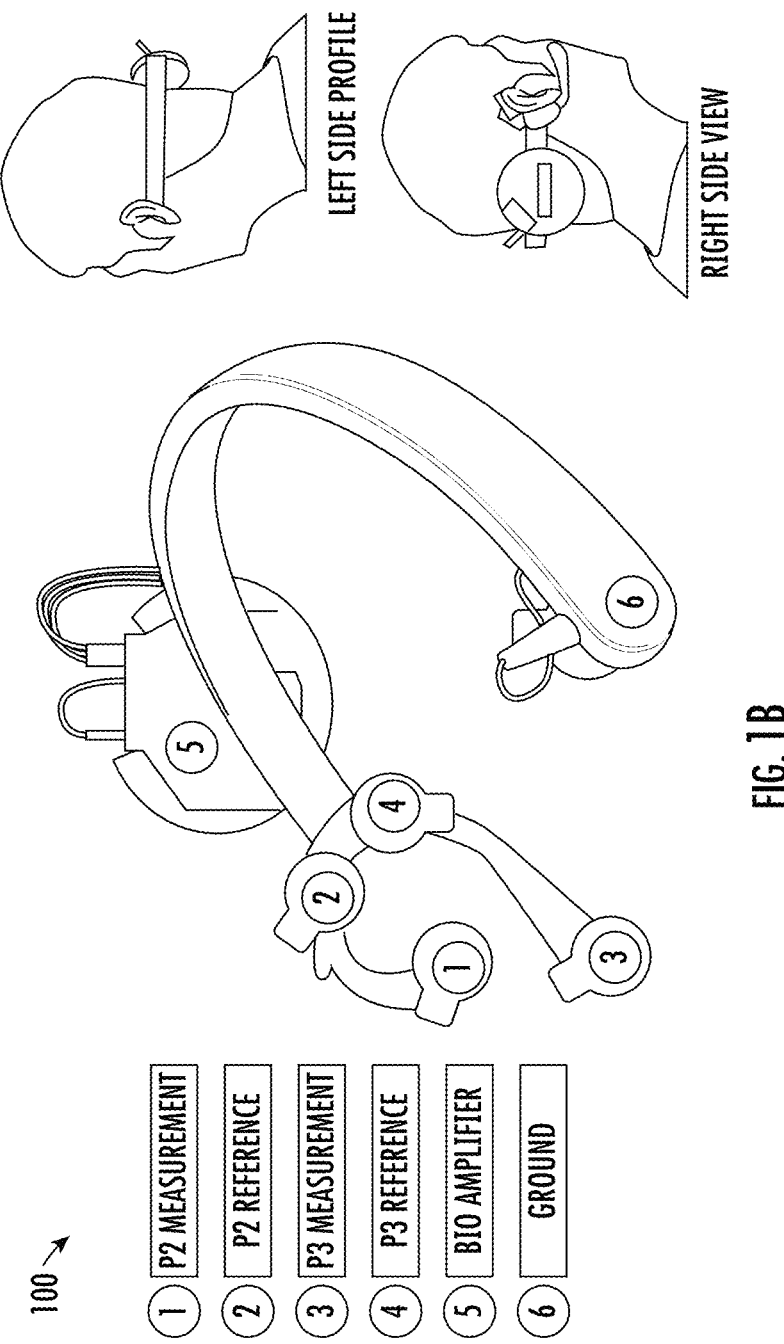
FIG. 1B depicts example human-mounted biosensor headset sensor locations suitable for implementing examples of the disclosed subject matter.
Figure 1C:
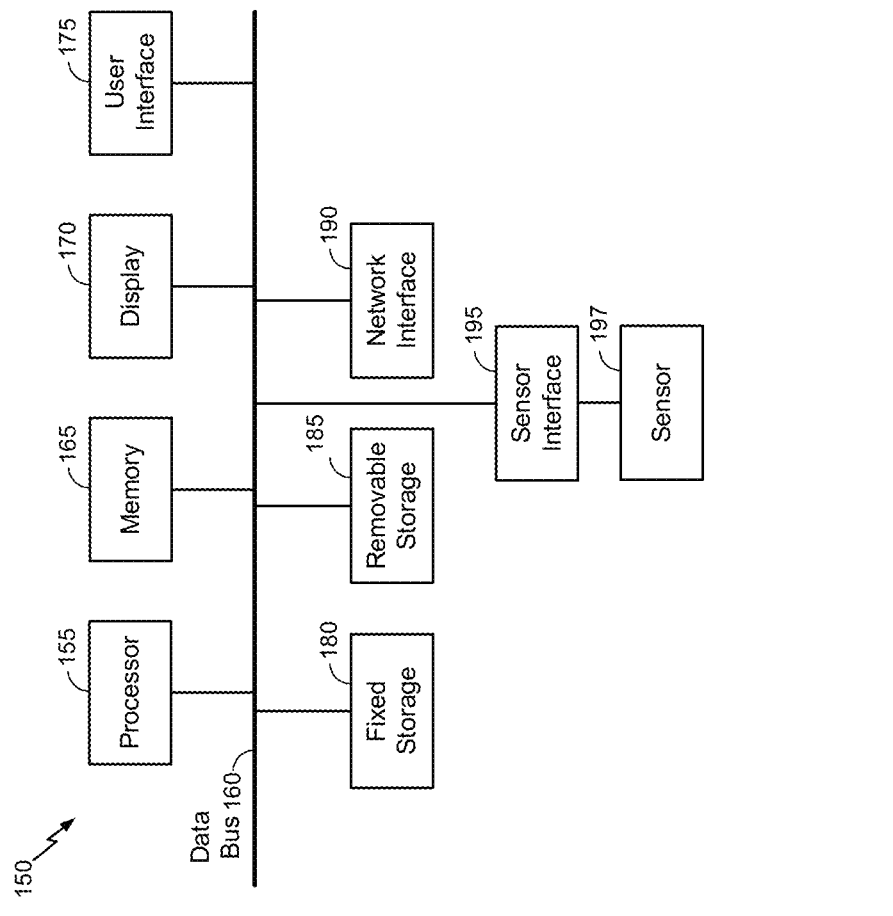
FIG. 1C depicts an example diagram of an example computing device suitable for implementing examples of the disclosed subject matter.

This description provides, with reference to FIGS. 1A-1C, detailed descriptions of example apparatus configured to measure human facial movement and expressions of a human user to create biosensor information. Detailed descriptions of example methods for processing biosensor information to produce multi-dimensional images of the facial movement and expressions of a human user are provided in connection with FIG. 2. Detailed descriptions of example methods for processing biosensor information to produce information describing human speech are provided in connection with FIG. 3. FIGS. 4-28 depict non-limiting aspects of example aspects of the provided apparatus and methods, as well as results of experiments relating to the apparatus and methods. Detailed descriptions of example methods for processing biosensor information to authenticate a user or not authenticate a user are provided in connection with FIG. 29. Detailed descriptions of example methods for processing biosensor information to identify a specific user of an electronic device in a group of potential users of the electronic device are provided in connection with FIG. 30.

FIGS. 1A-1B depict an example human-mounted biosensor headset 100 suitable for implementing examples of the disclosed subject matter. The headset 100 can include a frame, at least two sensors configured to measure at least one physical property of a human head, a processing unit (e.g., a controller, an amplifier), an output circuit (e.g., a wireless transmitter (e.g., WiFi, Bluetooth), or a combination thereof. FIG. 1B depicts example human-mounted biosensor headset sensor locations (e.g. electrode locations) on the headset 100 that are suitable for implementing examples of the disclosed subject matter.

FIG. 1C depicts an example diagram of an example computing device 150 suitable for implementing examples of the disclosed subject matter. For example, at least a portion of the computing device 150 can be suitable for use as a component part of the headset 100. In another example, at least a portion of the computing device 150 can be coupled to the headset 100.

In examples, aspects of the computing device 150 can be implemented at least in part in a desktop computer, a laptop computer, a server, a mobile device, a special-purpose computer, a non-generic computer, an electronic device described hereby (as is practicable), the like, or a combination thereof. In some examples, the disclosed subject matter can be implemented in, and used with, hardware devices, computer network devices, the like, or a combination thereof. The configuration depicted in FIG. 1C is an illustrative example and is not limiting.

In some examples, the computing device 150 can include a processor 155, a data bus 160, a memory 165, a display 170, a user interface 175, a fixed storage device 180, a removable storage device 185, a network interface 190, a sensor interface 195, a sensor 197, the like, or a combination thereof. These elements are described in further detail herein.

The processor 155 can be a hardware-implemented processing unit configured to control at least a portion of operation of the computing device 150. The processor 155 can perform logical and arithmetic operations based on processor-executable instructions stored within the memory 165. The processor 155 can be configured to execute instructions which cause the processor 155 to initiate at least a part of a method described hereby. In an example, the processor 155 can interpret instructions stored in the memory 165 to initiate at least a part of a method described hereby. In an example, the processor 155 can execute instructions stored in the memory 165 to initiate at least a part of a method described hereby. The instructions, when executed by the processor 155, can transform the processor 155 into a special-purpose processor that causes the processor to perform at least a part of a function described hereby. The processor 155 may also be referred to as a central processing unit (CPU), a special-purpose processor (e.g., a non-generic processor), or both.

In some examples, the computing device 150 can implement machine-learning techniques (e.g., using a Convolutional Neural Network (CNN), using a vision based high-resolution network, etc.) to collect information, process information, or both. In some examples, information stored in an information storage device of the computing device 150 can be transferred to another computing device 150 (or other type of computing device) and thus negate a need for another machine-learning training cycle.

The processor 155 can comprise or be a component of a physical processing system implemented with one or more processors. In some examples, the processor 155 can be implemented with at least a portion of: a microprocessor, a microcontroller, a digital signal processor (DSP) integrated circuit, a field programmable gate array (FPGA), a programmable logic device (PLD), an application-specific integrated circuit (ASIC), a controller, a state machine, a gated logic circuit, a discrete hardware component, a dedicated hardware finite state machine, a suitable physical device configured to manipulate information (e.g., calculating, logical operations, the like, or a combination thereof), the like, or a combination thereof.

The data bus 160 can couple components of the computing device 150. The data bus 160 can enable information communication between the processor 155 and one or more components coupled to the processor 155. In some examples, the data bus 160 can include a data bus, a power bus, a control signal bus, a status signal bus, the like, or a combination thereof. In an example, the components of the computing device 150 can be coupled together to communicate with each other using a different suitable mechanism.

The memory 165 generally represents any type or form of volatile storage device, non-volatile storage device, medium, the like, or a combination thereof. The memory 165 can store data, processor-readable instructions, the like, or a combination thereof. In an example, the memory 165 can store data, load data, maintain data, or a combination thereof. In an example, the memory 165 can store processor-readable instructions, load processor-readable instructions, maintain processor-readable instructions, or a combination thereof. In some embodiments, the memory 165 can store computer-readable instructions configured to cause a processor (e.g., the processor 155) to initiate performing at least a portion of a method described hereby. The memory 165 can be a main memory configured to store an operating system, an application program, the like, or a combination thereof. The memory 165 can store a basic input-output system (BIOS) which can control basic hardware operation such as interaction of the processor 155 with peripheral components. The memory 165 can also include a non-transitory machine-readable medium configured to store software. Software can mean any type of instructions, whether referred to as at least one of software, firmware, middleware, microcode, hardware description language, the like, or a combination thereof. Processor-readable instructions can include code (e.g., in source code format, in binary code format, executable code format, or in any other suitable code format).

The memory 165 can include at least one of read-only memory (ROM), random access memory (RAM), a flash memory, a cache memory, an erasable programmable read-only memory (EPROM), an electrically erasable programmable read-only memory (EEPROM), a register, a hard disk drive (HDD), a solid-state drive (SSD), an optical disk drive, other memory, the like, or a combination thereof that is configured to store information (e.g., data, processor-readable instructions, software, the like, or a combination thereof) and is configured to provide the information to the processor 155.

The display 170 can include a component configured to visually convey information to a user of the computing device 150. In examples, the display 170 can be a video display screen, such as a light-emitting diode (LED) screen, a touch screen, or both.

The user interface 175 can include user devices such as a switch, a keypad, a touch screen, a microphone, a speaker, an audio production device, a jack for coupling the computing device to an audio production device, the like, or a combination thereof. The user interface 175 can optionally include a user interface controller. The user interface 175 can include a component configured to convey information to a user of the computing device 150, a component configured to receive information from the user of the computing device 150, or both.

The fixed storage device 180 can include one or more hard drive, flash storage device, the like, or a combination thereof. The fixed storage device 180 can be an information storage device that is not configured to be removed during use. The fixed storage device 180 can optionally include a fixed storage device controller. The fixed storage device 180 can be integral with the computing device 150 or can be separate and accessed through an interface.

The removable storage device 185 can be integrated with the computing device 150 or can be separate and accessed through other interfaces. The removable storage device 185 can be an information storage device that is configured to be removed during use, such as a memory card, a jump drive, a flash storage device, an optical disk, the like, or a combination thereof. The removable storage device 185 can optionally include a removable storage device controller. The removable storage device 185 can be integrated with the computing device 150 or can be separate and accessed through an interface.

In examples, a computer-readable storage medium such as one or more of the memory 165, the fixed storage device 180, the removable storage device 185, a remote storage location, the like, or a combination thereof can store non-transitory computer-executable instructions configured to cause a processor (e.g., the processor 155) to implement at least an aspect of the present disclosure.

The network interface 190 can couple the processor 155 (e.g., via the data bus 160) to a network and enable exchanging information between the processor 155 and the network. In some examples, the network interface 190 can couple the processor 155 (e.g., via the data bus 160) to the network and enable exchanging information between the processor 155 and the sensor 197. For example, the network interface 190 can enable the processor 155 to communicate with one or more other network devices. The network interface 190 can couple to the network using any suitable technique and any suitable protocol. In some examples, the network interface 190 can include a data bus, a power bus, a control signal bus, a status signal bus, the like, or a combination thereof. Example techniques and protocols the network interface 190 can be configured to implement include digital cellular telephone, WiFi™, Bluetooth®, near-field communications (NFC), the like, or a combination thereof.

The network can couple the processor 155 to one or more other network devices. In some examples, the network can enable exchange of information between the processor 155 and the one or more other network devices. In some examples, the network can enable exchange of information between the processor 155 and the sensor 197. The network can include one or more private networks, local networks, wide-area networks, the Internet, other communication networks, the like, or a combination thereof. In some examples, the network can be a wired network, a wireless network, an optical network, the like, or a combination thereof.

In some embodiments, the network device can store computer-readable instructions configured to cause a processor (e.g., the processor 155) to initiate performing at least a portion of a method described hereby. In an example, the one or more other network devices can store non-transitory computer-executable instructions configured to cause a processor (e.g., the processor 155) to implement at least an aspect of the present disclosure. The non-transitory computer-executable instructions can be received by the processor 155 and implemented using at least a portion of techniques described hereby. In another example, information described hereby can be stored in the fixed storage device 180, the removable storage device 185, the network device, the like, or a combination thereof.

The network device can include the sensor 197, a hardware device configured to couple the network to the sensor 197, a server, a digital information storage device, the like, or a combination thereof.

In some examples, the network device can include user devices such as a switch, a keypad, a touch screen, a microphone, a speaker, an audio reproduction device, a jack for coupling the computing device to an audio reproduction device, the like, or a combination thereof. The network device can optionally include a user interface controller. The network device can include a component configured to convey information to a user of the computing device 150, a component configured to receive information from the user of the computing device 150, or both.

The sensor interface 195 can couple the processor 155 (e.g., via the data bus 160) to the sensor 197. In some examples, the sensor interface 195 can couple the processor 155 (e.g., via the data bus 160) to the sensor 197 and enable exchanging information between the processor 155 and the sensor 197. For example, the sensor interface 195 can enable the processor 155 to receive, from the sensor 197, analog information and/or digital information describing at least one characteristic of at least a portion of a human body. The sensor interface 195 can couple to the sensor 197 using any suitable technique and any suitable protocol. In some examples, the sensor interface 195 can perform analog-to-digital conversion, digital-to-analog conversion, or a combination thereof. In some examples, the sensor interface 195 can include a data bus, a power bus, a control signal bus, a status signal bus, the like, or a combination thereof. Example techniques and protocols the sensor interface 195 can be configured to implement include digital cellular telephone, WiFi™, Bluetooth®, near-field communications (NFC), the like, or a combination thereof.

The sensor 197 can sense a characteristic of at least a portion of a human body. In examples, the sensor 197 can produce an analog output indicating the at least one state, a digital output indicating the at least one state, or both. The sensor 197 can produce an output of the at least one state using any suitable technique, any suitable protocol, or both. In some examples, the sensor 197 can perform analog-to-digital conversion, digital-to-analog conversion, or a combination thereof. In some examples, the sensor 197 can include a data bus, a power bus, a control signal bus, a status signal bus, the like, or a combination thereof. Example techniques and protocols the sensor 197 can be configured to implement include digital cellular telephone, WiFi™, Bluetooth®, near-field communications (NFC), the like, or a combination thereof.

In examples, the sensor 197 can include a monocular camera, a stereo camera, an RGB-D camera, an electrode, a sensor described herein, a sensor configured to produce computer-processable data described herein, or combination thereof. In non-limiting examples, the sensor 197 can be an electrode, such as an electrode depicted in FIG. 1B as part of the headset 100. In nonlimiting examples, the sensor 197 can be a surface electrode configured to be placed in physical contact with at least a portion of a user's body and configured to capture EMG electrical signals, EOG electrical signals, or a combination thereof.

In some examples, all the components illustrated in FIG. 1C need not be present to practice the present disclosure. Further, the components can be coupled in different ways from those illustrated.

Overview of Example Methods

FIG. 2 depicts an example block diagram of an example method 200 for processing biosensor information to produce multi-dimensional images of facial movement and expressions of a human user. The method 200 can be performed at least in part by the apparatus described hereby, such as the headset 100 in FIGS. 1A-1B, the computing device 150 in FIG. 1C, or a practicable combination thereof. Additional aspects of the provided example methods are described herein. At least a portion of these additional aspects can be integrated with the method 200. The steps shown in FIG. 2 can be performed by any suitable computer-executable code, computing system, or a combination thereof. In some examples, each of the steps shown in FIG. 2 can represent an algorithm whose structure includes multiple substeps, is represented by multiple substeps, or a combination thereof, examples of which are provided in greater detail herein.

As depicted in FIG. 2, at step 205, one or more of the devices described herein can train a biosignal-based multi-input convolutional neural network to reconstruct two-dimensional facial landmarks using user-specific biosignal information received from electrodes and synchronized with face detection video.

As depicted in FIG. 2, at step 210, one or more of the devices described herein can receive post-training user-specific biosignal information from the electrodes.

In some examples, the method 200 can include receiving the post-training user-specific biosignal information from at least one of a helmet, a hat, a headset, a virtual reality headset, an augmented reality headset, earbuds, smart glasses, a wireless device, a computer monitor, or a combination thereof. In examples, the electrodes can be a constituent part of the helmet, the hat, the headset, the virtual reality headset, the augmented reality headset, the earbuds, the smart glasses, the wireless device, the computer monitor, or the combination thereof.

In examples, the method 200 can include filtering, using a bandpass filter, the post-training user-specific biosignal information.

As depicted in FIG. 2, at step 215, one or more of the devices described herein can perform biosignal frame segmentation on the post-training user-specific biosignal information, the filtered post-training user-specific biosignal information, or both.

As depicted in FIG. 2, at step 220, one or more of the devices described herein can create reconstructed facial landmark information by applying the frame segmented post-training user-specific biosignal information, the filtered post-training user-specific biosignal information, or both to the trained biosignal-based multi-input convolutional neural network.

As depicted in FIG. 2, at step 225, one or more of the devices described herein can perform landmark smoothing of the reconstructed facial landmark information. In examples, the landmark smoothing of the reconstructed facial landmark information can be performed by applying a Kalman filter to the reconstructed facial landmark information.

As depicted in FIG. 2, at step 230, one or more of the devices described herein can generate, by applying the landmark-smoothed reconstructed facial landmark information to a faces learned with an articulated model and expressions model, information describing a two-dimensional facial animation, information describing a three-dimensional facial animation, or a combination thereof. In examples, the information describing the two-dimensional facial animation, the information describing the three-dimensional facial animation, or the combination thereof can be a constituent part of an output to a user interface device.

FIG. 3 depicts an example block diagram of an example method 300 for processing biosensor information to produce information describing human speech. The method 300 can be performed at least in part by the apparatus described hereby, such as the headset 100 in FIGS. 1A-1B, the computing device 150 in FIG. 1C, or a practicable combination thereof. Additional aspects of the provided example methods are described herein. At least a portion of these additional aspects can be integrated with the method 300.

As depicted in FIG. 3, at step 305, one or more of the devices described herein can train a biosignal-based multi-input convolutional neural network to reconstruct two-dimensional facial landmarks using user-specific biosignal information received from electrodes and synchronized with face detection video.

As depicted in FIG. 3, at step 310, one or more of the devices described herein can receive post-training user-specific biosignal information from the electrodes.

In some examples, the method 300 can include receiving the post-training user-specific biosignal information from at least one of a helmet, a hat, a headset, a virtual reality headset, an augmented reality headset, earbuds, smart glasses, a wireless device, a computer monitor, or a combination thereof. In examples, the electrodes can be a constituent part of the helmet, the hat, the headset, the virtual reality headset, the augmented reality headset, the earbuds, the smart glasses, the wireless device, the computer monitor, or the combination thereof.

In examples, the method 300 can include filtering, using a bandpass filter, the post-training user-specific biosignal information.

As depicted in FIG. 3, at step 315, one or more of the devices described herein can perform biosignal frame segmentation on the post-training user-specific biosignal information, the filtered post-training user-specific biosignal information, or both.

As depicted in FIG. 3, at step 320, one or more of the devices described herein can create reconstructed facial landmark information by applying the frame segmented post-training user-specific biosignal information, the filtered post-training user-specific biosignal information, or both to the trained biosignal-based multi-input convolutional neural network.

As depicted in FIG. 3, at step 325, one or more of the devices described herein can perform landmark smoothing of the reconstructed facial landmark information. In examples, the landmark smoothing of the reconstructed facial landmark information can be performed by applying a Kalman filter to the reconstructed facial landmark information.

As depicted in FIG. 3, at step 330, one or more of the devices described herein can produce, by applying the landmark-smoothed reconstructed facial landmark information to a trained machine learning model, information describing human speech. In examples, the information describing the human speech can be a constituent part of an output from the one or more of the devices described herein. In examples, the information describing the human speech can be output to a user interface device.

Figure 4:
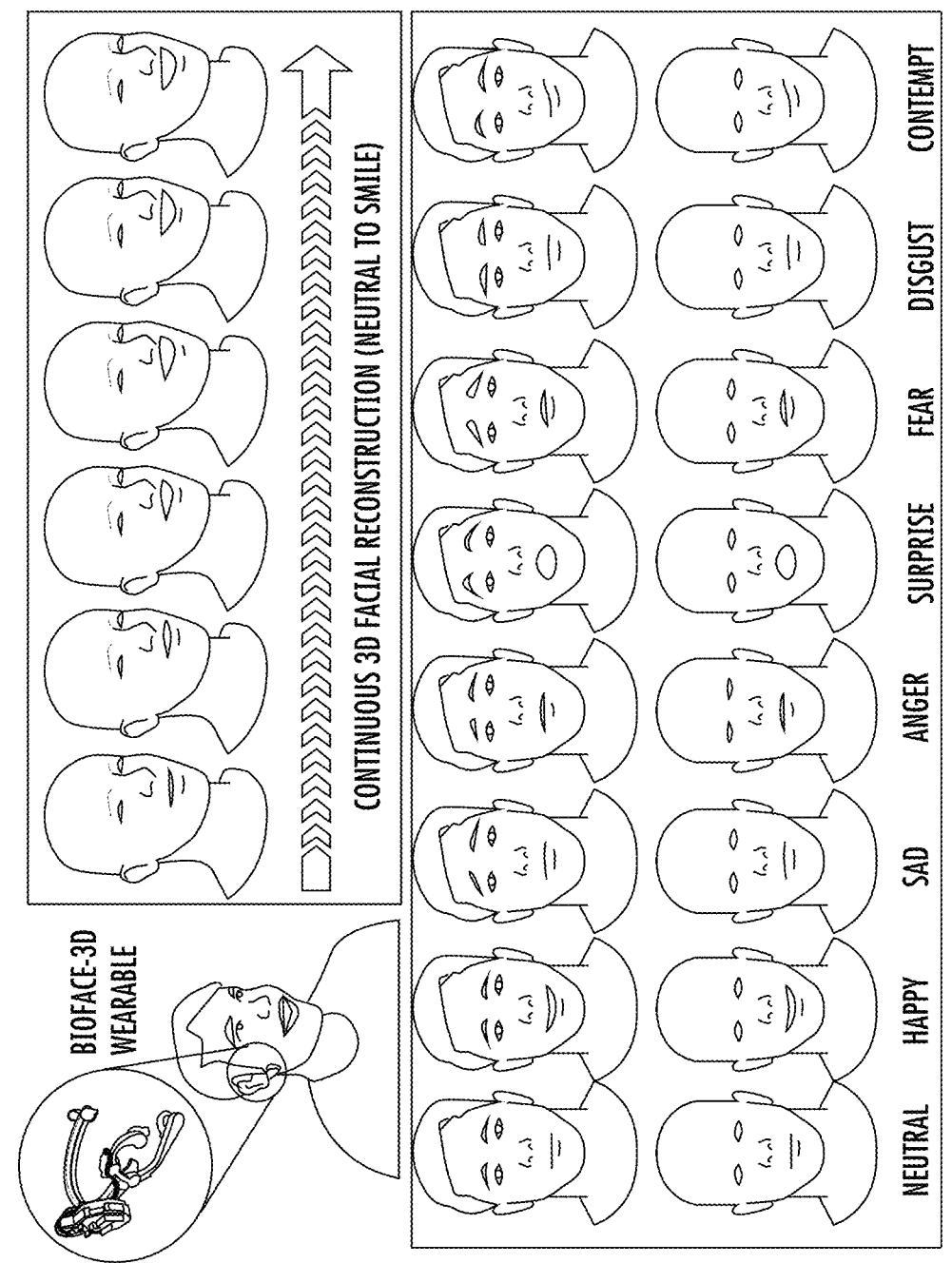
FIG. 4 depicts example reconstructed three-dimensional facial avatars with various facial expressions.

FIG. 4 depicts example reconstructed three-dimensional facial avatars 400 with various facial expressions. In examples, the three-dimensional facial avatars 400 can be produced using the apparatus provided herein and the methods provided herein.

Figure 5:
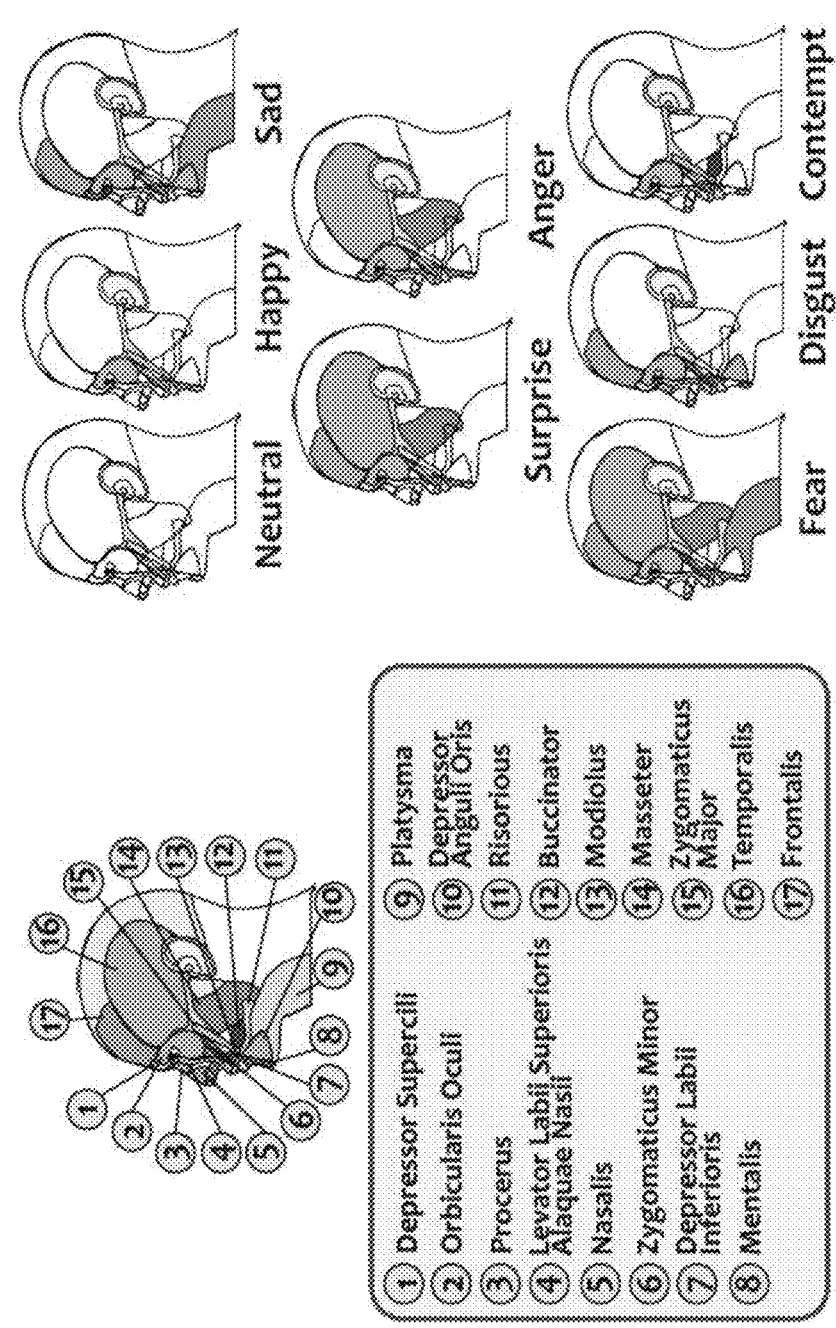
FIG. 5 depicts examples of facial muscles, descriptions thereof, and example activated facial muscles during example expressions.

FIG. 5 depicts examples of facial muscles, descriptions thereof, and example activated facial muscles during example expressions 500. Part (a) of FIG. 5 depicts locations of important facial muscles. Part (b) of FIG. 5 depicts facial muscles that are activated during facial expressions by a user.

Figure 6:
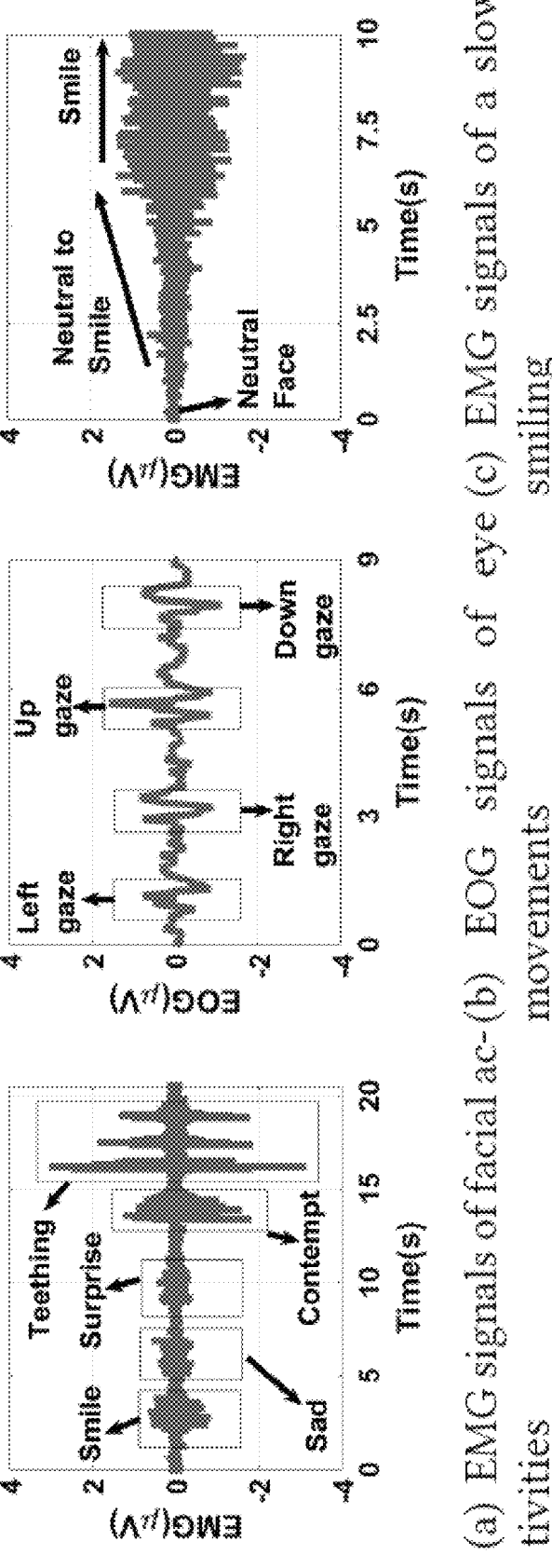
FIG. 6 depicts example biosignals collected from a side of masseter around ears.

FIG. 6 depicts example biosignals collected from a side of masseter around ears 600 of user. Part (a) of FIG. 6 depicts example EMG signals of facial activities. In this example, the facial activities include a smile, a facial expression of sadness, a facial expression of surprise, a facial expression of contempt, and a facial expression of teething. These facial expressions and the related example EMG signals are nonlimiting. Part (b) of FIG. 6 depicts example EOG signals of eye movements. The eye movements include a left gaze, a right gaze, an up gaze, and a down gaze. These eye movements and the related EOG signals are nonlimiting. Part (c) of FIG. 6 depicts example EMG signals of a facial expression including a slow smile. These facial expressions and the related example EMG signals are nonlimiting.

Figure 7:
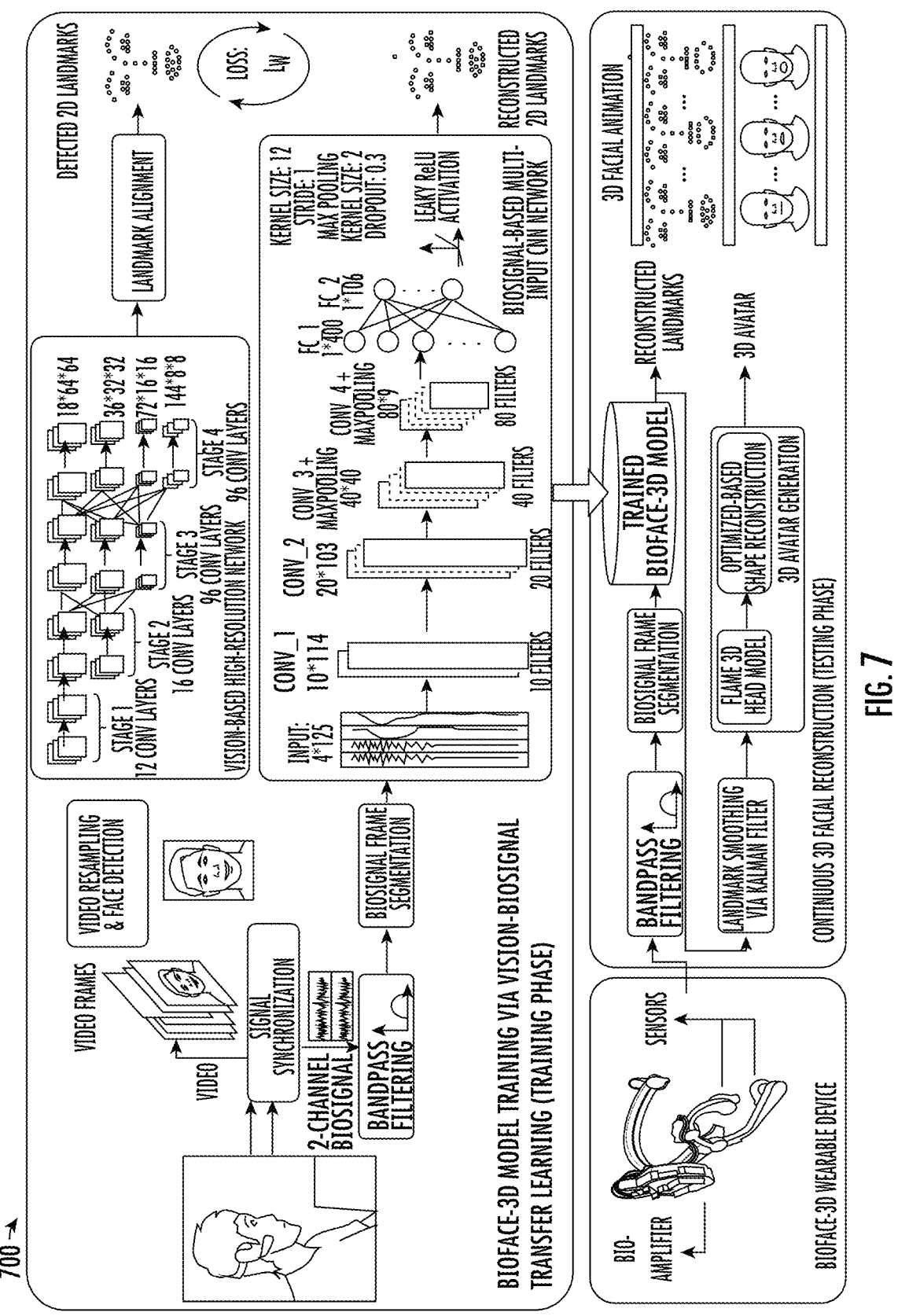
FIG. 7 depicts an example overview of an example of the provided systems and apparatuses.

FIG. 7 depicts an example overview of an example of the provided systems and apparatuses 700. As shown in FIG. 7, in examples, the proposed methods and apparatus have at least two phases: a training phase in which the system uses the biosignals and visual information in a supervised manner to learn the real-time behavioral mapping from a biosignal stream to facial landmarks, and the testing phase where the well-trained biosignal network can work independently to perform continuous 3D facial reconstruction, such as without any visual input. Specifically, during training, the provided systems and apparatus collect visual and biosignal streams using an off-the-shelf camera (e.g., a laptop's built-in camera) and the headset 100, respectively. The provided apparatus and methods then perform Signal Synchronization to ensure the synchronization between the streamed biosignal and the video frames. After that, the visual and biosignal streams are separately processed.

Visual Stream in Training. Video Resampling can be performed to make the recorded videos from different camera types to be resampled in a uniform frame rate, which allows the vision network to take any visual input regardless of its actual frame rate in recording. Next, the provided apparatus and methods perform Face Detection for each video frame, and crop the frame to only preserve the detected face. The cropped image frames are then fed into the pre-trained Vision-based High-resolution Network for 2D facial landmarks detection. Furthermore, the provided apparatus and systems employ Landmark Alignment to eliminate the effect caused by head poses (i.e., scale, rotation, and translation). The detected 2D facial landmarks can then be transformed into a uniformly aligned coordinate space, which will serve as the ground truth to guide the training of the biosignal network. Please note that the choice of the vision based model can be adjusted to suit the particular demands of the applications.

Biosignal Stream in Training. The provided apparatus and systems can collect two biosignal streams from the biosensors integrated into the headset 100. Each biosignal stream can be first processed to obtain both EOG and EMG biosignal streams via Bandpass Filtering. The provided apparatus and methods can then apply Biosignal Frame Segmentation to segment the filtered biosignal stream into frames, each corresponding to a re-sampled video frame. The signal segments can then be fed into Biosignal-based Multi-input CNN Network to reconstruct 2D facial landmarks. To transfer knowledge from the vision network into the biosignal domain, the provided apparatus and methods can utilize the Wing loss to enhance attention of the landmarks which are important but less active (e.g., pupils) and to help the biosignal network learn an accurate spatial mapping between biosignals and facial landmarks.

Biosignal Stream in Testing to Continuously Reconstruct 3D Faces. During testing, the biosignal stream first passes through the same pre-processing procedures in training. Then the fine-tuned biosignal network can continuously reconstruct 2D facial landmarks from the biosignal stream, without any visual input. To ensure a fluent 3D avatar animation, the provided apparatus and methods can then apply Landmark Smoothing via Kalman Filter to stabilize the facial landmark movement across successive frames. Next, the provided apparatus and methods can generate 3D facial animation from the stabilized landmarks using a FLAME (Faces Learned with an Articulated Model and Expressions) model. The generated sequence of fitted head models can then be used for rendering a 3D facial animation that recovers the user's facial movements.

Biosignal-based facial landmark reconstruction via knowledge transfer. This section describes an example of the detailed training procedure and the designed knowledge transfer learning network across multiple sensing modalities (i.e., vision and biosignals).

Signal Synchronization. To synchronize the two modalities' data streams, a user can tap the earpiece of the headset 100 near the bottom measurement sensor at the beginning of the training phase. This way, a sharp and sizeable peak will be generated in the biosignal stream due to the skin-electrode contact variation, while such an event can also be tracked in the video stream with quantifiable accuracy (e.g., through detecting a user's hand using a pre-trained hand key point detection model). To detect such a peak in the biosignal stream, the provided apparatus and methods implement a z-score peak transformation algorithm, which can calculate if any data point of the biosignal stream deviates from a moving average by a given threshold t. In an example implementation, the provided apparatus and methods use a moving window size of 40 milliseconds across all users, which can be sufficient to detect the signal peak caused by the finger tap.

Data Pre-processing—Visual Stream—Video Resampling & Face Detection. To make the provided apparatus compatible with various recording devices of different frame rates, the provided apparatus and methods first down sample the recorded video to a uniform frame rate, which can also reduce the computational cost for real-time facial reconstruction while maintaining the fluency of the video. Specifically, the provided apparatus and methods only keep some of the frames equally distributed in the video buffer, and the timestamps of these frames are then re-scaled to the new time base. After resampling, the provided apparatus and methods apply a pre-trained Haar Cascade Classifier, which provides high accuracy in object detection under varied lighting conditions, to each down sampled video frame for face detection. To meet the required input size of the following vision network, the provided apparatus and methods then make the detected face centered, crop the corresponding square area, and resize the cropped frame (e.g., to 256×256 pixels).

Data Pre-processing—Biosignal Stream—Bandpass Filtering & Biosignal Frame Segmentation. On the biosignal side, the provided apparatus and methods first apply two band-pass filters to extract the main structure of the bioelectrical signals, i.e., EMG and EOG bioelectrical signals. Moreover, in order to transfer knowledge from the vision-based facial landmark detection model into the biosignal modality, the provided apparatus and methods need to match the visual input (i.e., resampled video frames) with the time-series biosignal input. To match with each video frame, the provided apparatus and methods segment the biosignal streams (i.e., both EMG and EOG signals) into overlapped short frames starting at each video frame's timestamp. In an example, the length of each biosignal frame can be set in a manner that creates overlapped data samples between adjacent biosignal frames, as well as sufficient data for the CNN network. This setting makes the subsequent transfer learning model better capture the temporal dynamics and dependencies among continuous biosignal streams to ensure smooth frame transitions in the rendered animation.

Figure 8:
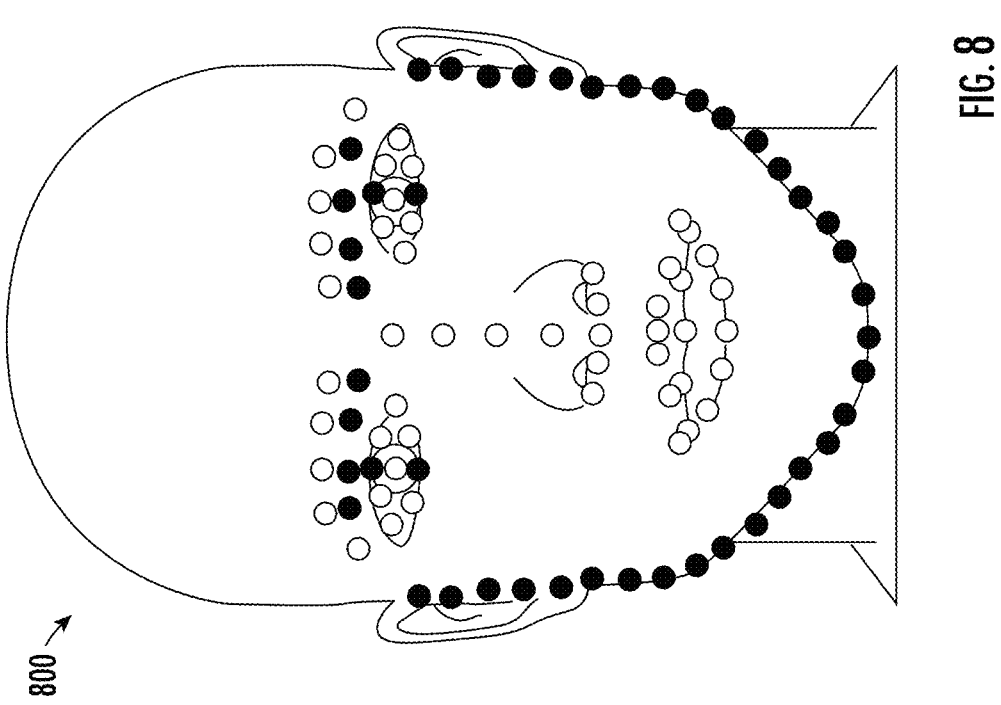
FIG. 8 depicts examples of major facial landmarks that can be used by the provided systems, methods, and apparatuses.

Data Pre-processing—Vision-based High-resolution Network. Conventional image-processing networks for facial landmark detection either rely on low-resolution features built by gradually reducing the size of the feature maps (e.g., TCNN), or utilize a 2-stage high-to-low and low-to high process to first extract low-resolution features and then rebuild high resolution features through deconvolution and unpooling operations (e.g., encoder-decoder). However, the important spatial and semantic information embedded in the initial high-resolution features might be lost during this process and can be hard to recover. To address this and improve the recognition accuracy, the provided apparatus and methods can use a high-resolution network (HRNet) which maintains high-resolution through the process. As shown in FIG. 7, the network can include four stages, in which low-resolution convolution streams are added gradually during the training process. Specifically, the first stage only has a single high resolution (e.g. 64×64) stream with 12 convolutional layers, and a depth set to 18. The subsequent stages decrease the resolution to 12 of the resolution of the previous stage and double its depth. Stage 2 adds a lower resolution stream and the number of layers can be increased to 16, while Stage 3 and Stage 4 handle more streams in parallel using 96 convolutional layers, with 16×16 and 8×8 resolution, respectively. Each stage can process a number of convolution streams with different resolutions in parallel. At the end of each stage, information can be exchanged among different resolutions via repeated multi-resolution fusions, where low-resolution representations can be up-sampled and concatenated with the high-resolution representation. Specifically, the provided apparatus and methods can use a pre-trained model on the WFLW dataset, which has a total of 98 landmarks, as shown in FIG. 8. To reduce computational complexity, the provided apparatus and methods can keep 53 landmarks that cover major facial components such as eyes, eyebrows, nose, and mouth. The output of the vision-based facial landmark detection network can provide biosignal modality with transferable knowledge for training the biosignal network.

Data Pre-processing—Landmark Alignment The detected landmark positions can be impacted by large head pose variations caused by head motions, facing directions, and camera angles and positions. To eliminate the impact of these irrelevant factors, the provided apparatus and methods attempt to obtain a canonical alignment of the face based on affine transformations including translation, rotation, and scaling. With three fixed landmarks' coordinates and the coordinates before alignment, the provided apparatus and methods can derive all the unknown entries in an affine matrix by solving a set of six-variable linear equations. The provided apparatus and methods can then align all the remaining facial landmarks.

Biosignal-based CNN Network During the training of the biosignal network, the provided apparatus and methods take the aligned 2D facial landmarks from the vision network as ground truth and train a 1D CNN network to regress the facial landmarks directly from four channels of time-series biosignals (i.e., two EMG and two EOG streams). Other network architectures (e.g., TDNN and LSTM) may also work, but 1D CNN can be more suitable for end-to-end learning of raw time-series data and has lower computational cost. Specifically, given the default sampling rate of the biosignal fs=250 Hz and the length of each biosignal frame I=0.5 s, the input size of the biosignal network can be 4×125. The output of the network can be the 2D coordinates of 53 facial landmarks. As shown in FIG. 7, a network can have four 1D convolutional layers and two fully-connected layers. Additionally, the number of filters can be doubled when the network is processed to the subsequent convolutional layer, which can be initially set to 10. Two max-pooling layers can be added to the last two convolutional layers to obtain a more compressed feature map.

Data Pre-processing—Loss Function. Training the learning model (e.g. the CNN) can minimize designed loss functions to decrease in error between predicted landmark positions and the corresponding ground truths. As landmark position loss treats each individual landmark independently, some important but less active landmarks, such as pupils compared with lips, may not achieve good attention during training because all the landmarks share an equal weight. To address this issue, the provided apparatus and method can adopt the wing loss function. In examples, the small range errors would obtain more attention when training a regression network, thereby significantly improving the network training capability for the small-scale error landmarks.

Data Pre-processing—Optimization. In addition, the network can be trained using an Adam optimizer, with the learning rate set to 0.1 with a decay of 0.9 every 10 epochs. The stride and dilation can be set to 1, and each layer can have a dropout rate of 0.3 to avoid overfitting.

In examples, the provided apparatus and methods have a well-trained biosignal network that takes as input each pre-processed biosignal frame to reconstruct 2D facial landmarks. Then, a Kalman filter and a 3D head model are used to stabilize landmarks and generate 3D facial animation, respectively.

Landmark Smoothing via Kalman Filter. The reconstructed facial landmarks that are regressed directly from the biosignal network can be inevitably jittery, which can be caused by instability of the network as well as noise introduced in the biosignal. To smooth the reconstructed 2D facial landmarks over time, the provided apparatus and methods can use a Kalman filter to stabilize the landmark outputs. In examples, the provided apparatus and methods can calculate an average standard deviation of all mouth-related landmarks as the evaluation metric to validate the effectiveness of the Kalman filter. Specifically, in examples, the provided apparatus and methods can select 4 minutes of reconstructed landmarks in which the user repeatedly performs the surprise expression. In addition to the Kalman filter, the provided apparatus and methods also implement a simple linear interpolation technique, in which the average of each adjacent frame pair can be compensated between them. Specifically, in un-limiting examples, the average standard deviation of all mouth-related landmarks can be 8.66 if no smoothing techniques are applied, 8.61 when simple linear interpolation is utilized, and 7.73 when the Kalman filter is implemented. The results demonstrate the effectiveness of the Kalman filter on landmark smoothing.

3D Avatar Generation. To improve system usability and reduce modeling complexity, the provided apparatus and methods can use a compact head model that can be easily fitted to data while preserving enough details to generate expressive facial animations.

3D Avatar Generation—FLAME 3D Head Model. The FLAME (Faces Learned with an Articulated Model and Expressions) model is a statistical 3D head model that uses a learned shape space of identity variation and articulated jaw, neck, and eyeballs to achieve accurate, expressive, and computationally efficient 3D face modeling. The model can be based on linear blend skinning and corrective blend-shapes, and contains 5023 vertices and 4 rotary joints (neck, jaw, and eyeballs). The model can be composed of a template mesh of a neutral pose, shape blendshapes, pose blendshapes, and expression blendshapes, which are used to account for variations caused by identity, pose deformation, and facial expressions, respectively.

3D Avatar Generation—Optimization-based Shape Reconstruction. To generate a 3D head model that reflects the user's facial movements and expressions, the provided apparatus and methods can use a 2-stage optimization process to fit the generic 3D head model to the 2D landmarks extracted from biosignals. In the first stage, the provided apparatus and methods conduct camera calibration by optimizing the parameters for rigid transformation, including scale, rotation, and translation, to minimize the L2 distance between the landmarks and the corresponding 3D head model vertices projected into the 2D space. In the second stage, the provided apparatus and methods optimize the model parameters (e.g., pose, shape, and expression) by optimizing the L2 distance while regularizing the shape coefficients, pose coefficients (including neck, jaw, and eyeballs), and expression coefficients by penalizing their L2 norms. After optimization, the provided apparatus and methods can generate a 3D head model that recovers the user's facial expressions. In examples, the provided apparatus and methods can generate an avatar based on a generic head model that captures the user's facial movements, rather than reconstruct user-specific facial details (e.g., including pores and moles).

Figure 21:
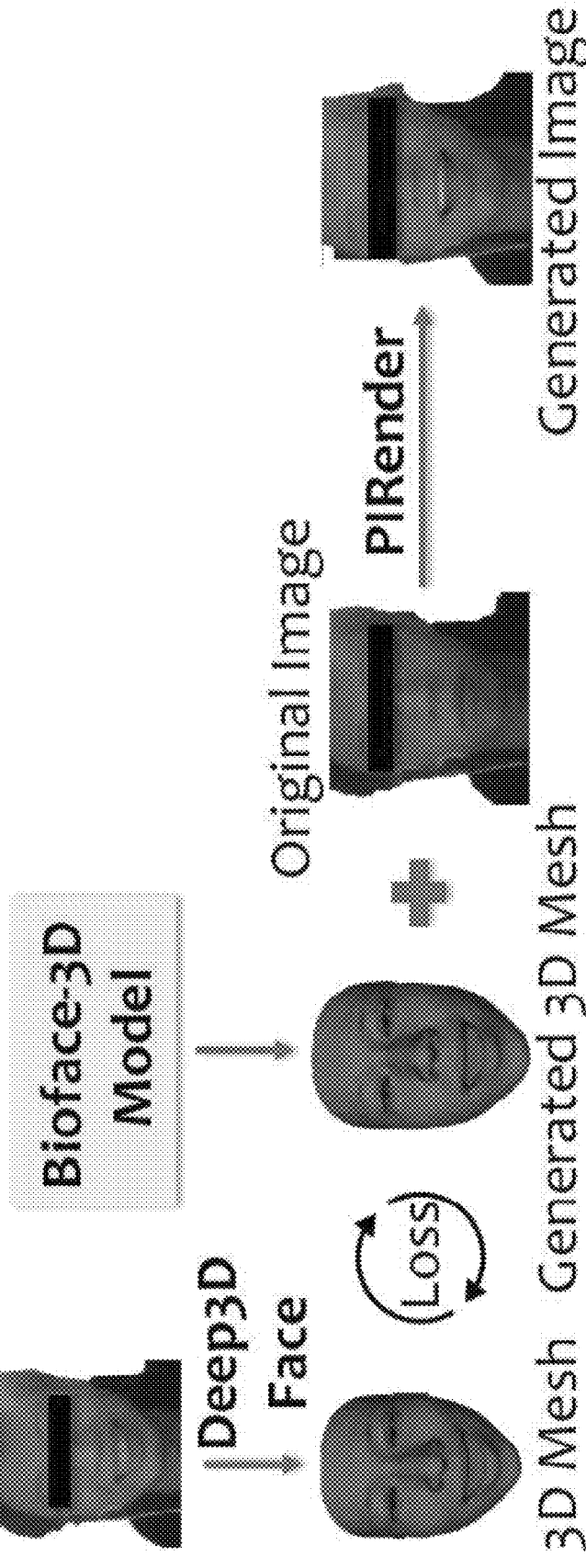
FIG. 21 depicts an example overview of photo-realistic animation generation.

Photo-realistic Animation Generation. FLAME can use a generic head model that lacks detailed features and awareness of the user's face. Consequently, the provided apparatus and methods can provide users with an additional option to generate personalized, photo-realistic animations that incorporate specific facial details instead of the generic 3D animation. Specifically, instead of 2D facial landmarks, the provided apparatus and methods change the output of the biosignal-based CNN network to 3D face meshes, which are represented using 3D Morphable Model (3DMM) coefficients. As depicted in FIG. 21, different from sparse 2D landmarks, 3D face meshes capture a more densely detailed geometry and preserve personalized facial features. The provided apparatus and methods can use Deep3DFace to extract 3DMM coefficients from facial images as the groundtruth. Deep3DFace could be considered as a modified ResNet-50 network, where the size of the last fully-connected layer has been adapted to 239. This layer can be structured to represent 3DMM coefficients representing identity, expression, texture, pose, and lighting of the input facial image. The provided apparatus and methods therefore change the final fully-connected layer of the biosignal-based 1DCNN network to 239, and use L2 loss to reconstruct the 3DMM coefficients.

As illustrated in FIG. 21, the reconstructed 3DMM coefficients can be further combined with an arbitrary photo of the user to synthesize the photo-realistic animation. The provided apparatus and methods can utilize Portrait Image Neural Renderer (PIRenderer), another pre-trained deep learning model that utilizes 3DMM coefficients to manipulate facial expressions and motions in arbitrary facial images. PIRenderer can be composed of three sub-networks: a mapping network that maps the 3DMM coefficients to a latent vector; a warping network that estimates the difference between the input facial image and the desired facial expressions based on the latent vector, and generates coarse results through wrapping the input image with the estimated deformations; and an editing network which refines the coarse results and produces the final photorealistic images. The generated image in FIG. 21 captures the intended facial expression while retaining the individual's personalized facial details. We now turn to FIG. 8.

FIG. 8 depicts an examples of major facial landmarks 800 that can be used by the provided systems, methods, and apparatuses. FIG. 8 also depicts landmarks in the WFLW dataset. The WFLW dataset has 98 landmarks in total.

Figure 9:
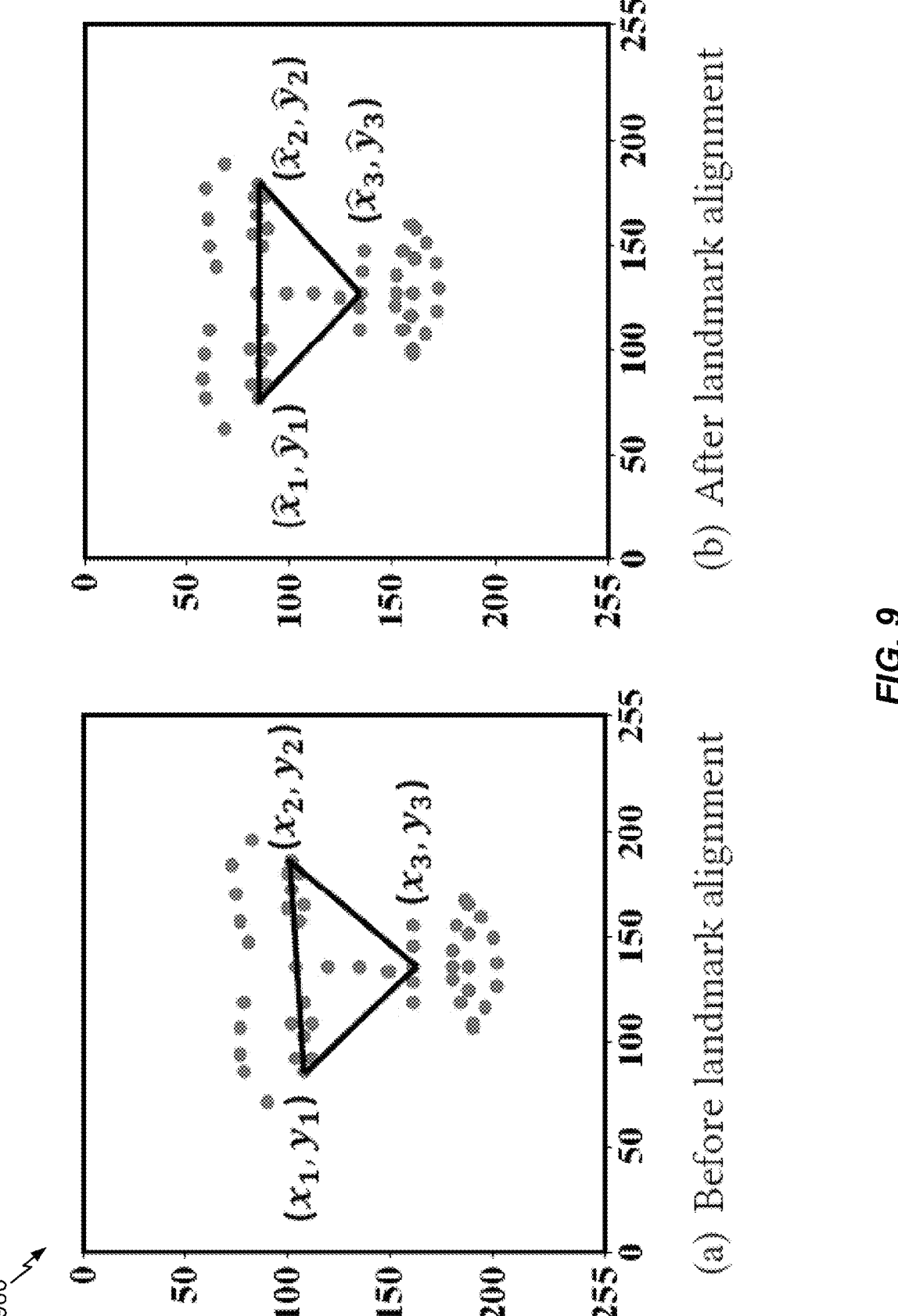
FIG. 9 depicts an example of facial landmark alignment.

FIG. 9 depicts an example of facial landmark alignment 900. Part (a) of FIG. 9 depicts an example of information describing facial landmarks prior to performing at least one landmark alignment method to obtain information describing a canonical alignment of facial landmarks. The landmark alignment method can include affine transformations such as translation, rotation, scaling, or a combination thereof. Part (b) of FIG. 9 depicts an example of facial landmark alignment following performing at least one landmark alignment method to obtain a canonical alignment of facial landmarks.

FIG. 10 depicts example potential electrode placement locations 1000. In examples, the headset 100 can be configured to place an electrode on a surface of a user's skin in at least one potential electrode placement location (e.g., P1-P6) depicted in FIG. 10. Each of the example locations P1-P6 correspond with a respective facial muscle described in reference to FIG. 5. Placement of an electrode on the surface of the user's skin in at least one of these potential electrode placement locations can enable the electrode to detect EMG signals, EOG signals, or a combination of, relating to the respective facial muscle.

Figure 11:
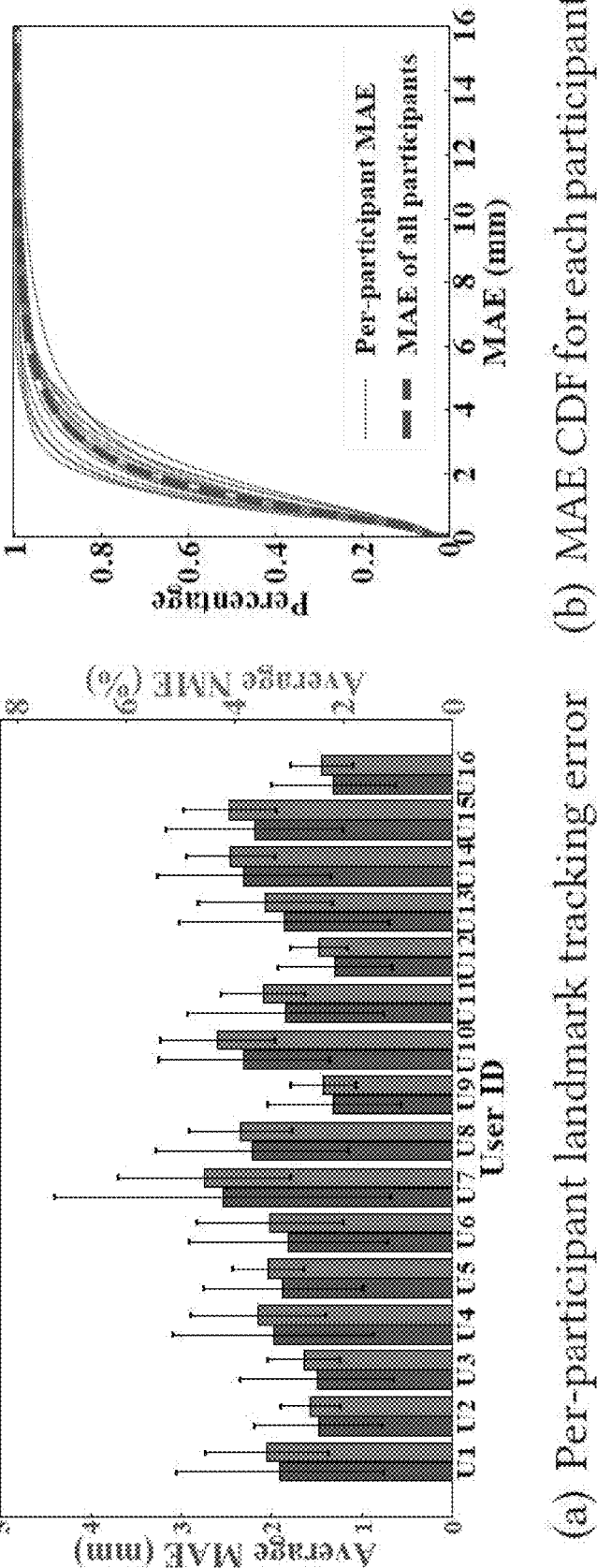
FIG. 11 depicts example performance of example continuous facial landmark tracking for participants during testing of the provided systems, methods, and apparatuses.

FIG. 11 depicts example performance of example continuous facial landmark tracking for participants 1100 during testing of the provided systems, methods, and apparatuses. Part (a) of FIG. 11 depicts an example of per-participant landmark tracking error. Part (b) of FIG. 11 depicts an example of a MAE CDF for each participant.

FIG. 12 depicts example performance of example continuous facial landmark tracking for facial landmarks and facial features 1200 during testing of the provided systems, methods, and apparatuses. Part (a) of FIG. 12 depicts an example visualization of an average MAE. Part (b) of FIG. 12 depicts an example CDF for facial features, including eyebrows, nose, eye rims, mouth, and pupils.

FIG. 13 depicts an example table comparing results 1300 of example testing of the provided systems, methods, and apparatuses with other vision-based technologies. FIG. 13 describes the vision-based technology, respective datasets to which the vision-based technologies are applied, a respective number of landmarks, and a NME resulting from applying the vision-based technologies to the respective datasets.

Figure 14:
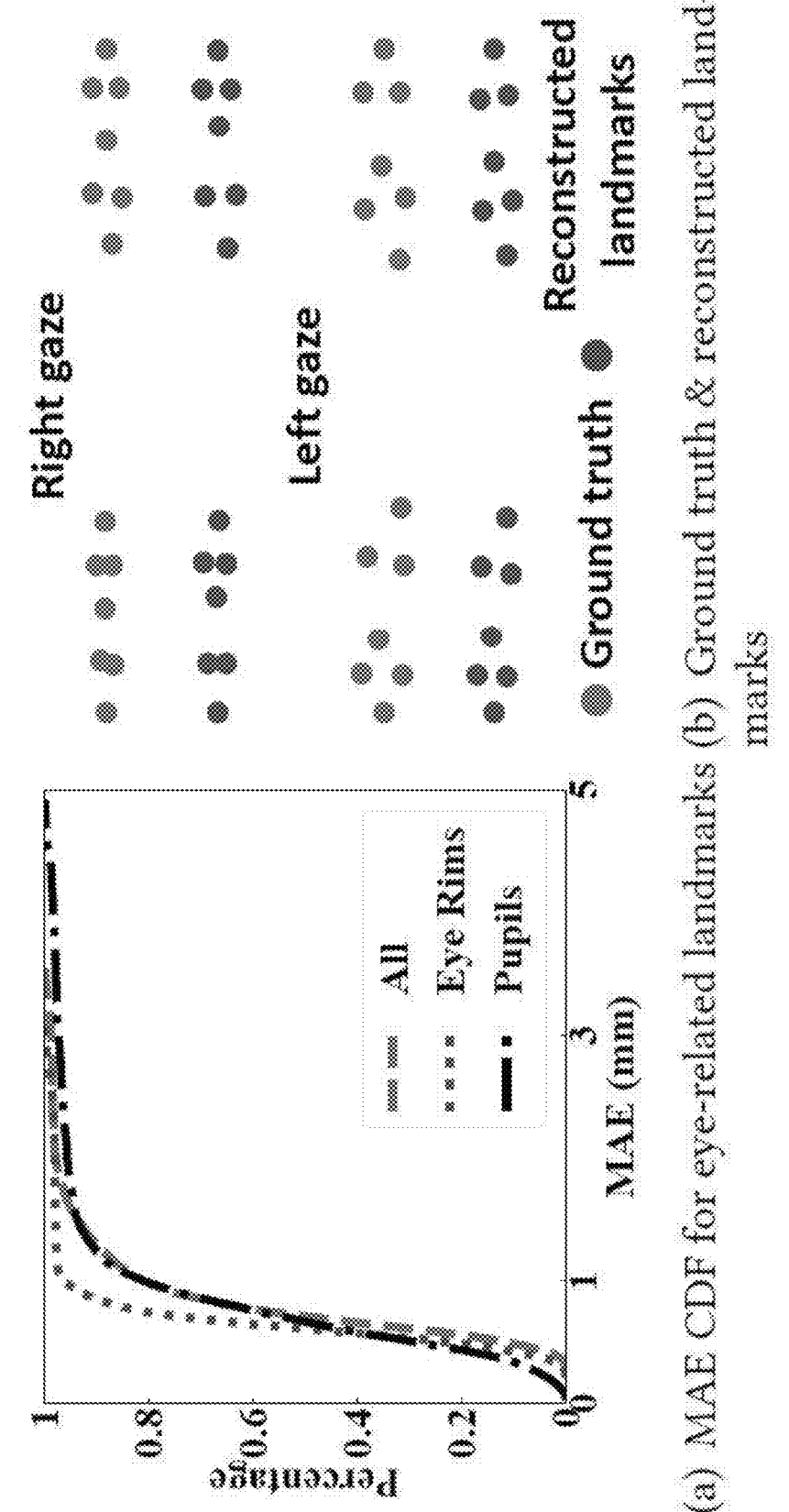
FIG. 14 depicts example performance of continuous eye tracking produced by example testing of the provided systems, methods, and apparatuses.

FIG. 14 depicts example performance of continuous eye tracking 1400 produced by example testing of the provided systems, methods, and apparatuses. Part (a) of FIG. 14 depicts MAE CDF for eye-related landmarks. Part (b) of FIG. 14 depicts example ground truth and reconstructed landmarks for right gaze and left gaze in an experiment to evaluate performance of gaze tracking.

Figure 15:
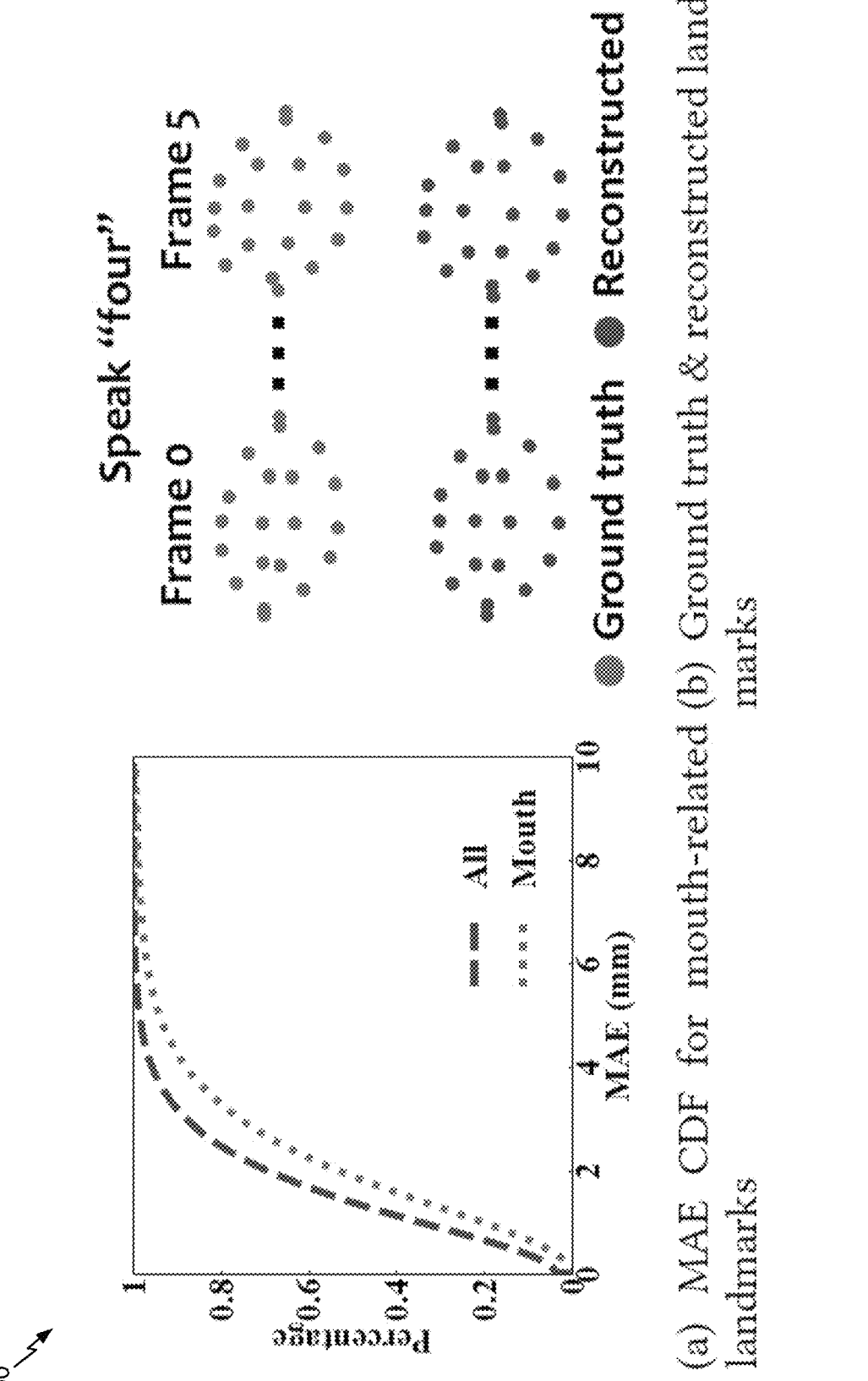
FIG. 15 depicts example performance of continuous mouth movement tracking while a user is speaking, as produced by example testing of the provided systems, methods, and apparatuses.

FIG. 15 depicts example performance of continuous mouth movement tracking while a user is speaking 1500, as produced by example testing of the provided systems, methods, and apparatuses. Part (a) of FIG. 15 depicts MAE CDF for mouth-related landmarks. Part (b) of FIG. 15 depicts example ground truth and reconstructed landmarks for an experiment in which a user spoke the number "four" to evaluate performance of facial landmark tracking during speaking.

Figure 16:
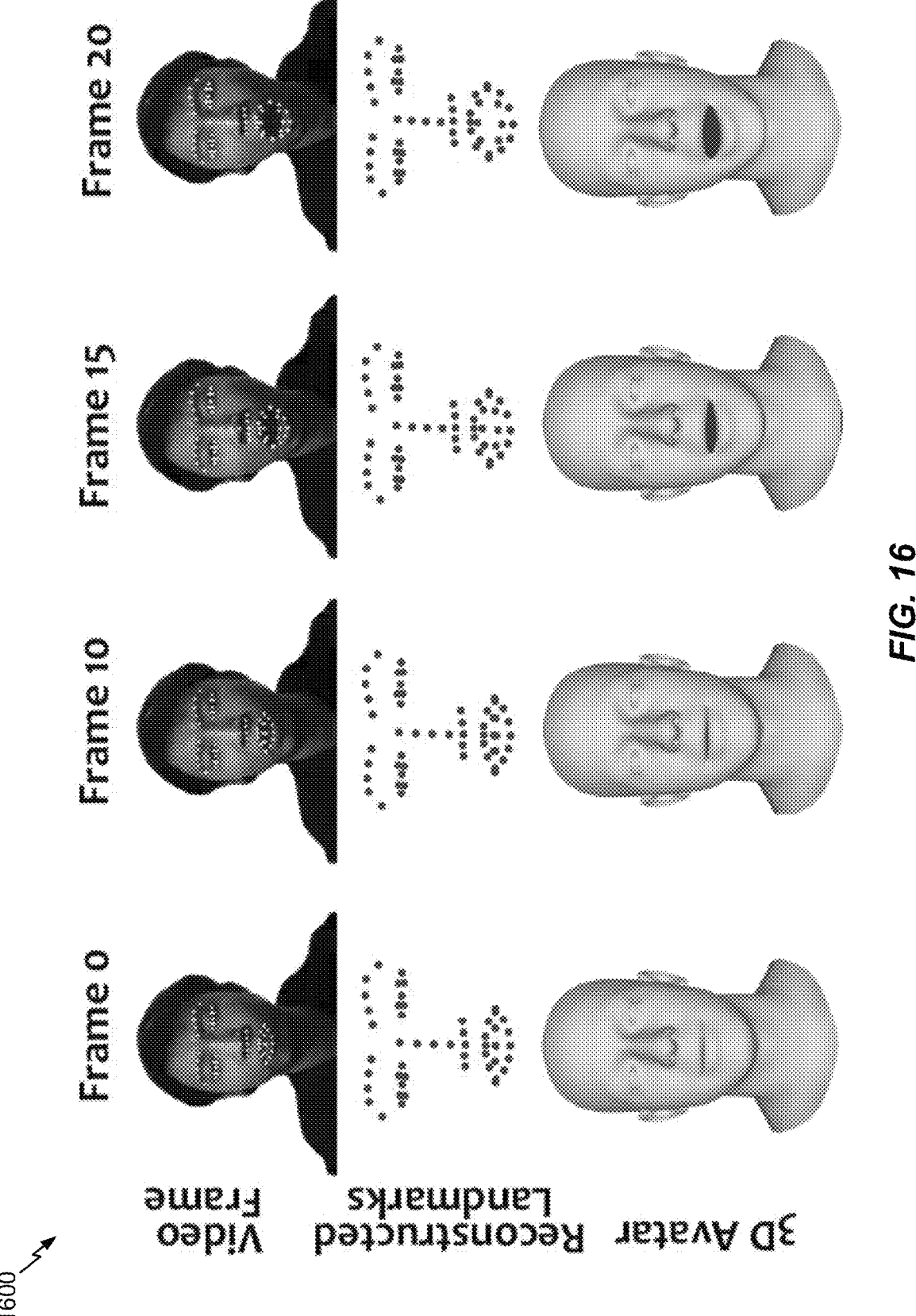
FIG. 16 depicts an example of rendered facial animation, as produced by example testing of the provided systems, methods, and apparatuses.

FIG. 16 depicts an example of rendered facial animation 1600, as produced by example testing of the provided systems, methods, and apparatuses. The rendered facial animation 1600 is an example of photo-realistic animation generation produced from 3DMM coefficients that represent an image of a face. The facial landmarks described herein can be converted to 3DMM coefficients. The 3DMM coefficients can be visualized as a 3D mesh from which a photo-realistic image can be synthesized using a neural rendering model.

Figure 17:
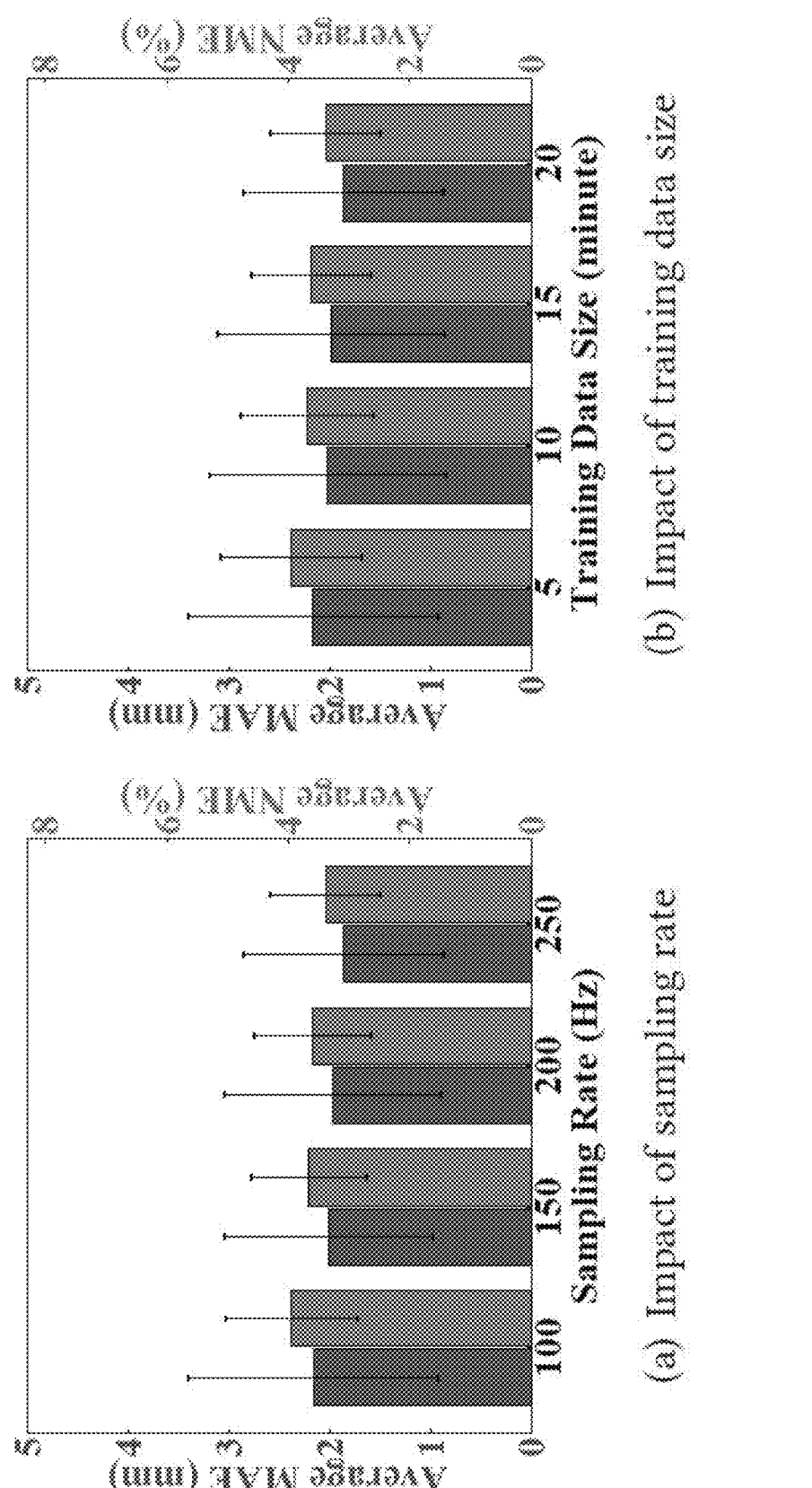
FIG. 17 depicts example performance of facial landmark tracking with different sampling rates and training data sizes, as produced by example testing of the provided systems, methods, and apparatuses.

FIG. 17 depicts example performance of facial landmark tracking with different sampling rates and training data sizes 1700, as produced by example testing of the provided systems, methods, and apparatuses. Part (a) of FIG. 17 depicts an example impact of a biosensor sampling rate on an average MAE and an average NME. Part (b) of FIG. 17 depicts an impact of training data size on an average MAE and an average NME.

Figure 18:
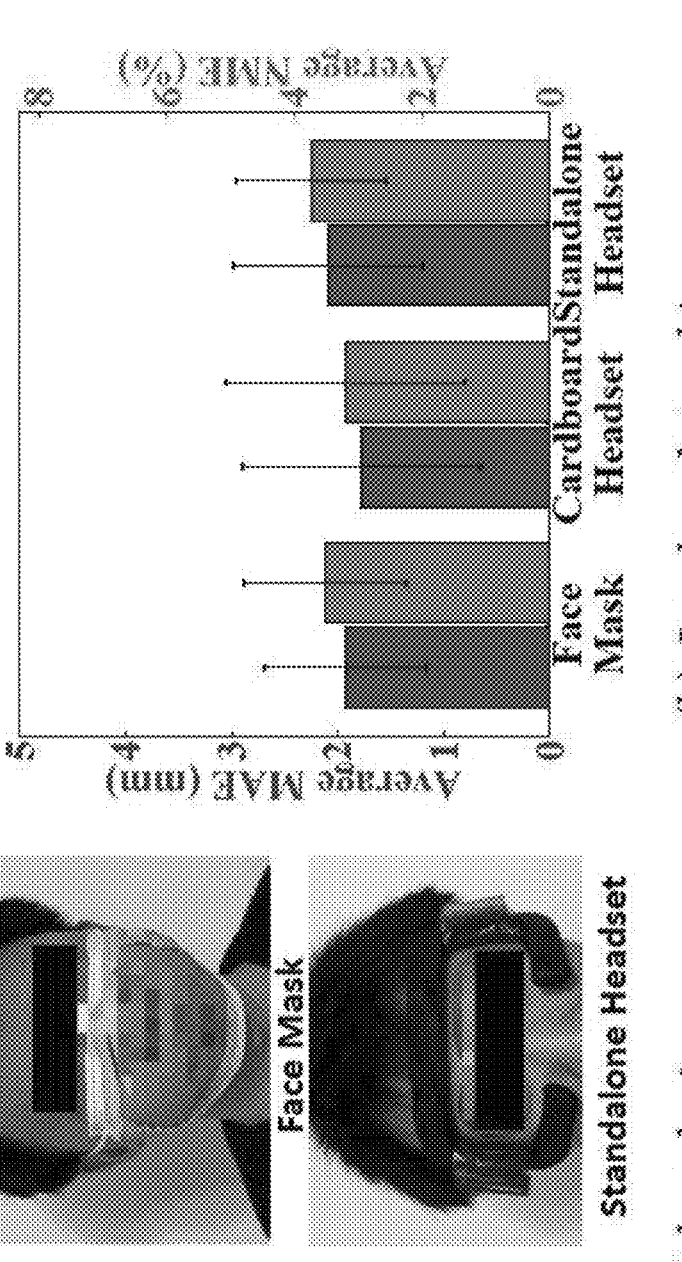
FIG. 18 depicts example performance of continuous facial landmark tracking under a presence of facial occlusions, as produced by example testing of the provided systems, methods, and apparatuses.

FIG. 18 depicts example performance of continuous facial landmark tracking under a presence of facial occlusions 1800, as produced by example testing of the provided systems, methods, and apparatuses. Part (a) of FIG. 18 depicts examples of different facial occlusions, such as a facemask, a cardboard headset, and a standalone headset. Part (b) of FIG. 18 depicts examples of landmark tracking error, including average MAE and average NME in the presence of the facial occlusions depicted in part (a).

Figure 19:
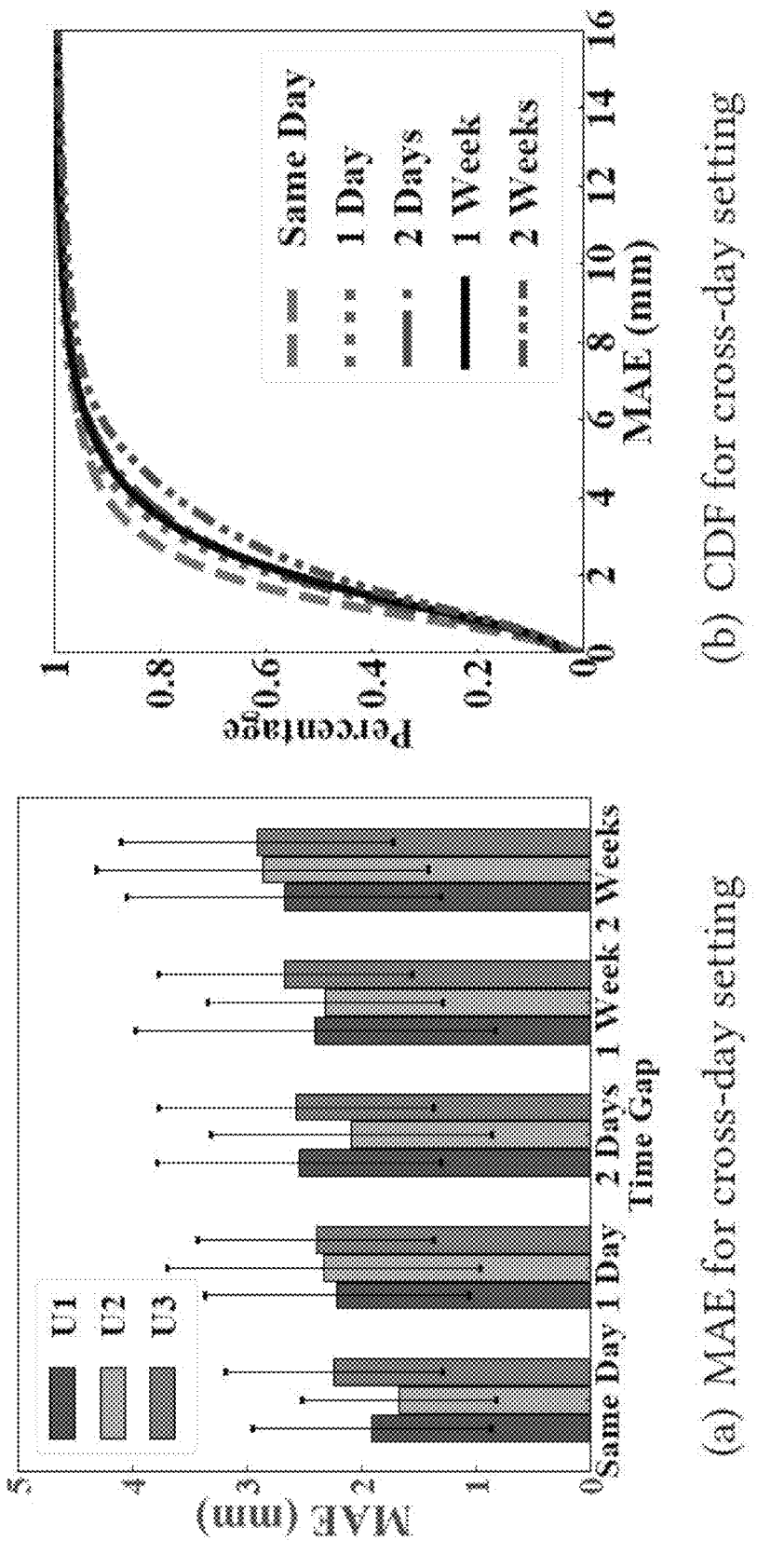
FIG. 19 depicts example performance of landmark tracking over time, as produced by example testing of the provided systems, methods, and apparatuses.

FIG. 19 depicts example performance of landmark tracking over time 1900, as produced by example testing of the provided systems, methods, and apparatuses. In some examples, sensor measurement can be influenced by a day-by-day change of the users' body status, uncontrollable impurities on the skin surface, and the sensor displacement as the electrodes may not be worn in exactly the same way over time. As time passes by, impacts on measurements can thus possibly become more serious and therefore affect the sensor measurements at a greater scale. Thus, experiments were undertaken to identify example MAE and example CDF over periods of time. Part (a) of FIG. 5 depicts an example MAE for cross-day settings for three example users. Cross-day settings in this example include a same-day setting, a one-day setting, a two-day setting, a one-week setting, and a three-week setting. Part (b) of FIG. 5 depicts an example CDF for a cross-day setting. Cross-day settings in this example include a same-day setting, a one-day setting, a two-day setting, a one-week setting, and a three-week setting.

Figure 20:
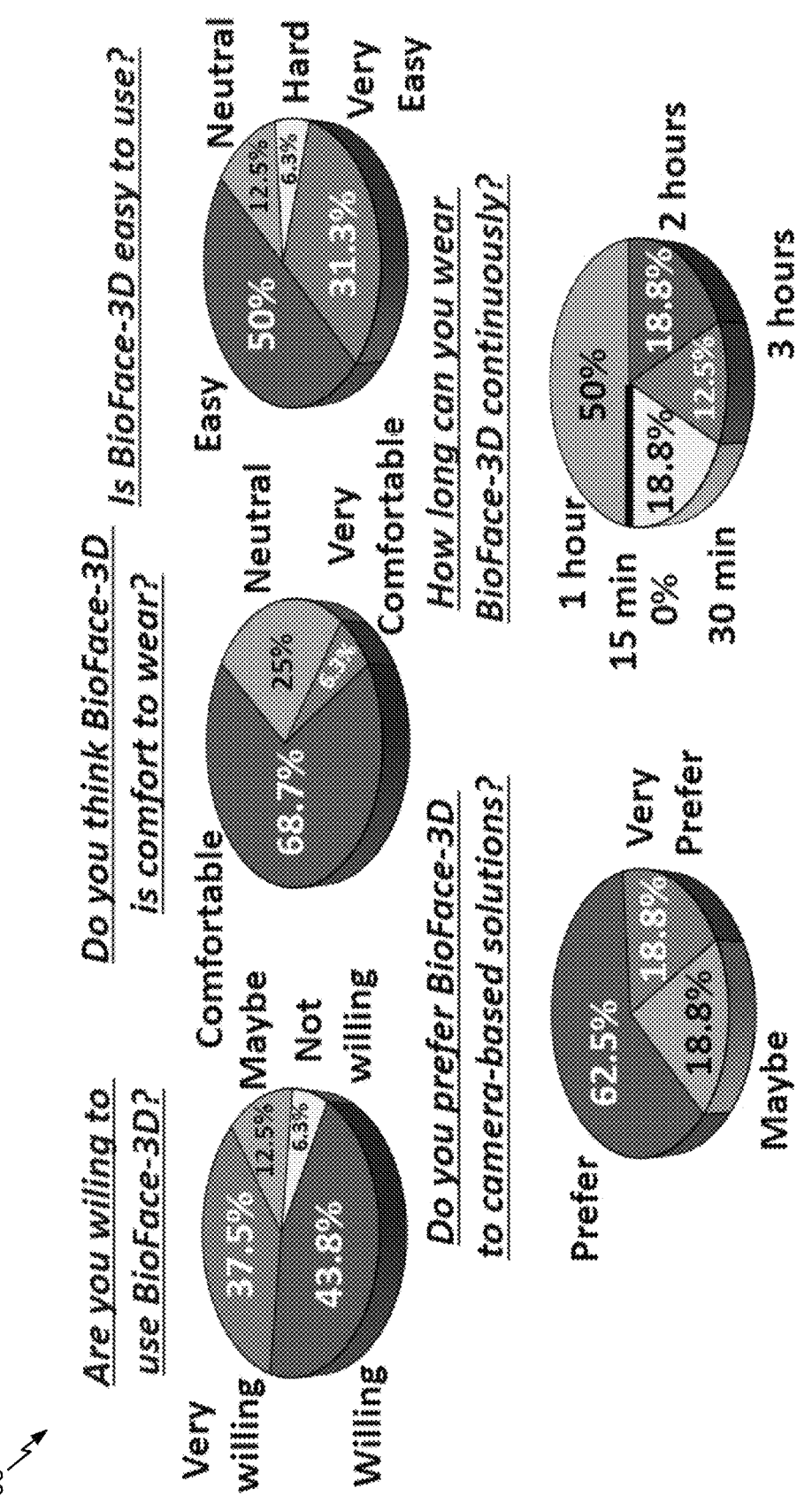
FIG. 20 depicts example nonlimiting results of a user study questionnaire.

FIG. 20 depicts example nonlimiting results 2000 of a user study questionnaire.

FIG. 21 depicts an example overview 2100 of photo-realistic animation generation. Additional details are also provided in FIGS. 22-23. The overview 2100 depicts a process for photo-realistic animation generation. In this example, a biosignal-based CNN network produces a three-dimensional face mesh, which can be represented using 3DMM coefficients. L2 loss can be used to reconstruct the 3DMM coefficients. The 3DMM coefficients are combined with an arbitrary photo of the user to synthesize a photorealistic animation. A portrait image neutral renderer can be applied to the combination of the 3DMM coefficients and the user photo to manipulate facial expressions and motions in arbitrary facial images.

In examples, FLAME utilizes a generic head model that lacks detailed features and awareness of the user's face. Consequently, an additional option to generate personalized, photo-realistic animations that incorporate specific facial details instead of the generic 3D animation is provided. Specifically, instead of 2D facial landmarks, the output of the biosignal-based CNN network can be changed to 3D face meshes, which can be represented using 3D Morphable Model (3DMM) coefficients. As depicted in FIG. 21, different from sparse 2D landmarks, 3D face meshes capture a more densely detailed geometry and preserve personalized facial features. Deep3DFace algorithms can be used to extract 3DMM coefficients from facial images as a groundtruth. Deep3DFace can be considered as a modified ResNet-50 network, where the size of the last fully-connected layer has been adapted to 239. This layer can be structured to represent 3DMM coefficients representing identity, expression, texture, pose, and lighting of the input facial image. The final fully-connected layer of the biosignal-based 1DCNN network can be changed to 239, and can use L2 loss to reconstruct the 3DMM coefficients. As illustrated in FIG. 21, the reconstructed 3DMM coefficients can be further combined with an arbitrary photo of a user to synthesize the photo-realistic animation. Portrait Image Neural Renderer (PIRenderer), another pre-trained deep learning model that utilizes 3DMM coefficients to manipulate facial expressions and motions in arbitrary facial images can be used. PIRenderer can be composed of three subnetworks: a mapping network that maps the 3DMM coefficients to a latent vector; a warping network that estimates the difference between the input facial image and the desired facial expressions based on the latent vector, and generates coarse results through wrapping the input image with the estimated deformations; and an editing network which refines the coarse results and produces the final photorealistic images. The generated image in FIG. 21 captures and intended facial expression while retaining the individual's personalized facial details.

Figure 22:
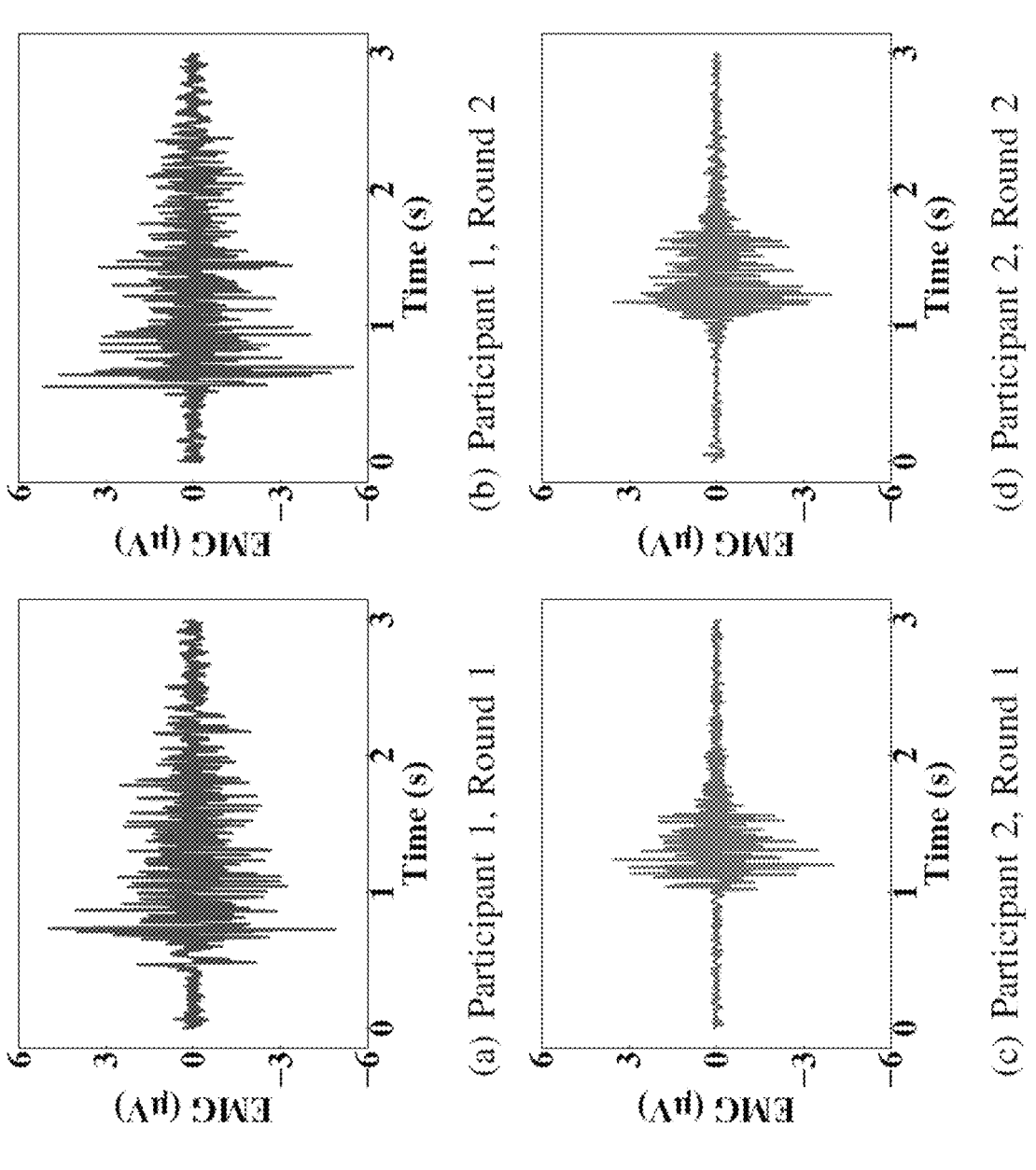
FIG. 22 depicts an example of Electromyography signals corresponding to facial gestures expressing the word "contempt," as performed by two users in multiple iterations.

FIG. 22 depicts an example of Electromyography signals 2200 corresponding to facial gestures expressing the word "contempt," as performed by two users in multiple iterations. Part (a) of FIG. 22 depicts EMG signals produced by participant one in round one. Part (b) of FIG. 22 depicts EMG signals produced by participant one in round two. Part (c) of FIG. 22 depicts EMG signals produced by participant to in round one. Part (d) of FIG. 22 depicts EMG signals produced by participant to in round two. The example in FIG. 22 shows that biosignals can be used to distinguish between users, authenticate a user, or both, as it is evident that when performing identical gestures, EMG signals of different users displayed distinct patterns, whereas biosignals of the same user remain remarkably consistent.

Figure 23:
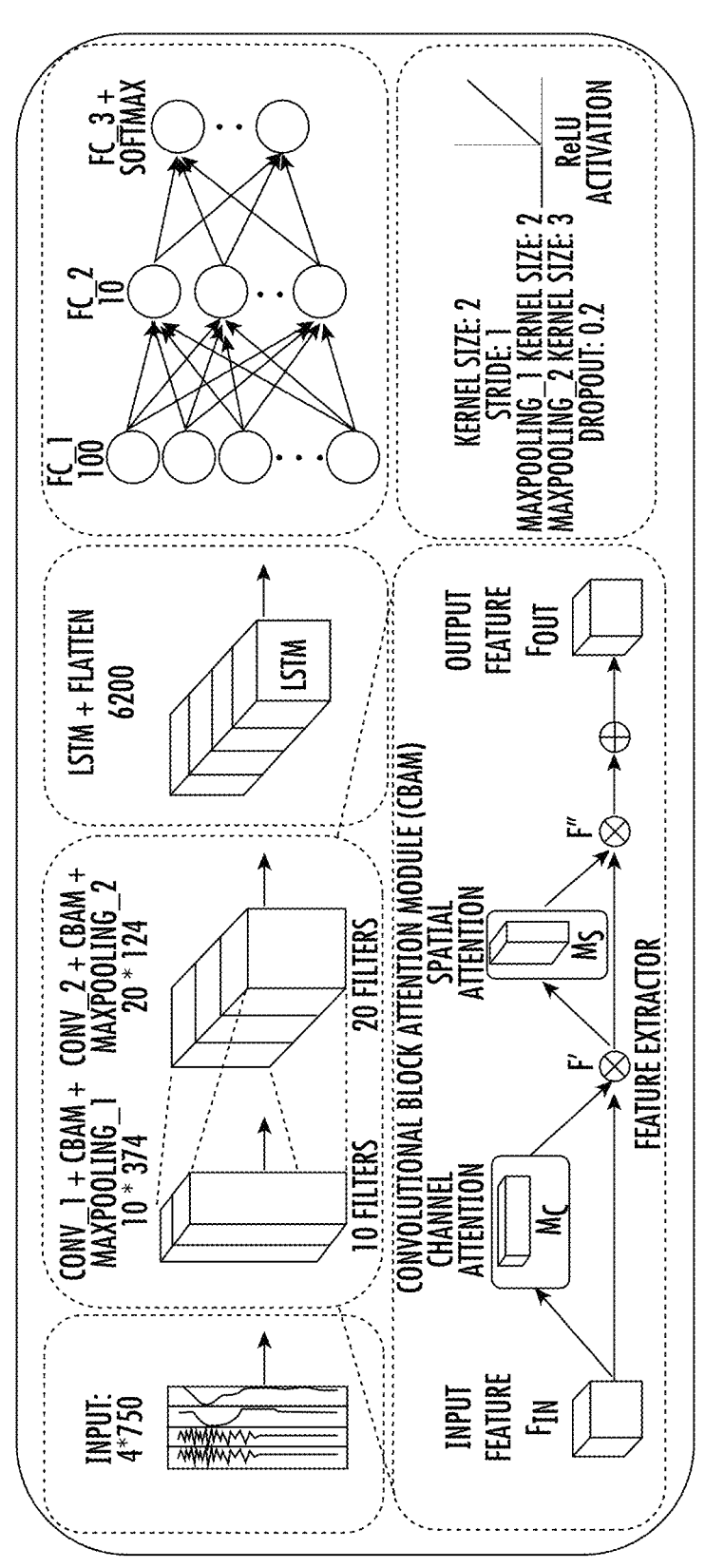
FIG. 23 depicts an example architecture of processes for user authentication, user identification, or both.

FIG. 23 depicts an example architecture 2300 of processes for user authentication, user identification, or both. The extracted EMG signals, EOG signals, or both on the face during the same expression can vary among individuals due to factors such as distinct muscle activation patterns, variations in neuromuscular control, differences in facial anatomy, and the interplay of multiple muscles. These differences can also be influenced by physiological and psychological factors, leading to individualized patterns of muscle activation. For instance, two people smiling might show slightly different patterns of muscle activation in their cheek muscles (zygomaticus major). Hence, there exists an ability to use the provided methods and apparatus for the purpose of distinguishing users, authenticating users, or both.

In FIG. 22, parts (a) through (d) illustrate example EMG signals collected from participants 1 and 2, respectively who were required to perform the "contempt" gesture multiple times while wearing a headset 100. It is evident that when performing identical gestures, the EMG signals of different participants display entirely distinct patterns, whereas the biosignals of the same participant remain remarkably consistent. The observation demonstrates the feasibility of leveraging the provided apparatus and methods for user authentication, user identification, or both.

Threat Model. In examples, there are at least two application examples that require distinguishing users: (1) User Authentication: In this example, the provided methods and apparatus can authenticate the identity of a sole legitimate user, granting access to a security-sensitive service, security-sensitive device, or both. In examples the provided methods and apparatus can deny entry to other individuals attempting to use the security-sensitive service, the security-sensitive device or both; and (2) User Identification: examples, a security-sensitive device can be shared among a group of individuals, and the provided apparatus and methods can distinguish between users and thus enable the respective customized experiences. In examples, the following attacks can be harmful to the proposed authentication functionalities: (i) Blind Attack. In this example, a potential adversary seeks to circumvent the authentication system or masquerade as a specific user for user identification by attempting random facial expressions while wearing the headset 100. (ii) Credential-aware Attack. The adversary possesses knowledge of the authorized user's credentials, which can include a prescribed sequence (e.g. including three to five) of facial expressions. With this information, the adversary endeavors to imitate the genuine user's facial expressions in an attempt to deceive the user authentication system, user identification system, or both.

Data Augmentation. To address the inherent class imbalance commonly encountered in user authentication datasets, the provided apparatus and methods can implement data augmentation techniques within the training dataset, enhancing the resilience of the provided models (e.g. CNN). In an example, in approach includes a dual strategy aimed at rectifying the skewed class distribution. Initially, the underrepresented class (e.g., legitimate user) can be amplified using a Synthetic Minority Over-sampling Technique (SMOTE) algorithm, which can generate synthetic samples, enabling achieving a more equitable representation of classes. This technique can enable precise adjustment of a minority-to-majority class ratio, thus fine-tuning the upsampling process. Furthermore, the provided apparatus and methods can apply additional data augmentation through using signal-based modifications, encompassing random time shifts of up to 10 ms, injection of Gaussian noise, and amplitude scaling variations of up to 10% to further increase the diversity of the datasets. This strategy can effectively mitigate class imbalance, enhancing the model's adaptability to diverse scenarios.

System Overview for User Authentication & Identification. The examples in FIG. 23 depict an example deep learning model architecture for user authentication and user identification. In an example, a user can be prompted to execute either an individual facial gesture or a sequence of such gestures within a brief temporal window for user verification or identification. Upon completion of each facial gesture input, similar to the pre-processing steps for 3D facial tracking (in FIG. 7), four-channel biosignals can be initially filtered through dual band-pass filters to extract EMG and EOG signals correspondingly. The signals can then be fed into a CNN-LSTM hybrid neural network, which can effectively combine feature extraction and time series regression for deep learning and make full use of the spatio-temporal correlation of the biosignals, for identity verification/identification. By treating facial gestures as user owned passcodes and harnessing the distinctive individual traits encoded within the biosignals, the system can facilitate a fortified two-factor framework for user authentication and identification. To authenticate/verify users, the biosignals can first pass through two 1D CNN layers with 10 and 20 filters, respectively. The kernel size can be set to 2, with the stride length set to 1. Additionally, a Convolutional Block Attention Module (CBAM) can be used, which infers attention maps along channel and spatial dimensions and assigns weights to more important features. Two max-pooling layers with kernel sizes of 2 and 3, respectively, can be used after each convolution layer to further down-sample features. In contrast with the facial tracking task, which can require rapid inference (i.e., 20 FPS) and short-term sequences (i.e., 0.5 s), the user authentication task and identification task do not require such frequent inference, and the input length can be significantly longer. In examples, an additional Long Short-Term Memory (LSTM) layer can be applied after applying CNN layers to further capture long term dependencies in the biosignal, which enables the model to effectively extract both spatial and temporal representations from biosignals. Specifically, the hidden layer size of the LSTM layer can be set to 50, and the output is flattened and fed into three fully connected layers. The first two layers can have 256 and 128 units, respectively, while the size of the last layer can be 2 (i.e., legitimate user and adversary) for user verification and N for user identification, where N can be the number of enrolled users in the system. The provided apparatuses and methods can use ReLu as the activation function and can apply a dropout rate of 0.2 to avoid overfitting. Cross-entropy can be used as the loss function, and the network can be trained using the Adam optimizer with the learning rate set to 0.0005.

Series of Gestures & Majority Vote. To further enhance system performance, users have an option to execute gestures multiple times, and the authentication network, identification network, or both will provide corresponding multiple prediction results. For the authentication network, the provided apparatus and methods can utilize a hard majority vote, where a final prediction equals a result generated by a majority of the gestures. For the identification network, a soft majority vote can be used, where a softmax output can be averaged to obtain a final result.

Figure 24:
FIG. 24 depicts an example of generating photo-realistic animation.

FIG. 24 depicts an example of generating photo-realistic animation 2400. The example in FIG. 24 depicts, during an interval of five frames, an original image, a reconstructed three-dimensional mesh, and a photo-realistic animation (e.g. Avatar) that demonstrate the capability of the provided methods and apparatus to perform continuous three-dimensional facial reconstruction.

Figure 25:
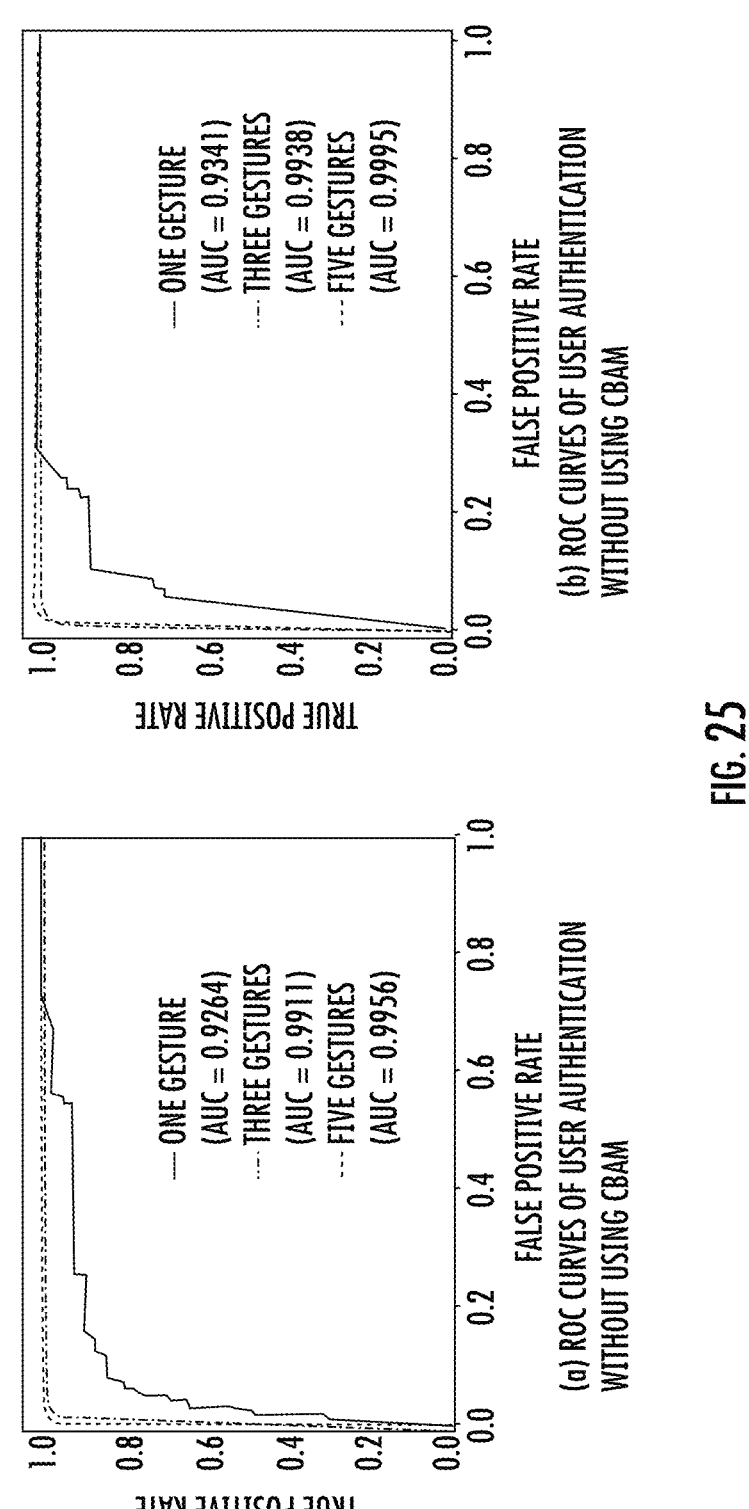
FIG. 25 depicts example graphs of receiver operating characteristic curves user authentication with and without using a convolutional block attention module.

FIG. 25 depicts example graphs of receiver operating characteristic curves 2500 user authentication with and without using a convolutional block attention module (CBAM) during a credential-aware attack. A CBAM is a layer in a convolutional block of a CNN. Part (a) of FIG. 25 depicts ROC curves of user authentication without using CBAM. Part (b) of FIG. 25 depicts ROC curves of user authentication using CBAM. In a credential-aware attack, an attacker possesses knowledge of a legitimate user's credentials. However, replicating biosignals originating from a legitimate user's facial expressions is nearly impossible. These experiment results demonstrate an enhanced effectiveness resulting from processing biosignals using a CNN that is trained with a CBAM layer.

Figure 26:
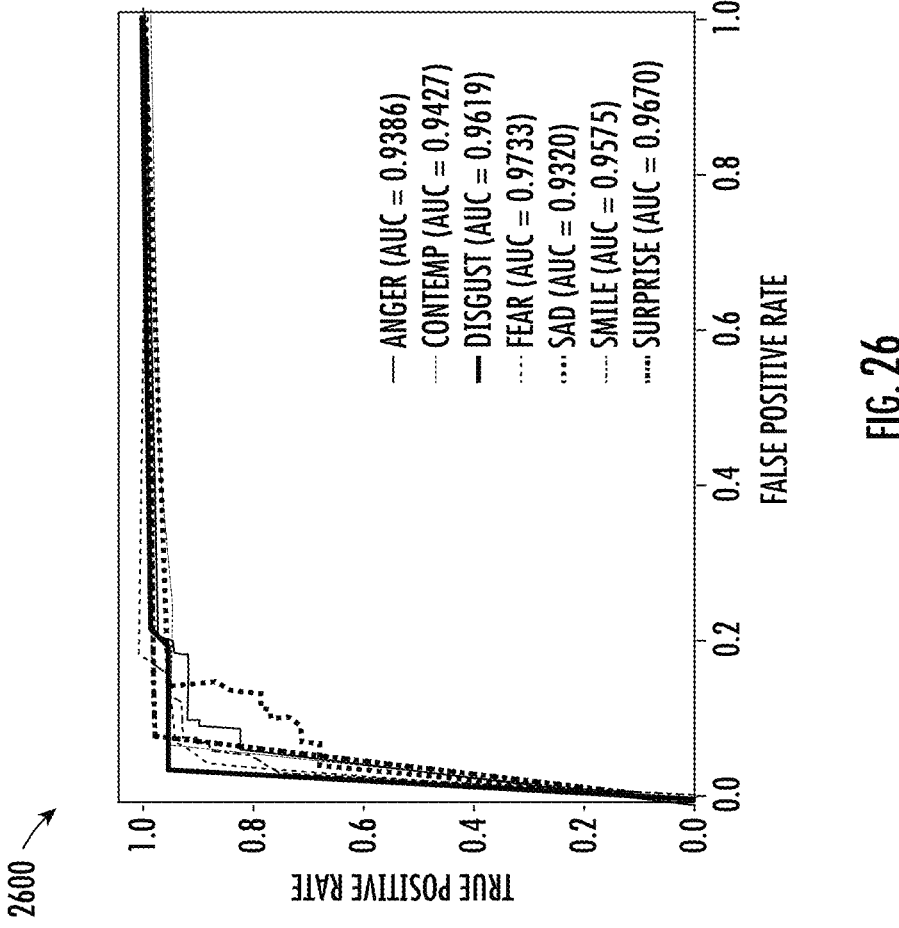
FIG. 26 depicts example receiver operating characteristic curves of user authentication with respective individual gestures.

FIG. 26 depicts example receiver operating characteristic curves 2600 of user authentication with respective individual gestures. FIG. 26 depicts ROCs of single gestures, true positive rates and respective false positive rates. FIG. 26 depicts the fear facial gesture exhibits a best performance with an AUC of 0.9733.

Figure 27:
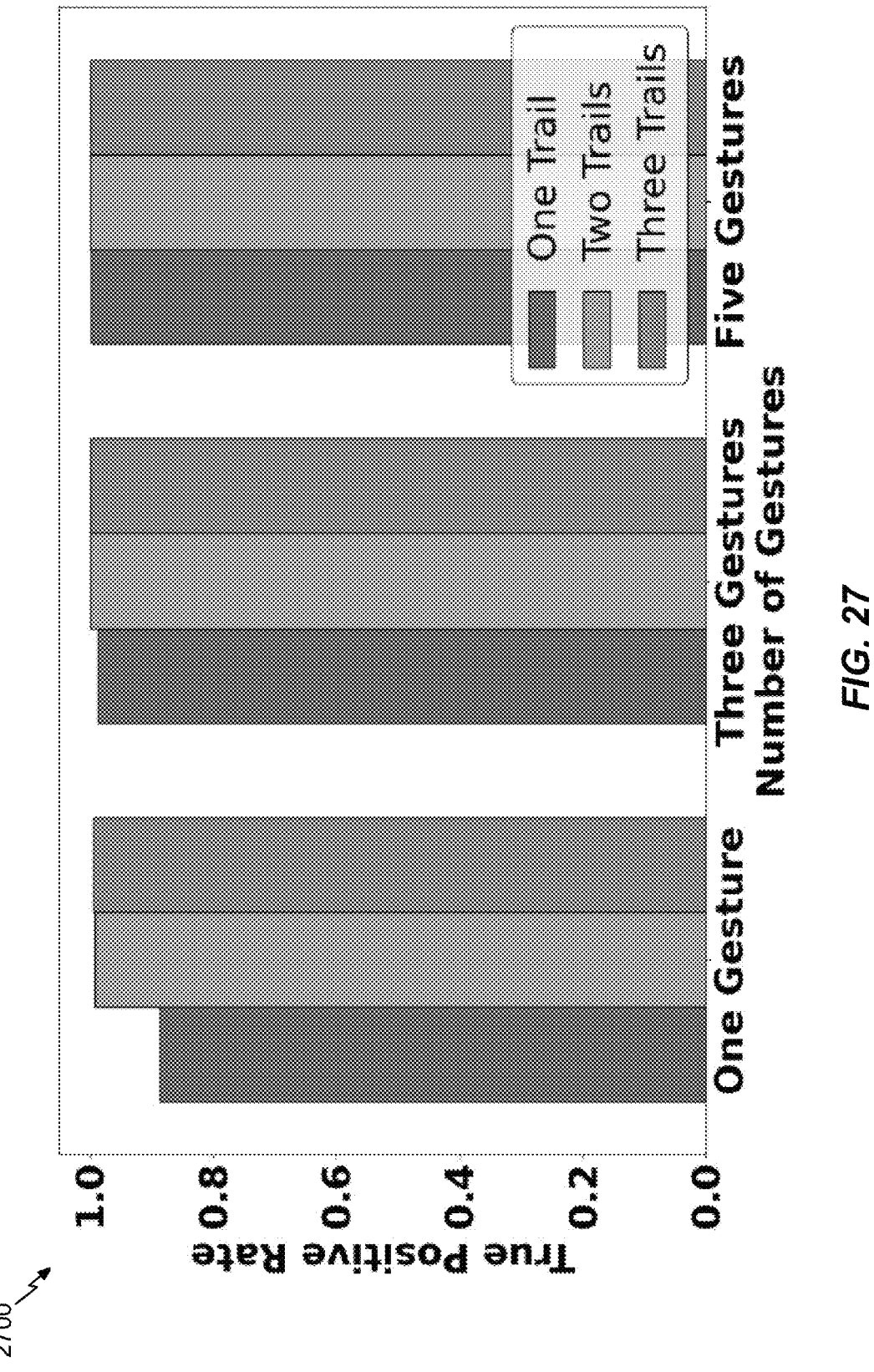
FIG. 27 depicts example true positive rates for multiple trails with different numbers of gestures.

FIG. 27 depicts example true positive rates for multiple trials 2700 with different numbers of gestures. FIG. 27 presents results from multiple trials, where users make repeated attempts to pass the provided authentication system. Specifically, under the second trial, the average TPR could reach 0.99, and get close to 1 in the third trial. These promising results demonstrate the capability of the provided systems and methods for user authentication.

Figure 28:
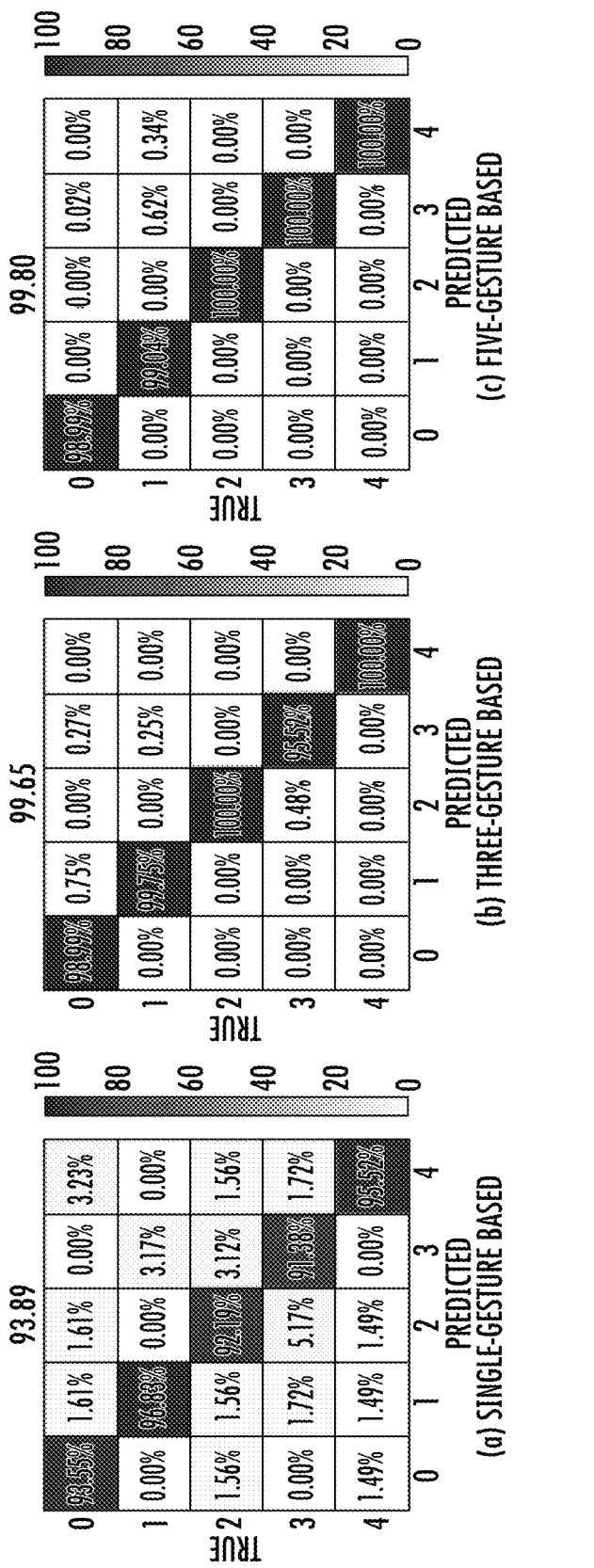
FIG. 28 depicts example confusion matrices of user identification based upon a single gesture, three gestures, and five gestures.

FIG. 28 depicts example confusion matrices of user identification 2800 based upon a single gesture, three gestures, and five gestures. Part (a) of FIG. 28 depicts a confusion matrix for a single gesture, with an overall accuracy of 93.89%. Part (b) of FIG. 28 depicts a confusion matrix for a three gestures, with an overall accuracy of 99.65%. Part (c) of FIG. 28 depicts a confusion matrix for five gestures, with an overall accuracy of 99.80%. As the series of gestures and a soft majority vote method is used, the accuracy of identifying each user increases significantly. These promising results demonstrate capability of the provided systems and methods for user identification.

FIG. 29 depicts an example block diagram of an example method 2900 for performing biosensor-based user authentication. In examples, the method 2900 can be used to authenticate a candidate user of an electronic device (e.g. a device described herein). In a nonlimiting example, when multiple people are candidate users of the electronic device, the method 2900 can be used to determine if a specific candidate user of the electronic device is authorized to use the electronic device or is not authorized to use electronic device electronic device. In nonlimiting examples, the method 2900 can be a constituent part of a process for multi-factor authentication. The method 2900 can provide a biosignal-based factor in the multi-factor authentication process.

The method 2900 can be computer-implemented. The method 2900 can be performed at least in part by the apparatus described hereby, such as the headset 100 in FIGS. 1A-1B, the computing device 150 in FIG. 1C, or a practicable combination thereof. Additional aspects of the provided example methods are described herein. The steps shown in FIG. 29 can be performed by any suitable computer-executable code, computing system, or a combination thereof. At least a portion of these additional aspects can be integrated with the method 3000 in FIG. 30. In some examples, each of the steps shown in FIG. 29 can represent an algorithm whose structure includes multiple substeps, is represented by multiple substeps, or a combination thereof, examples of which are provided in greater detail herein.

As depicted in FIG. 29, at step 2905, one or more of the devices described herein can receive user-specific biosignal information from electrodes. The user-specific biosignal information can include electromyography (EMG) information, electrooculography (EOG) information, or combination thereof describing at least one facial expression.

In examples, the method 2900 can include providing (e.g. via a user-interface device) a user authentication request. Receipt of the user-specific biosignal information can be restricted to a pre-determined time period following the providing the user authorization request. Following the pre-determine time period, the method 2900 can initiate cessation of receiving user-specific biosignal information.

In some examples, the method 2900 can include displaying at least one image of the at least one facial expression on a user display that is a constituent part of a helmet, a hat, a headset, a virtual reality headset, an augmented reality headset, earbuds, smart glasses, a wireless device, a computer monitor, or a combination thereof. The displaying can be used to prompt a user to perform the at least one facial expression so that the one or more of the devices described herein can receive the user-specific biosignal information from the electrodes.

In some examples, the at least one facial expression can be a constituent part of a prescribed sequence of pre-defined facial expressions. A nonlimiting example of a sequence of pre-defined facial expressions is a smile, a frown, a wink, a laugh, and anger.

In some examples, the method 2900 can include receiving the user-specific biosignal information from at least one of a helmet, a hat, a headset, a virtual reality headset, an augmented reality headset, earbuds, smart glasses, a wireless device, a computer monitor, or a combination thereof. In examples, electrodes can be a constituent part of the helmet, the hat, the headset, the virtual reality headset, the augmented reality headset, the earbuds, the smart glasses, the wireless device, the computer monitor, or the combination thereof.

As depicted in FIG. 29, at step 2910, one or more of the devices described herein can extract the EMG information and the EOG information from the received user-specific bio signal information by applying a bandpass filter to the user-specific biosignal information.

As depicted in FIG. 29, at step 2915, one or more of the devices described herein can extract user-specific spatial and temporal representations from the EMG information, the EOG information, or both. In examples, the extracting can include applying the EMG information, the EOG information, or both to a trained biosignal-based multi-input convolutional neural network (CNN) to produce the user-specific spatial representation. In examples, the extracting can include applying an output of the CNN to a Long Short-Term Memory to produce the user-specific temporal representation.

In some examples, the output of the CNN can describe a three-dimensional face mesh, such as by using three-dimensional morphable model coefficients.

As depicted in FIG. 29, at step 2920, one or more of the devices described herein can apply the extracted user-specific spatial representation, the user-specific temporal representation, or both to a machine-learning classifier to produce a machine-learning classifier output indicating user authentication. In examples, the machine-learning classifier can be trained to identify the extracted user-specific spatial representation, the temporal representation, or both as authentic (i.e. sourced from a specific authentic user). The machine-learning classifier output thus can indicate a candidate user of the electronic device as authentic or not authentic.

In some examples, the method 2900 can include performing a multi-factor authentication process. The multi-factor authentication process can use the machine-learning classifier output to authenticate a user.

In some examples, the method 2900 can include training the machine-learning classifier. Training the machine-learning classifier can include prompting, via a user interface device, an authentic user to perform at least one specific facial expression. The at least one specific facial expression can be a constituent part of a group of facial expressions. Training the machine learning classifier can include receiving (e.g. from a user interface device, in response to the user prompt to perform the at least one facial expression, or both), an input describing authentic user-specific biosignal information for the authentic user. Training the machine-learning classifier can also include preparing a machine-learning classifier training dataset from the authentic user-specific biosignal information for the authentic user.

In some examples, the machine-learning classifier output can be in a plurality of machine-learning classifier outputs corresponding to respective EMG information, respective EOG information, or both describing respective facial expressions. The method 2900 can include applying the plurality of machine-learning classifier outputs to a hard voting algorithm configured to produce a user authentication output based on a majority vote.

In examples, the method 2900 can include enabling, in response to the machine-learning classifier output indicating an authentic user, user access to otherwise restricted information. For example, the method 2900 can, based on the machine-learning classifier output indicating the authentic user, enable the authenticated user to access to a restricted-access computer application, restricted-access computer-provided information, a restricted-access computer-based service, or combination thereof. In examples, the method 2900 can, based on machine-learning classifier output indicating a candidate user is not authentic, not enable the not authentic user to access the restricted-access computer application, the restricted-access computer-provided information, the restricted-access computer-based service, or the combination thereof.

FIG. 30 depicts an example block diagram of an example method 3000 for performing biosensor-based user identification. In examples, the method 3000 can be used to identify a specific user of an electronic device (e.g. a device described herein) in a group of potential users of the electronic device. In a nonlimiting example, when multiple members of a family can use the electronic device, the method 3000 can be used to identify which of the family members is using electronic device, attempting to use the electronic device, or both.

The method 3000 can be computer-implemented. The method 3000 can be performed at least in part by the apparatus described hereby, such as the headset 100 in FIGS. 1A-1B, the computing device 150 in FIG. 1C, or a practicable combination thereof. Additional aspects of the provided example methods are described herein. The steps shown in FIG. 30 can be performed by any suitable computer-executable code, computing system, or a combination thereof. At least a portion of these additional aspects can be integrated with the method 2900. In some examples, each of the steps shown in FIG. 30 can represent an algorithm whose structure includes multiple substeps, is represented by multiple substeps, or a combination thereof, examples of which are provided in greater detail herein.

As depicted in FIG. 30, at step 3005, one or more of the devices described herein can receive user-specific biosignal information from electrodes. The user-specific biosignal information can include electromyography (EMG) information, electrooculography (EOG) information, or combination thereof describing at least one facial expression.

In examples, the method 3000 can include providing (e.g. via a user-interface device) a user identification request. Receipt of the user-specific biosignal information can be restricted to a pre-determined time period following the providing the user identification request. Following the pre-determine time period, the method 3000 can initiate cessation of receiving user-specific biosignal information.

In some examples, the method 3000 can include displaying at least one image of the at least one facial expression on a user display that is a constituent part of a helmet, a hat, a headset, a virtual reality headset, an augmented reality headset, earbuds, smart glasses, a wireless device, a computer monitor, or a combination thereof. The displaying can be used to prompt a user to perform the at least one facial expression so that the one or more of the devices described herein can receive the user-specific biosignal information from the electrodes.

In some examples, the at least one facial expression can be a constituent part of a prescribed sequence of pre-defined facial expressions. A nonlimiting example of a sequence of pre-defined facial expressions is a smile, a frown, a wink, a laugh, and anger.

In some examples, the method 3000 can include receiving the user-specific biosignal information from at least one of a helmet, a hat, a headset, a virtual reality headset, an augmented reality headset, earbuds, smart glasses, a wireless device, a computer monitor, or a combination thereof. In examples, electrodes can be a constituent part of the helmet, the hat, the headset, the virtual reality headset, the augmented reality headset, the earbuds, the smart glasses, the wireless device, the computer monitor, or the combination thereof.

As depicted in FIG. 30, at step 3010, one or more of the devices described herein can extract the EMG information and the EOG information from the received user-specific bio signal information by applying a bandpass filter to the user-specific biosignal information.

As depicted in FIG. 30, at step 3015, one or more of the devices described herein can extract user-specific spatial and temporal representations from the EMG information, the EOG information, or both. In examples, the extracting can include applying the EMG information, the EOG information, or both to a trained biosignal-based multi-input CNN to produce the user-specific spatial representation. In examples, the extracting can include applying an output of the CNN to a Long Short-Term Memory to produce the user-specific temporal representation.

In some examples, the output of the CNN can describe a three-dimensional face mesh, such as by using three-dimensional morphable model coefficients.

As depicted in FIG. 30, at step 3020, one or more of the devices described herein can apply the extracted user-specific spatial representation, the user-specific temporal representation, or both to a machine-learning classifier to produce a machine-learning classifier output indicating a user identification. In examples, the machine-learning classifier can be trained to identify the extracted user-specific spatial representation, the temporal representation, or both as associated with a specific user. The machine-learning classifier output thus can indicate a specific user of the electronic device in a group of potential users of the electronic device.

In some examples, the method 3000 can include training the machine-learning classifier. Training the machine-learning classifier can include prompting, via a user interface device, a user to perform at least one specific facial expression. The at least one specific facial expression can be a constituent part of a group of facial expressions. The training the machine learning classifier can include receiving (e.g. from a user interface device, in response to the user prompt to perform the at least one facial expression, or both), an input describing user-specific biosignal information for the user. The training the machine-learning classifier can also include preparing a machine-learning classifier training dataset from the user-specific biosignal information for the user.

In some examples, the machine-learning classifier output can be in a plurality of machine-learning classifier outputs corresponding to respective EMG information, respective EOG information, or both describing respective facial expressions. The method 3000 can include applying the plurality of machine-learning classifier outputs to a soft voting algorithm configured to produce a user identification output based on an average of a probability distribution of possible outcomes.

In examples, the method 3000 can include enabling, in response to the machine-learning classifier output indicating a user identification, user access to otherwise restricted information. For example, the method 3000 can, based on the machine-learning classifier output indicating an identified user, enable the identified user to access to a restricted-access computer application, restricted-access computer-provided information, a restricted-access computer-based service, or combination thereof. In examples, the method 3000 can, based on machine-learning classifier output indicating a candidate user is not identified, not enable the unidentified candidate user to access the restricted-access computer application, the restricted-access computer-provided information, the restricted-access computer-based service, or the combination thereof.

As used hereby, the term "example" means "serving as an example, instance, or illustration". Any example described as an "example" is not necessarily to be construed as preferred or advantageous over other examples. Likewise, the term "examples" does not require all examples include the discussed feature, advantage, or mode of operation. Use of the terms "in one example," "an example," "in one feature," and/or "a feature" in this specification does not necessarily refer to the same feature and/or example. Furthermore, a particular feature and/or structure can be combined with one or more other features and/or structures. Moreover, at least a portion of the apparatus described hereby can be configured to perform at least a portion of a method described hereby.

It should be noted the terms "connected," "coupled," and any variant thereof, mean any connection or coupling between elements, either direct or indirect, and can encompass a presence of an intermediate element between two elements which are "connected" or "coupled" together via the intermediate element. Coupling and connection between the elements can be physical, logical, or a combination thereof. Elements can be "connected" or "coupled" together, for example, by using one or more wires, cables, printed electrical connections, electromagnetic energy, and the like. The electromagnetic energy can have a wavelength at a radio frequency, a microwave frequency, a visible optical frequency, an invisible optical frequency, and the like, as practicable. These are several non-limiting and non-exhaustive examples.

The term "signal" can include any signal such as a data signal, an audio signal, a video signal, a multimedia signal, an analog signal, a digital signal, and the like. Information and signals described hereby can be represented using any of a variety of different technologies and techniques. For example, data, an instruction, a process step, a process block, a command, information, a signal, a bit, a symbol, and the like which are referred to hereby can be represented by a voltage, a current, an electromagnetic wave, a magnetic field, a magnetic particle, an optical field, an optical particle, and/or any practical combination thereof, depending at least in part on the particular application, at least in part on the desired design, at least in part on the corresponding technology, and/or at least in part on like factors.

A reference using a designation such as "first," "second," and so forth does not limit either the quantity or the order of those elements. Rather, these designations are used as a convenient method of distinguishing between two or more elements or instances of an element. Thus, a reference to first and second elements does not mean only two elements can be employed, or the first element must necessarily precede the second element. Also, unless stated otherwise, a set of elements can comprise one or more elements. In addition, terminology of the form "at least one of: A, B, or C" or "one or more of A, B, or C" or "at least one of the group consisting of A, B, and C" used in the description or the claims can be interpreted as "A or B or C or any combination of these elements". For example, this terminology can include A, or B, or C, or A and B, or A and C, or A and B and C, or 2A, or 2B, or 2C, and so on.

The terminology used hereby is for the purpose of describing particular examples only and is not intended to be limiting. As used hereby, the singular forms "a," "an," and "the" include the plural forms as well, unless the context clearly indicates otherwise. In other words, the singular portends the plural, where practicable. Further, the terms "comprises," "comprising," "includes," and "including," specify a presence of a feature, an integer, a step, a block, an operation, an element, a component, and the like, but do not necessarily preclude a presence or an addition of another feature, integer, step, block, operation, element, component, and the like.

Those of skill in the art will appreciate the example logical blocks, elements, modules, circuits, and steps described in the examples disclosed hereby can be implemented individually and/or collectively, as electronic hardware, computer software, or combinations of both, as practicable. To clearly illustrate this interchangeability of hardware and software, example components, blocks, elements, modules, circuits, and steps have been described hereby generally in terms of their functionality. Whether such functionality is implemented as hardware or software depends upon the particular application and design constraints imposed on an overall system. Skilled artisans can implement the described functionality in different ways for each particular application, but such implementation decisions should not be interpreted as causing a departure from the scope of the present disclosure. In addition, any disclosure of components contained within other components should be considered example in nature since many other architectures can be implemented to achieve the same functionality.

At least a portion of the methods, sequences, algorithms or a combination thereof which are described in connection with the examples disclosed hereby can be embodied directly in hardware, in instructions executed by a processor (e.g., a processor described hereby), or in a combination thereof. In an example, a processor includes multiple discrete hardware components. Instructions can reside in a non-transient storage medium (e.g., a memory device), such as a random-access memory (RAM), a flash memory, a read-only memory (ROM), an erasable programmable read-only memory (EPROM), an electrically erasable programmable read-only memory (EEPROM), a register, a hard disk, a removable disk, a compact disc read-only memory (CD-ROM), any other form of storage medium, the like, or a combination thereof. An example storage medium (e.g., a memory device) can be coupled to the processor so the processor can read information from the storage medium, write information to the storage medium, or both. In an example, the storage medium can be integral with the processor.

Further, examples provided hereby are described in terms of sequences of actions to be performed by, for example, one or more elements of a computing device. The actions described hereby can be performed by a specific circuit (e.g., an application specific integrated circuit (ASIC)), by instructions being executed by one or more processors, or by a combination of both. Additionally, a sequence of actions described hereby can be entirely within any form of non-transitory computer-readable storage medium having stored thereby a corresponding set of computer instructions which, upon execution, cause an associated processor (such as a special-purpose processor) to perform at least a portion of a function described hereby. Additionally, a sequence of actions described hereby can be entirely within any form of non-transitory computer-readable storage medium having stored thereby a corresponding set of instructions which, upon execution, configure the processor to create specific logic circuits. Thus, examples may be in a number of different forms, all of which have been contemplated to be within the scope of the disclosure. In addition, for each of the examples described hereby, a corresponding electrical circuit of any such examples may be described hereby as, for example, "a logic circuit configured to" perform a described action.

In an example, when a general-purpose computer (e.g., a processor) is configured to perform at least a portion of a method described hereby, then the general-purpose computer becomes a special-purpose computer which is not generic and is not a general-purpose computer. In an example, loading a general-purpose computer with special programming can cause the general-purpose computer to be configured to perform at least a portion of a method described hereby. In an example, a combination of two or more related method steps disclosed hereby forms a sufficient algorithm. In an example, a sufficient algorithm constitutes special programming. In an example, special programming constitutes any software which can cause a computer (e.g., a general-purpose computer, a special-purpose computer, etc.) to be configured to perform one or more functions, features, steps algorithms, blocks, or a combination thereof, as disclosed hereby.

At least one example provided hereby can include a non-transitory (i.e., a non-transient) machine-readable medium and/or a non-transitory (i.e., a non-transient) computer-readable medium storing processor-executable instructions configured to cause a processor (e.g., a special-purpose processor) to transform the processor and any other cooperating devices into a machine (e.g., a special-purpose processor) configured to perform at least a part of a function described hereby, at least a part of a method described hereby, the like, or a combination thereof. Performing at least a part of a function described hereby can include initiating at least a part of a function described hereby, at least a part of a method described hereby, the like, or a combination thereof. In an example, execution of the stored instructions can transform a processor and any other cooperating devices into at least a part of an apparatus described hereby. A non-transitory (i.e., a non-transient) machine-readable medium specifically excludes a transitory propagating signal. Further, one or more examples can include a computer-readable medium embodying at least a part of a function described hereby, at least a part of a method described hereby, the like, or a combination thereof.

Nothing stated or depicted in this application is intended to dedicate any component, step, block, element, feature, object, benefit, advantage, or equivalent to the public, regardless of whether the component, step, block, element, feature, object, benefit, advantage, or the equivalent is recited in the claims. While this disclosure describes examples, changes and modifications can be made to the examples disclosed hereby without departing from the scope defined by the appended claims. A feature from any of the provided examples can be used in combination with one another feature from any of the provided examples in accordance with the general principles described hereby. The present disclosure is not intended to be limited to the specifically disclosed examples alone.

Features from any of the embodiments described herein may be used in combination with another embodiment in accordance with the general principles described herein. These and other embodiments, features, and advantages will be more fully understood upon reading this detailed description in conjunction with the accompanying drawings and claims.

What is claimed is:

1. A computer-implemented method for performing biosensor-based user authentication, at least a portion of the method being performed by a computing device comprising at least one processor, the method comprising:

receiving user-specific biosignal information from electrodes, wherein the user-specific biosignal information includes electromyography (EMG) information and electrooculography (EOG) information describing at least one facial expression;

extracting the EMG information and the EOG information by applying a bandpass filter to the user-specific biosignal information;

extracting user-specific spatial and temporal representations from the EMG information and the EOG information by:

applying the EMG information and the EOG information to a trained biosignal-based multi-input convolutional neural network (CNN); and applying an output of the CNN to a Long Short-Term Memory to produce the user-specific spatial and temporal representations; and applying the extracted user-specific spatial and temporal representations to a machine-learning classifier to produce a machine-learning classifier output indicating user authentication, wherein the machine-learning classifier is trained to identify the extracted user-specific spatial and temporal representations as authentic.

2. The computer-implemented method of claim 1, further comprising displaying at least one image of the at least one facial expression on a user display that is a constituent part of:

a helmet;
a hat;
a headset;
a virtual reality headset;
an augmented reality headset;
earbuds;
smart glasses;
a wireless device;
a computer monitor; or
a combination thereof.

3. The computer-implemented method of claim 1, wherein the user-specific biosignal information is received from:

a helmet;
a hat;
a headset;
a virtual reality headset;
an augmented reality headset;
earbuds;
smart glasses;
a wireless device;
a computer monitor; or
a combination thereof.

4. The computer-implemented method of claim 1, wherein the at least one facial expression is a constituent part of a prescribed sequence of pre-defined facial expressions.

5. The computer-implemented method of claim 1, further comprising:

providing, via a user-interface device, a user authentication request; and restricting receipt of the user-specific biosignal information to a pre-determined time period following the providing the user authentication request.

6. The computer-implemented method of claim 1, further comprising performing a multi-factor authentication process, wherein the multi-factor authentication process uses the machine-learning classifier output to authenticate a user.

7. The computer-implemented method of claim 1, wherein the output of the CNN describes, using three-dimensional morphable model coefficients, a three-dimensional face mesh.

8. The computer-implemented method of claim 1, further comprising:

receiving, from a user interface device and in response to a user prompt to perform at least one facial expression, an input describing authentic user-specific biosignal information; and preparing a machine-learning classifier training dataset from the authentic user-specific biosignal information.

9. The computer-implemented method of claim 1, wherein the machine-learning classifier output is in a plurality of machine-learning classifier outputs corresponding to respective EMG information and respective EOG information describing respective facial expressions, the method further comprising applying the plurality of machine-learning classifier outputs to a hard voting algorithm configured to produce a user authentication output based on a majority vote.

10. A non-transitory computer-readable medium, comprising processor-executable instructions stored thereon configured to cause a processor to perform:

receiving user-specific biosignal information from electrodes, wherein the user-specific biosignal information includes electromyography (EMG) information and electrooculography (EOG) information describing at least one facial expression;

extracting the EMG information and the EOG information by applying a bandpass filter to the user-specific biosignal information;

extracting user-specific spatial and temporal representations from the EMG information and the EOG information by:

applying the EMG information and the EOG information to a trained biosignal-based multi-input convolutional neural network (CNN); and applying an output of the CNN to a Long Short-Term Memory to produce the user-specific spatial and temporal representations; and applying the extracted user-specific spatial and temporal representations to a machine-learning classifier to produce a machine-learning classifier output indicating user authentication, wherein the machine-learning classifier is trained to identify the extracted user-specific spatial and temporal representations as authentic.

11. The non-transitory computer-readable medium of claim 10, further comprising processor-executable instructions stored thereon configured to cause the processor to control displaying at least one image of the at least one facial expression on a user display that is a constituent part of:

a helmet;
a hat;
a headset;
a virtual reality headset;
an augmented reality headset;
earbuds;
smart glasses;
a wireless device;
a computer monitor; or
a combination thereof.

12. The non-transitory computer-readable medium of claim 10, wherein the user-specific biosignal information is received from:

a helmet;
a hat;
a headset;
a virtual reality headset;
an augmented reality headset;
earbuds;
smart glasses;
a wireless device;
a computer monitor; or
a combination thereof.

13. The non-transitory computer-readable medium of claim 10, wherein the at least one facial expression is a constituent part of a prescribed sequence of pre-defined facial expressions.

14. The non-transitory computer-readable medium of claim 10, further comprising processor-executable instructions stored thereon configured to cause the processor to:

provide, via a user-interface device, a user authentication request; and restrict receipt of the user-specific biosignal information to a pre-determined time period following the providing the user authentication request.

15. The non-transitory computer-readable medium of claim 10, further comprising processor-executable instructions stored thereon configured to cause the processor to perform a multi-factor authentication process, wherein the multi-factor authentication process uses the machine-learning classifier output to authenticate a user.

16. The non-transitory computer-readable medium of claim 10, wherein the output of the CNN describes, using three-dimensional morphable model coefficients, a three-dimensional face mesh.

17. The non-transitory computer-readable medium of claim 10, further comprising processor-executable instructions stored thereon configured to cause the processor to:

receive, from a user interface device and in response to a user prompt to perform at least one facial expression, an input describing authentic user-specific biosignal information; and prepare a machine-learning classifier training dataset from the authentic user-specific biosignal information.

18. The non-transitory computer-readable medium of claim 10, further comprising processor-executable instructions stored thereon configured to cause the processor to apply the plurality of machine-learning classifier outputs to a hard voting algorithm configured to produce a user authentication output based on a majority vote, wherein the machine-learning classifier output is in a plurality of machine-learning classifier outputs corresponding to respective EMG information and respective EOG information describing respective facial expressions.

19. An apparatus configured to perform biosensor-based user authentication, comprising:

a processor; and a memory communicatively coupled to the processor and storing instructions configured to cause the processor to perform a method comprising:

receiving user-specific biosignal information from electrodes, wherein the user-specific biosignal information includes electromyography (EMG) information and electrooculography (EOG) information describing at least one facial expression;

extracting the EMG information and the EOG information by applying a bandpass filter to the user-specific biosignal information;

extracting user-specific spatial and temporal representations from the EMG information and the EOG information by:

applying the EMG information and the EOG information to a trained biosignal-based multi-input convolutional neural network (CNN); and applying an output of the CNN to a Long Short-Term Memory to produce the user-specific spatial and temporal representations; and applying the extracted user-specific spatial and temporal representations to a machine-learning classifier to produce a machine-learning classifier output indicating user authentication, wherein the machine-learning classifier is trained to identify the extracted user-specific spatial and temporal representations as authentic.

20. The apparatus of claim 19, wherein the memory further stores instructions configured to cause the processor to control displaying at least one image of the at least one facial expression on a user display that is a constituent part of:

a helmet;
a hat;
a headset;
a virtual reality headset;
an augmented reality headset;
earbuds;
smart glasses;
a wireless device;
a computer monitor; or
a combination thereof.

21. The apparatus of claim 19, wherein the user-specific biosignal information is received from:

a helmet;
a hat;
a headset;
a virtual reality headset;
an augmented reality headset;
earbuds;
smart glasses;
a wireless device;
a computer monitor; or
a combination thereof.

22. The apparatus of claim 19, wherein the at least one facial expression is a constituent part of a prescribed sequence of pre-defined facial expressions.

23. The apparatus of claim 19, wherein the memory further stores instructions configured to cause the processor to:

provide, via a user-interface device, a user authentication request; and restrict receipt of the user-specific biosignal information to a pre-determined time period following the providing the user authentication request.

24. The apparatus of claim 19, wherein the memory further stores instructions configured to cause the processor to perform a multi-factor authentication process, wherein the multi-factor authentication process uses the machine-learning classifier output to authenticate a user.

25. The apparatus of claim 19, wherein the output of the CNN describes, using three-dimensional morphable model coefficients, a three-dimensional face mesh.

26. The apparatus of claim 19, wherein the memory further stores instructions configured to cause the processor to:

receive, from a user interface device and in response to a user prompt to perform at least one facial expression, an input describing authentic user-specific biosignal information; and prepare a machine-learning classifier training dataset from the authentic user-specific biosignal information.

27. The apparatus of claim 19, wherein the memory further stores instructions configured to cause the processor to apply the plurality of machine-learning classifier outputs to a hard voting algorithm configured to produce a user authentication output based on a majority vote, wherein the machine-learning classifier output is in a plurality of machine-learning classifier outputs corresponding to respective EMG information and respective EOG information describing respective facial expressions.

\* \* \* \* \*